US012792185B2

(12) United States Patent
Kocovski et al.

(10) Patent No.: US 12,792,185 B2
(45) Date of Patent: Nov. 10, 2026

(54) TOUCH DEVICE

(71) Applicant: Flatfrog Laboratories AB, Lund (SE)

(72) Inventors: Aleksander Kocovski, Malmo (SE); Hakan Bergstrom, Torna-Hallestad (SE); Jens Thorvinger, Lund (SE)

(73) Assignee: FlatFrog Laboratories AB, Lund (SE)

( * ) Notice: Subject to any disclaimer, the term of this patent is extended or adjusted under 35 U.S.C. 154(b) by 0 days.

(21) Appl. No.: 19/658,045

(22) Filed: Apr. 24, 2026

(65) Prior Publication Data

US 2026/0267447 A1 Sep. 10, 2026

Related U.S. Application Data

(63) Continuation of application No. 19/468,383, filed on Feb. 3, 2026, which is a continuation of application
(Continued)

(30) Foreign Application Priority Data

Dec. 7, 2016 (SE) .................................... 1630294-5

(51) Int. Cl.
*G06F 3/042* (2006.01)
*G06F 1/16* (2006.01)
*G06F 3/041* (2006.01)

(52) U.S. Cl.
CPC .............. *G06F 3/0421* (2013.01); *G06F 1/16* (2013.01); *G06F 1/1652* (2013.01); *G06F 3/041* (2013.01);
(Continued)

(58) Field of Classification Search
CPC ........ G06F 3/0421; G06F 1/16; G06F 1/1652; G06F 3/041; G06F 2203/04102; G06F 2203/04103
See application file for complete search history.

(56) References Cited

U.S. PATENT DOCUMENTS 3,440,426 A 4/1969 Bush
3,553,680 A 1/1971 Cooreman
(Continued)

FOREIGN PATENT DOCUMENTS

AU 2008 280 952 A1 3/2009
CA 2745422 A1 6/2010
(Continued)

OTHER PUBLICATIONS

Petition for Inter Partes Review Under 37 C.F.R. § 42.100 in the Inter Partes Review of U.S. Pat. No. 11,281,335 Oct. 6, 2023 (130 pages).

(Continued)

*Primary Examiner* — Vinh T Lam
(74) *Attorney, Agent, or Firm* — Finnegan, Henderson, Farabow, Garrett & Dunner LLP

(57) ABSTRACT

An assembly for holding and controlling curvature of a glass plate for an optical touch sensitive system is described. The assembly comprising a first frame element extending in a first plane and configured to extend at least partially around a panel; at least one second frame element extending in a second plane and forming a support portion for the plate, and at least one spacing element positioned at least partially between the support portion and the first frame element. The spacing element us configured to control a curvature of the first frame element and wherein the at least one second frame element is configured to engage the plate at the support portion, is attached to the first frame element, and is tiltable, by controlling the curvature of the first frame element with said spacing element, to control a curvature of the plate.

9 Claims, 54 Drawing Sheets

Related U.S. Application Data

No. 18/953,534, filed on Nov. 20, 2024, now Pat. No. 12,566,525, which is a continuation of application No. 18/424,138, filed on Jan. 26, 2024, now Pat. No. 12,189,906, which is a continuation of application No. 18/342,674, filed on Jun. 27, 2023, now Pat. No. 11,907,480, which is a continuation of application No. 18/103,118, filed on Jan. 30, 2023, now Pat. No. 11,914,819, which is a continuation of application No. 17/020,489, filed on Sep. 14, 2020, now Pat. No. 11,579,731, which is a continuation of application No. 16/706,438, filed on Dec. 6, 2019, now Pat. No. 10,775,935, which is a continuation of application No. 16/403,283, filed on May 3, 2019, now Pat. No. 11,281,335, which is a continuation of application No. 16/190,907, filed on Nov. 14, 2018, now Pat. No. 10,282,035, which is a continuation of application No. PCT/SE2017/051233, filed on Dec. 7, 2017.

(52) U.S. Cl.
CPC .............. *G06F 2203/04102* (2013.01); *G06F 2203/04103* (2013.01)

(56) References Cited

U.S. PATENT DOCUMENTS 3,673,327 A 6/1972 Johnson et al.
4,129,384 A 12/1978 Walker et al.
4,180,702 A 12/1979 Sick et al.
4,209,255 A 6/1980 Heynau et al.
4,213,707 A 7/1980 Evans, Jr.
4,254,333 A 3/1981 Bergstrom
4,254,407 A 3/1981 Tipon
4,294,543 A 10/1981 Apple et al.
4,346,376 A 8/1982 Mallas
4,420,261 A 12/1983 Barlow et al.
4,484,179 A 11/1984 Kasday
4,507,557 A 3/1985 Tsikos
4,521,112 A 6/1985 Kuwabara et al.
4,542,375 A 9/1985 Alles et al.
4,550,250 A 10/1985 Mueller et al.
4,593,191 A 6/1986 Alles
4,673,918 A 6/1987 Adler et al.
4,688,933 A 8/1987 Lapeyre
4,688,993 A 8/1987 Ferris et al.
4,692,809 A 9/1987 Beining et al.
4,710,760 A 12/1987 Kasday
4,736,191 A 4/1988 Matzke et al.
4,737,626 A 4/1988 Hasegawa
4,746,770 A 5/1988 McAvinney
4,751,379 A 6/1988 Sasaki et al.
4,752,655 A 6/1988 Tajiri et al.
4,772,763 A 9/1988 Garwin et al.
4,782,328 A 11/1988 Denlinger
4,812,833 A 3/1989 Shimauchi
4,837,430 A 6/1989 Hasegawa
4,868,550 A 9/1989 Hiroaki et al.
4,868,912 A 9/1989 Doering
4,891,829 A 1/1990 Deckman et al.
4,916,712 A 4/1990 Bender
4,933,544 A 6/1990 Tamaru
4,949,079 A 8/1990 Loebner
4,986,662 A 1/1991 Bures
4,988,983 A 1/1991 Wehrer
5,065,185 A 11/1991 Powers et al.
5,073,770 A 12/1991 Lowbner
5,105,186 A 4/1992 May
5,159,322 A 10/1992 Loebner
5,166,668 A 11/1992 Aoyagi
5,227,622 A 7/1993 Suzuki
5,248,856 A 9/1993 Mallicoat
5,254,407 A 10/1993 Sergerie et al.
5,345,490 A 9/1994 Finnigan et al.
5,383,022 A 1/1995 Kaser
5,483,261 A 1/1996 Yasutake
5,484,966 A 1/1996 Segen
5,499,098 A 3/1996 Ogawa
5,502,568 A 3/1996 Ogawa et al.
5,515,083 A 5/1996 Casebolt et al.
5,525,764 A 6/1996 Junkins et al.
5,526,422 A 6/1996 Keen
5,539,514 A 7/1996 Shishido et al.
5,570,181 A 10/1996 Yasuo et al.
5,572,251 A 11/1996 Ogawa
5,577,501 A 11/1996 Flohr et al.
5,600,105 A 2/1997 Fukuzaki et al.
5,608,550 A 3/1997 Epstein et al.
5,672,852 A 9/1997 Fukuzaki et al.
5,679,930 A 10/1997 Katsurahira
5,686,942 A 11/1997 Ball
5,688,933 A 11/1997 Evans et al.
5,729,249 A 3/1998 Yasutake
5,736,686 A 4/1998 Perret, Jr. et al.
5,740,224 A 4/1998 MOiier et al.
5,764,223 A 6/1998 Chang et al.
5,767,517 A 6/1998 Hawkins
5,775,792 A 7/1998 Wiese
5,945,980 A 8/1999 Moissev et al.
5,945,981 A 8/1999 Paull et al.
5,959,617 A 9/1999 Bird et al.
6,031,524 A 2/2000 Kunert
6,061,177 A 5/2000 Fujimoto
6,067,079 A 5/2000 Shieh
6,122,394 A 9/2000 Neukermans et al.
6,141,104 A 10/2000 Schulz et al.
6,172,667 B1 1/2001 Sayag
6,175,999 B1 1/2001 Sloan et al.
6,227,667 B1 5/2001 Halldorsson et al.
6,229,529 B1 5/2001 Yano et al.
6,333,735 B1 12/2001 Anvekar
6,366,276 B1 4/2002 Kunimatsu et al.
6,380,732 B1 4/2002 Gilboa
6,380,740 B1 4/2002 Laub
6,390,370 B1 5/2002 Plesko
6,429,857 B1 8/2002 Masters et al.
6,452,996 B1 9/2002 Hsieh
6,476,797 B1 11/2002 Kurihara et al.
6,492,633 B2 12/2002 Nakazawa et al.
6,495,832 B1 12/2002 Kirby
6,504,143 B2 1/2003 Koops et al.
6,529,327 B1 3/2003 Graindorge
6,538,644 B1 3/2003 Muraoka
6,587,099 B2 7/2003 Takekawa
6,648,485 B1 11/2003 Colgan et al.
6,660,964 B1 12/2003 Benderly
6,664,498 B2 12/2003 Forsman et al.
6,664,952 B2 12/2003 Iwamoto et al.
6,690,363 B2 2/2004 Newton
6,707,027 B2 3/2004 Liess et al.
6,738,051 B2 5/2004 Boyd et al.
6,748,098 B1 6/2004 Rosenfeld
6,784,948 B2 8/2004 Kawashima et al.
6,799,141 B1 9/2004 Stoustrup et al.
6,806,871 B1 10/2004 Yasue
6,927,384 B2 8/2005 Reime et al.
6,940,286 B2 9/2005 Wang et al.
6,965,836 B2 11/2005 Richardson
6,972,753 B1 12/2005 Kimura et al.
6,985,137 B2 1/2006 Kaikuranta
7,042,444 B2 5/2006 Cok
7,084,859 B1 8/2006 Pryor
7,087,907 B1 8/2006 Lalovic et al.
7,133,031 B2 11/2006 Wang et al.
7,176,904 B2 2/2007 Satoh
7,199,932 B2 4/2007 Sugiura
7,359,041 B2 4/2008 Xie et al.
7,397,418 B1 7/2008 Doerry et al.
7,432,893 B2 10/2008 Ma et al.
7,435,940 B2 10/2008 Eliasson et al.
7,436,443 B2 10/2008 Hirunuma et al.
7,442,914 B2 10/2008 Eliasson et al.

(56) References Cited

U.S. PATENT DOCUMENTS

| | | | |
|---|---|---|---|
| 7,465,914 | B2 | 12/2008 | Eliasson et al. |
| 7,528,898 | B2 | 5/2009 | Hashimoto |
| 7,613,375 | B2 | 11/2009 | Shimizu |
| 7,629,968 | B2 | 12/2009 | Miller et al. |
| 7,646,833 | B1 | 1/2010 | He et al. |
| 7,653,883 | B2 | 1/2010 | Hotelling et al. |
| 7,655,901 | B2 | 2/2010 | Idzik et al. |
| 7,705,835 | B2 | 4/2010 | Eikman |
| 7,729,056 | B2 | 6/2010 | Hwang et al. |
| 7,847,789 | B2 | 12/2010 | Kolmykov-Zotov et al. |
| 7,855,716 | B2 | 12/2010 | McCreary et al. |
| 7,859,519 | B2 | 12/2010 | Tulbert |
| 7,924,272 | B2 | 4/2011 | Boer et al. |
| 7,932,899 | B2 | 4/2011 | Newton et al. |
| 7,969,410 | B2 | 6/2011 | Kakarala |
| 7,995,039 | B2 | 8/2011 | Eliasson et al. |
| 8,013,845 | B2 | 9/2011 | Ostergaard et al. |
| 8,031,186 | B2 | 10/2011 | Ostergaard |
| 8,077,147 | B2 | 12/2011 | Krah et al. |
| 8,093,545 | B2 | 1/2012 | Leong et al. |
| 8,094,136 | B2 | 1/2012 | Eliasson et al. |
| 8,094,910 | B2 | 1/2012 | Xu |
| 8,120,595 | B2 | 2/2012 | Kukulj |
| 8,149,211 | B2 | 4/2012 | Hayakawa et al. |
| 8,218,154 | B2 | 7/2012 | Ostergaard et al. |
| 8,274,495 | B2 | 9/2012 | Lee |
| 8,325,158 | B2 | 12/2012 | Yatsuda et al. |
| 8,339,379 | B2 | 12/2012 | Goertz et al. |
| 8,350,827 | B2 | 1/2013 | Chung et al. |
| 8,384,010 | B2 | 2/2013 | Hong et al. |
| 8,407,606 | B1 | 3/2013 | Davidson et al. |
| 8,441,467 | B2 | 5/2013 | Han |
| 8,445,834 | B2 | 5/2013 | Hong et al. |
| 8,466,901 | B2 | 6/2013 | Yen et al. |
| 8,482,547 | B2 | 7/2013 | Cabon et al. |
| 8,542,217 | B2 | 9/2013 | Wassvik et al. |
| 8,567,257 | B2 | 10/2013 | Van Steenberge et al. |
| 8,581,884 | B2 | 11/2013 | Fahraeus |
| 8,624,858 | B2 | 1/2014 | Fyke et al. |
| 8,676,007 | B2 | 3/2014 | Holmgren et al. |
| 8,686,974 | B2 | 4/2014 | Christiansson et al. |
| 8,692,807 | B2 | 4/2014 | FOhraeus et al. |
| 8,716,614 | B2 | 5/2014 | Wassvik |
| 8,727,581 | B2 | 5/2014 | Saccomanno |
| 8,745,514 | B1 | 6/2014 | Davidson |
| 8,780,066 | B2 | 7/2014 | Christiansson et al. |
| 8,810,549 | B2 | 8/2014 | Holloway |
| 8,816,991 | B2 | 8/2014 | Miller et al. |
| 8,830,181 | B1 | 9/2014 | Clark et al. |
| 8,836,655 | B2 | 9/2014 | Huang |
| 8,837,882 | B2 | 9/2014 | Holmgren |
| 8,860,696 | B2 | 10/2014 | Wassvik et al. |
| 8,872,098 | B2 | 10/2014 | Bergstrom et al. |
| 8,872,801 | B2 | 10/2014 | Bergstrom et al. |
| 8,884,900 | B2 | 11/2014 | Wassvik |
| 8,890,843 | B2 | 11/2014 | Wassvik et al. |
| 8,890,849 | B2 | 11/2014 | Christiansson et al. |
| 8,928,590 | B1 | 1/2015 | El Dokor |
| 8,963,886 | B2 | 2/2015 | Wassvik |
| 8,982,084 | B2 | 3/2015 | Christiansson et al. |
| 9,001,086 | B1 | 4/2015 | Saini |
| 9,024,896 | B2 | 5/2015 | Chen |
| 9,024,916 | B2 | 5/2015 | Christiansson |
| 9,035,909 | B2 | 5/2015 | Christiansson |
| 9,052,771 | B2 | 6/2015 | Goertz |
| 9,063,614 | B2 | 6/2015 | Petterson et al. |
| 9,063,617 | B2 | 6/2015 | Eliasson et al. |
| 9,086,763 | B2 | 7/2015 | Johansson et al. |
| 9,092,091 | B2 | 7/2015 | Piot |
| 9,128,250 | B2 | 9/2015 | Charters |
| 9,134,854 | B2 | 9/2015 | Wassvik et al. |
| 9,137,891 | B2 | 9/2015 | Gibbs |
| 9,158,401 | B2 | 10/2015 | Christiansson |
| 9,158,415 | B2 | 10/2015 | Song et al. |
| 9,158,416 | B2 | 10/2015 | Eriksson |
| 9,164,625 | B2 | 10/2015 | Holmgren |
| 9,201,520 | B2 | 12/2015 | Benko et al. |
| 9,207,800 | B1 | 12/2015 | Eriksson |
| 9,213,443 | B2 | 12/2015 | Goertz |
| 9,213,445 | B2 | 12/2015 | King et al. |
| 9,223,431 | B2 | 12/2015 | Pemberton-Pigott |
| 9,262,014 | B2 | 2/2016 | Lee |
| 9,274,645 | B2 | 3/2016 | Christiansson et al. |
| 9,280,237 | B2 | 3/2016 | Kukulj |
| 9,291,845 | B2 | 3/2016 | Shin et al. |
| 9,292,132 | B2 | 3/2016 | An |
| 9,317,146 | B1 | 4/2016 | Hufnagel |
| 9,317,168 | B2 | 4/2016 | Christiansson et al. |
| 9,323,396 | B2 | 4/2016 | Han et al. |
| 9,335,867 | B2 | 5/2016 | Holmgren |
| 9,366,565 | B2 | 6/2016 | Uvnas |
| 9,377,884 | B2 | 6/2016 | Christiansson et al. |
| 9,389,732 | B2 | 7/2016 | Craven-Bartle |
| 9,411,430 | B2 | 8/2016 | Holmgren |
| 9,411,444 | B2 | 8/2016 | Christiansson et al. |
| 9,411,464 | B2 | 8/2016 | Wallander et al. |
| 9,430,079 | B2 | 8/2016 | Christiansson et al. |
| 9,442,574 | B2 | 9/2016 | Fahraeus |
| 9,471,170 | B2 | 10/2016 | Goertz |
| 9,535,194 | B2 | 1/2017 | Furui et al. |
| 9,547,393 | B2 | 1/2017 | Christiansson |
| 9,552,103 | B2 | 1/2017 | Craven-Bartle |
| 9,557,846 | B2 | 1/2017 | Baharav |
| 9,563,298 | B2 | 2/2017 | Sakashita |
| 9,588,619 | B2 | 3/2017 | Christiansson et al. |
| 9,594,467 | B2 | 3/2017 | Christiansson et al. |
| 9,618,682 | B2 | 4/2017 | Yoon et al. |
| 9,626,018 | B2 | 4/2017 | Christiansson et al. |
| 9,626,040 | B2 | 4/2017 | Wallander et al. |
| 9,639,210 | B2 | 5/2017 | Wallander et al. |
| 9,645,679 | B2 | 5/2017 | Eriksson |
| 9,645,695 | B2 | 5/2017 | Orita et al. |
| 9,671,900 | B2 | 6/2017 | Piot |
| 9,678,601 | B2 | 6/2017 | Pettersson |
| 9,678,602 | B2 | 6/2017 | Wallander |
| 9,684,414 | B2 | 6/2017 | Christiansson et al. |
| 9,710,101 | B2 | 7/2017 | Christiansson et al. |
| 9,733,765 | B2 | 8/2017 | Cho |
| 9,740,336 | B2 | 8/2017 | Jakobsen |
| 9,741,184 | B2 | 8/2017 | Iyer |
| 9,746,976 | B2 | 8/2017 | Leong |
| 9,785,287 | B2 | 10/2017 | Bergstrom |
| 9,811,163 | B2 | 11/2017 | Eriksson |
| 9,839,145 | B2 | 12/2017 | Ryu et al. |
| 9,857,915 | B2 | 1/2018 | Benko |
| 9,857,916 | B2 | 1/2018 | Bergstrom |
| 9,857,917 | B2 | 1/2018 | Wassvik |
| 9,874,978 | B2 | 1/2018 | Wall |
| 9,885,809 | B2 | 2/2018 | Chen |
| 9,921,661 | B2 | 3/2018 | Eriksson |
| 9,952,719 | B2 | 4/2018 | Li |
| 9,983,626 | B2 | 5/2018 | Cao et al. |
| 9,983,717 | B2 | 5/2018 | Pacheco |
| 10,004,985 | B2 | 6/2018 | Holmgren |
| 10,013,107 | B2 | 7/2018 | Christiansson et al. |
| 10,019,113 | B2 | 7/2018 | Christiansson et al. |
| 10,024,741 | B2 | 7/2018 | Povazay |
| 10,048,773 | B2 | 8/2018 | Fahraeus |
| 10,048,806 | B2 | 8/2018 | Lin |
| 10,088,919 | B2 | 10/2018 | Tamura |
| 10,126,897 | B2 | 11/2018 | Kwon |
| 10,139,854 | B2 | 11/2018 | Krishnakumar |
| 10,152,176 | B2 | 12/2018 | Wallander |
| 10,161,886 | B2 | 12/2018 | Ohlsson |
| 10,261,639 | B2 | 4/2019 | Lee |
| 10,282,035 | B2 | 5/2019 | Kocovski |
| 10,317,200 | B1 | 6/2019 | Han |
| 10,318,074 | B2 | 6/2019 | Klinghult |
| 10,324,565 | B2 | 6/2019 | Rosengren |
| 10,423,281 | B2 | 9/2019 | Yang |
| 10,496,226 | B2 | 12/2019 | Sugiyama |
| 10,496,227 | B2 | 12/2019 | Wassvik |
| 10,642,386 | B2 | 5/2020 | Makelainen |
| 10,649,585 | B1 | 5/2020 | van Beek et al. |

(56) References Cited

U.S. PATENT DOCUMENTS

| | | | |
|---|---|---|---|
| 10,775,935 | B2 | 9/2020 | Kocovski |
| 10,860,142 | B1 | 12/2020 | Northcott |
| 10,884,553 | B2 | 1/2021 | Weilbacher |
| 11,106,314 | B2 | 8/2021 | Krishnakumar |
| 11,119,565 | B2 | 9/2021 | Avila |
| 11,182,023 | B2 | 11/2021 | Ohlsson |
| 11,231,814 | B1 | 1/2022 | Wittenberg |
| 11,243,640 | B2 | 2/2022 | Ancona |
| 11,281,335 | B2 | 3/2022 | Kocovski |
| 11,579,731 | B2 | 2/2023 | Kocovski |
| 11,630,537 | B2 | 4/2023 | Wittenberg |
| 11,868,568 | B2 | 1/2024 | Kocovski et al. |
| 11,907,480 | B2 | 2/2024 | Kocovski et al. |
| 11,914,819 | B2 | 2/2024 | Kocovski et al. |
| 2001/0002694 | A1 | 6/2001 | Nakazawa et al. |
| 2001/0005004 | A1 | 6/2001 | Shiratsuki et al. |
| 2001/0005308 | A1 | 6/2001 | Oishi et al. |
| 2001/0030642 | A1 | 10/2001 | Sullivan et al. |
| 2002/0067348 | A1 | 6/2002 | Masters et al. |
| 2002/0075243 | A1 | 6/2002 | Newton |
| 2002/0118177 | A1 | 8/2002 | Newton |
| 2002/0158853 | A1 | 10/2002 | Sugawara et al. |
| 2002/0163505 | A1 | 11/2002 | Takekawa |
| 2003/0016450 | A1 | 1/2003 | Bluemel et al. |
| 2003/0034439 | A1 | 2/2003 | Reime et al. |
| 2003/0034935 | A1 | 2/2003 | Amanai et al. |
| 2003/0048257 | A1 | 3/2003 | Mattila |
| 2003/0052257 | A1 | 3/2003 | Sumriddetchkajorn |
| 2003/0095399 | A1 | 5/2003 | Grenda et al. |
| 2003/0107748 | A1 | 6/2003 | Lee |
| 2003/0137494 | A1 | 7/2003 | Tulbert |
| 2003/0156100 | A1 | 8/2003 | Gettemy |
| 2003/0160155 | A1 | 8/2003 | Liess |
| 2003/0210537 | A1 | 11/2003 | Engelmann |
| 2003/0214486 | A1 | 11/2003 | Roberts |
| 2004/0027339 | A1 | 2/2004 | Schulz |
| 2004/0032401 | A1 | 2/2004 | Nakazawa et al. |
| 2004/0090432 | A1 | 5/2004 | Takahashi et al. |
| 2004/0130338 | A1 | 7/2004 | Wang et al. |
| 2004/0174541 | A1 | 9/2004 | Freifeld |
| 2004/0201579 | A1 | 10/2004 | Graham |
| 2004/0212603 | A1 | 10/2004 | Cok |
| 2004/0238627 | A1 | 12/2004 | Silverbrook et al. |
| 2004/0239702 | A1 | 12/2004 | Kang et al. |
| 2004/0245438 | A1 | 12/2004 | Payne et al. |
| 2004/0252091 | A1 | 12/2004 | Ma et al. |
| 2004/0252867 | A1 | 12/2004 | Lan et al. |
| 2005/0012714 | A1 | 1/2005 | Russo et al. |
| 2005/0041013 | A1 | 2/2005 | Tanaka |
| 2005/0057903 | A1 | 3/2005 | Choi |
| 2005/0073508 | A1 | 4/2005 | Pittel et al. |
| 2005/0083293 | A1 | 4/2005 | Dixon |
| 2005/0128190 | A1 | 6/2005 | Ryynanen |
| 2005/0143923 | A1 | 6/2005 | Keers et al. |
| 2005/0156914 | A1 | 7/2005 | Lipman et al. |
| 2005/0162398 | A1 | 7/2005 | Eliasson et al. |
| 2005/0179977 | A1 | 8/2005 | Chui et al. |
| 2005/0200613 | A1 | 9/2005 | Kobayashi et al. |
| 2005/0212774 | A1 | 9/2005 | Ho et al. |
| 2005/0248540 | A1 | 11/2005 | Newton |
| 2005/0253834 | A1 | 11/2005 | Sakamaki et al. |
| 2005/0276053 | A1 | 12/2005 | Nortrup et al. |
| 2005/0280746 | A1 | 12/2005 | North et al. |
| 2006/0001650 | A1 | 1/2006 | Robbins et al. |
| 2006/0001653 | A1 | 1/2006 | Smits |
| 2006/0007185 | A1 | 1/2006 | Kobayashi |
| 2006/0008164 | A1 | 1/2006 | Wu et al. |
| 2006/0017706 | A1 | 1/2006 | Cutherell et al. |
| 2006/0017709 | A1 | 1/2006 | Okano |
| 2006/0033725 | A1 | 2/2006 | Marggraff et al. |
| 2006/0038698 | A1 | 2/2006 | Chen |
| 2006/0061861 | A1 | 3/2006 | Munro et al. |
| 2006/0114237 | A1 | 6/2006 | Crockett et al. |
| 2006/0132454 | A1 | 6/2006 | Chen et al. |
| 2006/0139340 | A1 | 6/2006 | Geaghan |
| 2006/0158437 | A1 | 7/2006 | Blythe et al. |
| 2006/0170658 | A1 | 8/2006 | Nakamura et al. |
| 2006/0202974 | A1 | 9/2006 | Thielman |
| 2006/0227120 | A1 | 10/2006 | Eikman |
| 2006/0255248 | A1 | 11/2006 | Eliasson |
| 2006/0256092 | A1 | 11/2006 | Lee |
| 2006/0279558 | A1 | 12/2006 | Van Delden et al. |
| 2006/0281543 | A1 | 12/2006 | Sutton et al. |
| 2006/0290684 | A1 | 12/2006 | Giraldo et al. |
| 2007/0014486 | A1 | 1/2007 | Schiwietz et al. |
| 2007/0024598 | A1 | 2/2007 | Miller et al. |
| 2007/0034783 | A1 | 2/2007 | Eliasson et al. |
| 2007/0038691 | A1 | 2/2007 | Candes et al. |
| 2007/0052684 | A1 | 3/2007 | Gruhlke et al. |
| 2007/0070056 | A1 | 3/2007 | Sato et al. |
| 2007/0075648 | A1 | 4/2007 | Blythe et al. |
| 2007/0120833 | A1 | 5/2007 | Yamaguchi et al. |
| 2007/0125937 | A1 | 6/2007 | Eliasson et al. |
| 2007/0152985 | A1 | 7/2007 | Ostergaard et al. |
| 2007/0201042 | A1 | 8/2007 | Eliasson et al. |
| 2007/0296688 | A1 | 12/2007 | Nakamura et al. |
| 2008/0006766 | A1 | 1/2008 | Oon et al. |
| 2008/0007540 | A1 | 1/2008 | Ostergaard |
| 2008/0007541 | A1 | 1/2008 | Eliasson et al. |
| 2008/0007542 | A1 | 1/2008 | Eliasson et al. |
| 2008/0011944 | A1 | 1/2008 | Chua et al. |
| 2008/0029691 | A1 | 2/2008 | Han |
| 2008/0036743 | A1 | 2/2008 | Westerman et al. |
| 2008/0062150 | A1 | 3/2008 | Lee |
| 2008/0068691 | A1 | 3/2008 | Miyatake |
| 2008/0074401 | A1 | 3/2008 | Chung et al. |
| 2008/0080811 | A1 | 4/2008 | Deane |
| 2008/0088603 | A1 | 4/2008 | Eliasson et al. |
| 2008/0121442 | A1 | 5/2008 | Boer et al. |
| 2008/0122792 | A1 | 5/2008 | Izadi et al. |
| 2008/0122803 | A1 | 5/2008 | Izadi et al. |
| 2008/0130979 | A1 | 6/2008 | Run et al. |
| 2008/0133265 | A1 | 6/2008 | Silkaitis et al. |
| 2008/0150846 | A1 | 6/2008 | Chung et al. |
| 2008/0150848 | A1 | 6/2008 | Chung et al. |
| 2008/0151126 | A1 | 6/2008 | Yu |
| 2008/0158176 | A1 | 7/2008 | Land et al. |
| 2008/0189046 | A1 | 8/2008 | Eliasson et al. |
| 2008/0192025 | A1 | 8/2008 | Jaeger et al. |
| 2008/0238433 | A1 | 10/2008 | Joutsenoja et al. |
| 2008/0246388 | A1 | 10/2008 | Cheon et al. |
| 2008/0252619 | A1 | 10/2008 | Crockett et al. |
| 2008/0266266 | A1 | 10/2008 | Kent et al. |
| 2008/0278460 | A1 | 11/2008 | Arnett et al. |
| 2008/0284925 | A1 | 11/2008 | Han |
| 2008/0291668 | A1 | 11/2008 | Aylward et al. |
| 2008/0297482 | A1 | 12/2008 | Weiss |
| 2009/0000831 | A1 | 1/2009 | Miller et al. |
| 2009/0002340 | A1 | 1/2009 | Van Genechten |
| 2009/0006292 | A1 | 1/2009 | Block |
| 2009/0040786 | A1 | 2/2009 | Mori |
| 2009/0066647 | A1 | 3/2009 | Kerr et al. |
| 2009/0067178 | A1 | 3/2009 | Huang et al. |
| 2009/0073142 | A1 | 3/2009 | Yamashita et al. |
| 2009/0077501 | A1 | 3/2009 | Partridge et al. |
| 2009/0085894 | A1 | 4/2009 | Gandhi et al. |
| 2009/0091554 | A1 | 4/2009 | Kearn |
| 2009/0115919 | A1 | 5/2009 | Tanaka et al. |
| 2009/0122020 | A1 | 5/2009 | Eliasson et al. |
| 2009/0122027 | A1 | 5/2009 | Newton |
| 2009/0128508 | A1 | 5/2009 | Sohn et al. |
| 2009/0135162 | A1 | 5/2009 | Van De Wijdeven et al. |
| 2009/0143141 | A1 | 6/2009 | Wells et al. |
| 2009/0153519 | A1 | 6/2009 | Suarez Rovere |
| 2009/0161026 | A1 | 6/2009 | Wu et al. |
| 2009/0168459 | A1 | 7/2009 | Holman et al. |
| 2009/0187842 | A1 | 7/2009 | Collins et al. |
| 2009/0189857 | A1 | 7/2009 | Benko et al. |
| 2009/0189874 | A1 | 7/2009 | Chene et al. |
| 2009/0189878 | A1 | 7/2009 | Goertz et al. |
| 2009/0219256 | A1 | 9/2009 | Newton |
| 2009/0229892 | A1 | 9/2009 | Fisher et al. |
| 2009/0251439 | A1 | 10/2009 | Westerman et al. |
| 2009/0256817 | A1 | 10/2009 | Perlin et al. |

(56) References Cited

U.S. PATENT DOCUMENTS

| | | | | |
|---|---|---|---|---|
| 2009/0259967 | A1 | 10/2009 | Davidson et al. | |
| 2009/0267919 | A1 | 10/2009 | Chao et al. | |
| 2009/0273794 | A1 | 11/2009 | Ostergaard et al. | |
| 2009/0278816 | A1 | 11/2009 | Colson | |
| 2009/0297009 | A1 | 12/2009 | Xu et al. | |
| 2010/0033444 | A1 | 2/2010 | Kobayashi | |
| 2010/0045629 | A1 | 2/2010 | Newton | |
| 2010/0060896 | A1 | 3/2010 | Van De Wijdeven et al. | |
| 2010/0066016 | A1 | 3/2010 | Van De Wijdeven et al. | |
| 2010/0066704 | A1 | 3/2010 | Kasai | |
| 2010/0073318 | A1 | 3/2010 | Hu et al. | |
| 2010/0073327 | A1 | 3/2010 | Mau et al. | |
| 2010/0078545 | A1 | 4/2010 | Leong et al. | |
| 2010/0079407 | A1 | 4/2010 | Suggs et al. | |
| 2010/0079408 | A1 | 4/2010 | Leong et al. | |
| 2010/0097345 | A1 | 4/2010 | Jang et al. | |
| 2010/0097348 | A1 | 4/2010 | Park et al. | |
| 2010/0097353 | A1 | 4/2010 | Newton | |
| 2010/0103133 | A1 | 4/2010 | Park et al. | |
| 2010/0125438 | A1 | 5/2010 | Audet | |
| 2010/0127975 | A1 | 5/2010 | Jensen | |
| 2010/0134435 | A1 | 6/2010 | Kimura et al. | |
| 2010/0142823 | A1 | 6/2010 | Wang et al. | |
| 2010/0187422 | A1 | 7/2010 | Kothari et al. | |
| 2010/0193259 | A1 | 8/2010 | Wassvik | |
| 2010/0229091 | A1 | 9/2010 | Homma et al. | |
| 2010/0238139 | A1 | 9/2010 | Goertz et al. | |
| 2010/0245292 | A1 | 9/2010 | Wu | |
| 2010/0265170 | A1 | 10/2010 | Norieda | |
| 2010/0277436 | A1 | 11/2010 | Feng et al. | |
| 2010/0283785 | A1 | 11/2010 | Satulovsky | |
| 2010/0284596 | A1 | 11/2010 | Miao et al. | |
| 2010/0289754 | A1 | 11/2010 | Sleeman et al. | |
| 2010/0295821 | A1 | 11/2010 | Chang et al. | |
| 2010/0302196 | A1 | 12/2010 | Han et al. | |
| 2010/0302209 | A1 | 12/2010 | Large | |
| 2010/0302210 | A1 | 12/2010 | Han et al. | |
| 2010/0302240 | A1 | 12/2010 | Lettvin | |
| 2010/0315379 | A1 | 12/2010 | Allard et al. | |
| 2010/0321328 | A1 | 12/2010 | Chang et al. | |
| 2010/0322550 | A1 | 12/2010 | Trott | |
| 2011/0043490 | A1 | 2/2011 | Powell et al. | |
| 2011/0049388 | A1 | 3/2011 | Delaney et al. | |
| 2011/0050649 | A1 | 3/2011 | Newton et al. | |
| 2011/0051394 | A1 | 3/2011 | Bailey | |
| 2011/0068256 | A1 | 3/2011 | Hong et al. | |
| 2011/0069039 | A1 | 3/2011 | Lee et al. | |
| 2011/0069807 | A1 | 3/2011 | Dennerlein et al. | |
| 2011/0074725 | A1 | 3/2011 | Westerman et al. | |
| 2011/0074734 | A1 | 3/2011 | Wassvik et al. | |
| 2011/0074735 | A1 | 3/2011 | Wassvik et al. | |
| 2011/0080361 | A1 | 4/2011 | Miller et al. | |
| 2011/0084939 | A1 | 4/2011 | Gepner et al. | |
| 2011/0090176 | A1 | 4/2011 | Christiansson et al. | |
| 2011/0102374 | A1 | 5/2011 | Wassvik et al. | |
| 2011/0115748 | A1 | 5/2011 | Xu | |
| 2011/0121323 | A1 | 5/2011 | Wu et al. | |
| 2011/0122075 | A1 | 5/2011 | Seo et al. | |
| 2011/0122091 | A1 | 5/2011 | King et al. | |
| 2011/0122094 | A1 | 5/2011 | Tsang et al. | |
| 2011/0134079 | A1 | 6/2011 | Stark | |
| 2011/0141062 | A1 | 6/2011 | Yu et al. | |
| 2011/0147569 | A1 | 6/2011 | Drumm | |
| 2011/0157095 | A1 | 6/2011 | Drumm | |
| 2011/0157096 | A1 | 6/2011 | Drumm | |
| 2011/0163996 | A1 | 7/2011 | Wassvik et al. | |
| 2011/0163997 | A1 | 7/2011 | Kim | |
| 2011/0163998 | A1 | 7/2011 | Goertz et al. | |
| 2011/0169780 | A1 | 7/2011 | Goertz et al. | |
| 2011/0175852 | A1 | 7/2011 | Goertz et al. | |
| 2011/0205186 | A1 | 8/2011 | Newton et al. | |
| 2011/0205189 | A1 | 8/2011 | Newton | |
| 2011/0216042 | A1 | 9/2011 | Wassvik et al. | |
| 2011/0221705 | A1 | 9/2011 | Yi et al. | |
| 2011/0221997 | A1 | 9/2011 | Kim et al. | |
| 2011/0227036 | A1 | 9/2011 | Vaufrey | |
| 2011/0227874 | A1 | 9/2011 | Fahraeus et al. | |
| 2011/0234537 | A1 | 9/2011 | Kim et al. | |
| 2011/0254864 | A1 | 10/2011 | Tsuchikawa et al. | |
| 2011/0261020 | A1 | 10/2011 | Song et al. | |
| 2011/0267296 | A1 | 11/2011 | Noguchi et al. | |
| 2011/0291989 | A1 | 12/2011 | Lee | |
| 2011/0298743 | A1 | 12/2011 | Machida et al. | |
| 2011/0309325 | A1 | 12/2011 | Park et al. | |
| 2011/0310045 | A1 | 12/2011 | Toda et al. | |
| 2011/0316005 | A1 | 12/2011 | Murao et al. | |
| 2012/0019448 | A1 | 1/2012 | Pitkanen et al. | |
| 2012/0026408 | A1 | 2/2012 | Lee et al. | |
| 2012/0038593 | A1 | 2/2012 | Ronka et al. | |
| 2012/0056807 | A1 | 3/2012 | Chapman et al. | |
| 2012/0062474 | A1 | 3/2012 | Weishaupt et al. | |
| 2012/0062492 | A1 | 3/2012 | Katoh | |
| 2012/0068973 | A1 | 3/2012 | Christiansson et al. | |
| 2012/0086673 | A1 | 4/2012 | Chien et al. | |
| 2012/0089348 | A1 | 4/2012 | Perlin et al. | |
| 2012/0110447 | A1 | 5/2012 | Chen | |
| 2012/0131490 | A1 | 5/2012 | Lin et al. | |
| 2012/0141001 | A1 | 6/2012 | Zhang et al. | |
| 2012/0146930 | A1 | 6/2012 | Lee | |
| 2012/0153134 | A1 | 6/2012 | Bergstrom et al. | |
| 2012/0154338 | A1 | 6/2012 | Bergstrom et al. | |
| 2012/0162142 | A1 | 6/2012 | Christiansson et al. | |
| 2012/0162144 | A1 | 6/2012 | Fahraeus et al. | |
| 2012/0169672 | A1 | 7/2012 | Christiansson | |
| 2012/0170056 | A1 | 7/2012 | Jakobsen et al. | |
| 2012/0181419 | A1 | 7/2012 | Momtahan | |
| 2012/0182266 | A1 | 7/2012 | Han | |
| 2012/0188206 | A1 | 7/2012 | Sparf et al. | |
| 2012/0191993 | A1 | 7/2012 | Drader et al. | |
| 2012/0200532 | A1 | 8/2012 | Powell et al. | |
| 2012/0200538 | A1 | 8/2012 | Christiansson et al. | |
| 2012/0212441 | A1 | 8/2012 | Christiansson et al. | |
| 2012/0212457 | A1 | 8/2012 | Drumm | |
| 2012/0217882 | A1 | 8/2012 | Wong et al. | |
| 2012/0218229 | A1 | 8/2012 | Drumm | |
| 2012/0223916 | A1 | 9/2012 | Kukulj | |
| 2012/0242622 | A1 | 9/2012 | Tseng et al. | |
| 2012/0249478 | A1 | 10/2012 | Chang et al. | |
| 2012/0256882 | A1 | 10/2012 | Christiansson et al. | |
| 2012/0268403 | A1 | 10/2012 | Christiansson | |
| 2012/0268427 | A1 | 10/2012 | Slobodin | |
| 2012/0274559 | A1 | 11/2012 | Mathai et al. | |
| 2012/0305755 | A1 | 12/2012 | Hong et al. | |
| 2012/0313865 | A1 | 12/2012 | Pearce | |
| 2013/0021300 | A1 | 1/2013 | Wassvik | |
| 2013/0021302 | A1 | 1/2013 | Drumm | |
| 2013/0027404 | A1 | 1/2013 | Sarnoff | |
| 2013/0044073 | A1 | 2/2013 | Christiansson et al. | |
| 2013/0055080 | A1 | 2/2013 | Komer et al. | |
| 2013/0076697 | A1 | 3/2013 | Goertz et al. | |
| 2013/0082980 | A1 | 4/2013 | Gruhlke et al. | |
| 2013/0106709 | A1 | 5/2013 | Simmons | |
| 2013/0107569 | A1 | 5/2013 | Suganuma | |
| 2013/0113715 | A1 | 5/2013 | Grant et al. | |
| 2013/0120320 | A1 | 5/2013 | Liu et al. | |
| 2013/0125016 | A1 | 5/2013 | Pallakoff et al. | |
| 2013/0127790 | A1 | 5/2013 | Wassvik | |
| 2013/0135258 | A1 | 5/2013 | King et al. | |
| 2013/0135259 | A1 | 5/2013 | King et al. | |
| 2013/0141388 | A1 | 6/2013 | Ludwig et al. | |
| 2013/0141395 | A1 | 6/2013 | Holmgren et al. | |
| 2013/0154983 | A1 | 6/2013 | Christiansson et al. | |
| 2013/0155027 | A1 | 6/2013 | Holmgren et al. | |
| 2013/0155655 | A1 | 6/2013 | Lee et al. | |
| 2013/0156376 | A1 * | 6/2013 | Charters | G02B 6/122 385/36 |
| 2013/0158504 | A1 | 6/2013 | Ruchti et al. | |
| 2013/0181896 | A1 | 7/2013 | Gruhlke et al. | |
| 2013/0181953 | A1 | 7/2013 | Hinckley et al. | |
| 2013/0187891 | A1 * | 7/2013 | Eriksson | G06F 1/1616 345/175 |
| 2013/0201142 | A1 | 8/2013 | Suarez Rovere | |
| 2013/0222346 | A1 | 8/2013 | Chen et al. | |
| 2013/0234955 | A1 | 9/2013 | Takano | |

(56) References Cited

U.S. PATENT DOCUMENTS

2013/0234991 A1 9/2013 Sparf
2013/0241887 A1 9/2013 Sharma
2013/0249833 A1 9/2013 Christiansson et al.
2013/0269867 A1 10/2013 Trott
2013/0275082 A1 10/2013 Follmer et al.
2013/0285920 A1 10/2013 Colley
2013/0285968 A1 10/2013 Christiansson et al.
2013/0300714 A1 11/2013 Goh et al.
2013/0300716 A1 11/2013 Craven-Bartle et al.
2013/0307795 A1 11/2013 Suarez Rovere
2013/0321740 A1 12/2013 An et al.
2013/0342490 A1 12/2013 Wallander et al.
2013/0342493 A1 12/2013 Crow
2014/0002400 A1 1/2014 Christiansson et al.
2014/0015803 A1 1/2014 Drumm
2014/0028575 A1 1/2014 Parivar et al.
2014/0028604 A1 1/2014 Morinaga et al.
2014/0028629 A1 1/2014 Drumm et al.
2014/0036203 A1 2/2014 Guillou et al.
2014/0055421 A1 2/2014 Christiansson et al.
2014/0063853 A1 3/2014 Nichol et al.
2014/0071653 A1 3/2014 Thompson et al.
2014/0085241 A1 3/2014 Christiansson et al.
2014/0092052 A1 4/2014 Grunthaner et al.
2014/0098032 A1 4/2014 Ng et al.
2014/0098058 A1 4/2014 Baharav et al.
2014/0109219 A1 4/2014 Rohrweck et al.
2014/0125633 A1 5/2014 Fahraeus et al.
2014/0139467 A1 5/2014 Ghosh et al.
2014/0152624 A1 6/2014 Piot et al.
2014/0160762 A1 6/2014 Dudik et al.
2014/0192023 A1 7/2014 Hoffman
2014/0226084 A1 8/2014 Utukuri et al.
2014/0232669 A1 8/2014 Ohlsson et al.
2014/0237401 A1 8/2014 Krus et al.
2014/0237408 A1 8/2014 Ohlsson et al.
2014/0237422 A1 8/2014 Ohlsson et al.
2014/0253520 A1 9/2014 Cueto et al.
2014/0253831 A1 9/2014 Craven-Bartle
2014/0259029 A1 9/2014 Choi et al.
2014/0267124 A1 9/2014 Christiansson et al.
2014/0267166 A1* 9/2014 Griffiths ................ G06F 3/0421 345/175
2014/0292701 A1 10/2014 Christiansson et al.
2014/0300572 A1 10/2014 Ohlsson et al.
2014/0320460 A1 10/2014 Johansson et al.
2014/0347325 A1 11/2014 Wallander et al.
2014/0362046 A1 12/2014 Yoshida
2014/0368471 A1 12/2014 Christiansson et al.
2014/0375607 A1 12/2014 Christiansson et al.
2015/0002386 A1 1/2015 Mankowski et al.
2015/0009687 A1 1/2015 Lin
2015/0015497 A1 1/2015 Leigh
2015/0035774 A1 2/2015 Christiansson et al.
2015/0035803 A1 2/2015 Wassvik et al.
2015/0053850 A1 2/2015 Uvnas
2015/0054759 A1 2/2015 Christiansson et al.
2015/0083891 A1 3/2015 Wallander
2015/0103013 A9 4/2015 Huang
2015/0121691 A1 5/2015 Wang
2015/0130769 A1 5/2015 Bjorklund
2015/0131010 A1 5/2015 Sugiyama
2015/0138105 A1 5/2015 Christiansson et al.
2015/0138158 A1 5/2015 Wallander et al.
2015/0138161 A1 5/2015 Wassvik
2015/0199071 A1 7/2015 Hou
2015/0205441 A1 7/2015 Bergstrom et al.
2015/0215450 A1 7/2015 Seo et al.
2015/0242055 A1 8/2015 Wallander
2015/0261323 A1 9/2015 Cui et al.
2015/0261339 A1 9/2015 Pettersson
2015/0271481 A1 9/2015 Guthrie et al.
2015/0277636 A1* 10/2015 Holmgren .......... G02B 19/0028 345/175
2015/0286698 A1 10/2015 Gagnier et al.
2015/0317036 A1 11/2015 Johansson et al.
2015/0324028 A1 11/2015 Wassvik et al.
2015/0324045 A1 11/2015 Chi et al.
2015/0331544 A1 11/2015 Bergstrom et al.
2015/0331545 A1 11/2015 Wassvik et al.
2015/0331546 A1 11/2015 Craven-Bartle et al.
2015/0331547 A1 11/2015 Wassvik et al.
2015/0332655 A1 11/2015 Krus et al.
2015/0339000 A1 11/2015 Lee et al.
2015/0346856 A1 12/2015 Wassvik
2015/0346911 A1 12/2015 Christiansson
2015/0363042 A1 12/2015 Krus et al.
2015/0373864 A1 12/2015 Jung
2016/0004898 A1 1/2016 Holz
2016/0026297 A1 1/2016 Shinkai et al.
2016/0026337 A1 1/2016 Wassvik et al.
2016/0034099 A1 2/2016 Christiansson et al.
2016/0041629 A1 2/2016 Rao et al.
2016/0050746 A1 2/2016 Wassvik et al.
2016/0062549 A1 3/2016 Drumm et al.
2016/0070415 A1 3/2016 Christiansson et al.
2016/0077616 A1 3/2016 Durojaiye et al.
2016/0092021 A1 3/2016 Tu et al.
2016/0103026 A1 4/2016 Povazay et al.
2016/0117019 A1 4/2016 Michiaki
2016/0124546 A1 5/2016 Chen et al.
2016/0124551 A1 5/2016 Christiansson et al.
2016/0147375 A1 5/2016 Bok
2016/0154531 A1 6/2016 Wall
2016/0154532 A1 6/2016 Campbell
2016/0154533 A1 6/2016 Eriksson et al.
2016/0179261 A1 6/2016 Drumm
2016/0202841 A1 7/2016 Christiansson et al.
2016/0209886 A1 7/2016 Suh et al.
2016/0216844 A1 7/2016 Bergstrom
2016/0224144 A1 8/2016 Klinghult et al.
2016/0239153 A1 8/2016 Holmgren
2016/0255713 A1 9/2016 Kim et al.
2016/0295711 A1 10/2016 Ryu et al.
2016/0299583 A1 10/2016 Watanabe
2016/0306501 A1 10/2016 Drumm et al.
2016/0328090 A1 11/2016 Klinghult
2016/0328091 A1 11/2016 Wassvik et al.
2016/0334942 A1 11/2016 Wassvik
2016/0342282 A1 11/2016 Wassvik
2016/0357348 A1 12/2016 Wallander
2017/0010688 A1 1/2017 Fahraeus et al.
2017/0031516 A1 2/2017 Sugiyama et al.
2017/0075476 A1 3/2017 Kwon
2017/0075484 A1 3/2017 Kali et al.
2017/0075494 A1 3/2017 Kwon
2017/0090090 A1 3/2017 Craven-Bartle et al.
2017/0102827 A1 4/2017 Christiansson et al.
2017/0115235 A1 4/2017 Ohlsson et al.
2017/0115758 A1 4/2017 Lee
2017/0115823 A1 4/2017 Huang et al.
2017/0123257 A1 5/2017 Zhao
2017/0139541 A1 5/2017 Christiansson et al.
2017/0147105 A1 5/2017 Kwon
2017/0160871 A1 6/2017 Drumm
2017/0177163 A1 6/2017 Wallander et al.
2017/0185230 A1 6/2017 Wallander et al.
2017/0220204 A1 8/2017 Huang et al.
2017/0293392 A1 10/2017 Christiansson et al.
2017/0308236 A1 10/2017 Lee
2017/0344185 A1 11/2017 Ohlsson et al.
2018/0031753 A1 2/2018 Craven-Bartle et al.
2018/0107373 A1 4/2018 Cheng
2018/0113569 A1 4/2018 Pommier
2018/0129354 A1 5/2018 Christiansson et al.
2018/0136788 A1 5/2018 He et al.
2018/0149792 A1 5/2018 Lee et al.
2018/0210572 A1 7/2018 Wallander et al.
2018/0225006 A1 8/2018 Wall
2018/0253187 A1 9/2018 Christiansson et al.
2018/0267672 A1 9/2018 Wassvik et al.
2018/0275788 A1 9/2018 Christiansson et al.
2018/0275830 A1 9/2018 Christiansson et al.
2018/0275831 A1 9/2018 Christiansson et al.

(56) References Cited

U.S. PATENT DOCUMENTS

| | | | |
|---|---|---|---|
| 2018/0314206 | A1 | 11/2018 | Lee et al. |
| 2019/0004668 | A1 | 1/2019 | Jeong et al. |
| 2019/0025984 | A1 | 1/2019 | Weilbacher et al. |
| 2019/0050074 | A1 | 2/2019 | Kocovski |
| 2019/0079638 | A1 | 3/2019 | Kocovski |
| 2019/0107923 | A1 | 4/2019 | Drumm |
| 2019/0146630 | A1 | 5/2019 | Chen et al. |
| 2019/0196657 | A1 | 6/2019 | Skagmo et al. |
| 2019/0196658 | A1 | 6/2019 | Skagmo et al. |
| 2019/0196659 | A1 | 6/2019 | Skagmo et al. |
| 2019/0220149 | A1 | 7/2019 | Eriksson |
| 2019/0227670 | A1 | 7/2019 | O'Cleirigh et al. |
| 2019/0235701 | A1 | 8/2019 | Han et al. |
| 2019/0258353 | A1 | 8/2019 | Drumm et al. |
| 2019/0324570 | A1 | 10/2019 | Kolundzjia et al. |
| 2019/0377431 | A1 | 12/2019 | Drumm |
| 2019/0377435 | A1 | 12/2019 | Piot et al. |
| 2020/0012408 | A1 | 1/2020 | Drumm et al. |
| 2020/0073509 | A1 | 3/2020 | Shih et al. |
| 2020/0098147 | A1 | 3/2020 | Ha et al. |
| 2020/0125189 | A1 | 4/2020 | Kim et al. |
| 2020/0159382 | A1 | 5/2020 | Drumm |
| 2020/0167033 | A1 | 5/2020 | Kim et al. |
| 2020/0249777 | A1 | 8/2020 | Hou et al. |
| 2020/0310621 | A1 | 10/2020 | Piot et al. |
| 2020/0341587 | A1 | 10/2020 | Drumm |
| 2020/0348473 | A1 | 11/2020 | Drumm |
| 2020/0387237 | A1 | 12/2020 | Drumm |
| 2022/0113834 | A1 | 4/2022 | Wittenberg |
| 2023/0168774 | A1 | 6/2023 | Kocovski |
| 2023/0315234 | A1 | 10/2023 | Kocovski |

FOREIGN PATENT DOCUMENTS

| | | | |
|---|---|---|---|
| CN | 1963613 | A | 5/2007 |
| CN | 201233592 | Y | 5/2009 |
| CN | 101174191 | A | 6/2009 |
| CN | 101644854 | A | 2/2010 |
| CN | 201437963 | U | 4/2010 |
| CN | 201465071 | U | 5/2010 |
| CN | 101882034 | | 11/2010 |
| CN | 102117155 | | 7/2011 |
| CN | 101019071 | B | 6/2012 |
| CN | 101206550 | B | 6/2012 |
| CN | 202661975 | U | 1/2013 |
| CN | 103123556 | A | 5/2013 |
| CN | 203189466 | U | 9/2013 |
| CN | 203224848 | U | 10/2013 |
| CN | 203386188 | U | 1/2014 |
| CN | 203453994 | U | 2/2014 |
| CN | 101075168 | B | 4/2014 |
| CN | 203720812 | U | 7/2014 |
| CN | 203825586 | U | 9/2014 |
| CN | 104407461 | A | 3/2015 |
| CN | 104808843 | A | 7/2015 |
| CN | 205015574 | U | 2/2016 |
| CN | 205384833 | U | 7/2016 |
| CN | 208506715 | U | 2/2019 |
| CN | 110114737 | A | 8/2019 |
| CN | 105320382 | B | 4/2021 |
| CN | 113010053 | A | 6/2021 |
| DE | 3511330 | C2 | 5/1988 |
| DE | 68902419 | T2 | 3/1993 |
| DE | 69000920 | T2 | 6/1993 |
| DE | 19809934 | A1 | 9/1999 |
| DE | 10026201 | A1 | 12/2000 |
| DE | 102010000473 | A1 | 8/2010 |
| EP | 0845812 | B1 | 6/1998 |
| EP | 0600576 | B1 | 10/1998 |
| EP | 0931731 | A1 | 7/1999 |
| EP | 1798630 | A2 | 6/2007 |
| EP | 0897161 | B1 | 10/2007 |
| EP | 2088501 | A1 | 8/2009 |
| EP | 1512989 | B1 | 9/2009 |
| EP | 2077490 | A3 | 1/2010 |
| EP | 1126236 | B1 | 12/2010 |
| EP | 2314203 | A1 | 4/2011 |
| EP | 2325735 | A2 | 5/2011 |
| EP | 2339437 | A3 | 10/2011 |
| EP | 2442180 | A1 | 4/2012 |
| EP | 2466428 | A2 | 6/2012 |
| EP | 2466429 | A1 | 6/2012 |
| EP | 2479642 | A1 | 7/2012 |
| EP | 1457870 | B1 | 8/2012 |
| EP | 2565770 | A2 | 3/2013 |
| EP | 2765622 | A2 | 8/2014 |
| EP | 2778849 | A1 | 9/2014 |
| EP | 2515216 | A1 | 3/2016 |
| EP | 3535640 | A1 | 9/2019 |
| EP | 3537269 | A1 | 9/2019 |
| FR | 2172828 | A1 | 10/1973 |
| FR | 2617619 | B1 | 1/1990 |
| FR | 2614711 | B1 | 3/1992 |
| FR | 2617620 | B1 | 9/1992 |
| FR | 2676275 | A1 | 11/1992 |
| GB | 1380144 | A | 1/1975 |
| GB | 2131544 | B | 3/1986 |
| GB | 2204126 | A | 11/1988 |
| JP | S 62159213 | A | 7/1987 |
| JP | H05190066 | A | 7/1993 |
| JP | 2000506655 | A | 5/2000 |
| JP | 2000172438 | A | 6/2000 |
| JP | 2000259334 | A | 9/2000 |
| JP | 2000293311 | A | 10/2000 |
| JP | 2003330603 | A | 11/2003 |
| JP | 2005004278 | A | 1/2005 |
| JP | 2008506173 | A | 2/2008 |
| JP | 2011530124 | A | 12/2011 |
| KR | 100359400 | | 7/2001 |
| KR | 100940435 | | 2/2010 |
| KR | 1020150125374 | A | 11/2015 |
| KR | 10-2016-0036169 | | 4/2016 |
| KR | 2018-0037749 | | 4/2018 |
| KR | 10-2005-0107424 | | 11/2025 |
| WO | WO 1984/003186 | A1 | 8/1984 |
| WO | WO 1999/046602 | A1 | 9/1999 |
| WO | WO 01/127867 | A1 | 4/2001 |
| WO | WO 01/84251 | A2 | 11/2001 |
| WO | WO 02/35460 | A1 | 5/2002 |
| WO | WO 02/077915 | A2 | 10/2002 |
| WO | WO 02/095668 | A1 | 11/2002 |
| WO | WO 03/076870 | A1 | 9/2003 |
| WO | WO 2004/032210 | A2 | 4/2004 |
| WO | WO 2004/081502 | A2 | 9/2004 |
| WO | WO 2004/081956 | A2 | 9/2004 |
| WO | WO 2005/026938 | A2 | 3/2005 |
| WO | WO 2005/029172 | A2 | 3/2005 |
| WO | WO 2005/029395 | A2 | 3/2005 |
| WO | WO 2005/125011 | A1 | 12/2005 |
| WO | WO 2006/095320 | A2 | 9/2006 |
| WO | WO 2006/124551 | A2 | 11/2006 |
| WO | WO 2007/003196 | A2 | 1/2007 |
| WO | WO 2007/058924 | A2 | 5/2007 |
| WO | WO 2007/112742 | A1 | 10/2007 |
| WO | WO 2008/004103 | A2 | 1/2008 |
| WO | WO 2008/007276 | A2 | 1/2008 |
| WO | WO 2008/017077 | A2 | 2/2008 |
| WO | WO 2008/034184 | A1 | 3/2008 |
| WO | WO 2008/039006 | A1 | 4/2008 |
| WO | WO 2008/068607 | A2 | 6/2008 |
| WO | WO 2006/124551 | B1 | 7/2008 |
| WO | WO 2008/017077 | A4 | 2/2009 |
| WO | WO 2009/048365 | A1 | 4/2009 |
| WO | WO 2009/077962 | A2 | 6/2009 |
| WO | WO 2009/102681 | A2 | 8/2009 |
| WO | WO 2009/137355 | A2 | 11/2009 |
| WO | WO 2010/006882 | A2 | 1/2010 |
| WO | WO 2010/006883 | A2 | 1/2010 |
| WO | WO 2010/006884 | A2 | 1/2010 |
| WO | WO 2010/006885 | A2 | 1/2010 |
| WO | WO 2010/006886 | A2 | 1/2010 |
| WO | WO 2010/015408 | A1 | 2/2010 |
| WO | WO 2010/046539 | A1 | 4/2010 |
| WO | WO 2010/056177 | A1 | 5/2010 |

(56) References Cited

FOREIGN PATENT DOCUMENTS

| | | | |
|---|---|---|---|
| WO | WO 2010/064983 | A2 | 6/2010 |
| WO | WO 2010/081702 | A2 | 7/2010 |
| WO | WO 2010/112404 | A1 | 10/2010 |
| WO | WO 2010/123809 | A2 | 10/2010 |
| WO | WO 2010/134865 | A1 | 11/2010 |
| WO | WO 2011/028169 | A1 | 3/2011 |
| WO | WO 2011/028170 | A1 | 3/2011 |
| WO | WO 2011/049511 | A1 | 4/2011 |
| WO | WO 2011/049512 | A1 | 4/2011 |
| WO | WO 2011/049513 | A1 | 4/2011 |
| WO | WO 2011/057572 | A1 | 5/2011 |
| WO | WO 2011/078769 | A1 | 6/2011 |
| WO | WO 2011/082477 | A1 | 7/2011 |
| WO | WO 2011/139213 | A1 | 11/2011 |
| WO | WO 2012/002894 | A1 | 1/2012 |
| WO | WO 2012/010078 | A1 | 1/2012 |
| WO | WO 2012/018176 | A2 | 2/2012 |
| WO | WO 2012/050510 | A1 | 4/2012 |
| WO | WO 2012/082055 | A1 | 6/2012 |
| WO | WO 2012/105893 | A1 | 8/2012 |
| WO | WO 2012/121652 | A1 | 9/2012 |
| WO | WO 2012/158105 | A2 | 11/2012 |
| WO | WO 2012/172302 | A1 | 12/2012 |
| WO | WO 2012/176801 | A1 | 12/2012 |
| WO | WO 2013/036192 | A1 | 3/2013 |
| WO | WO 2013/048312 | A2 | 4/2013 |
| WO | WO 2013/055282 | A2 | 4/2013 |
| WO | WO 2013/062471 | A2 | 5/2013 |
| WO | WO 2013/089622 | A2 | 6/2013 |
| WO | WO 2013/115710 | A2 | 8/2013 |
| WO | WO 2013/133756 | A1 | 9/2013 |
| WO | WO 2013/133757 | A2 | 9/2013 |
| WO | WO 2013/159472 | A1 | 10/2013 |
| WO | WO 2013/176613 | A2 | 11/2013 |
| WO | WO 2013/176614 | A2 | 11/2013 |
| WO | WO 2013/176615 | A2 | 11/2013 |
| WO | WO 2013191638 | A1 | 12/2013 |
| WO | WO 2014017973 | A1 | 1/2014 |
| WO | WO 2014/044181 | A1 | 3/2014 |
| WO | WO 2014/055809 | A1 | 4/2014 |
| WO | WO 2014/065601 | | 5/2014 |
| WO | WO 2014/086084 | A1 | 6/2014 |
| WO | WO 2014/098744 | A1 | 6/2014 |
| WO | WO 2014098740 | A1 | 6/2014 |
| WO | WO 2014098743 | A1 | 6/2014 |
| WO | WO 2014/104967 | A1 | 7/2014 |
| WO | WO 2015/029350 | A1 | 3/2015 |
| WO | WO 2015/123322 | A1 | 8/2015 |
| WO | WO 2015/175586 | A1 | 11/2015 |
| WO | WO 2015/199602 | A1 | 12/2015 |
| WO | WO 2016/130074 | A1 | 8/2016 |
| WO | WO 2018/066761 | | 4/2018 |
| WO | WO 2018/096430 | A1 | 5/2018 |
| WO | WO 2018/106172 | A1 | 6/2018 |
| WO | WO 2018/106176 | | 6/2018 |

OTHER PUBLICATIONS

Declaration of Darran Cairns Ph.D. Under 37 C.F.R. §42.100 Regarding U.S. Pat. No. 11,281,335 Oct. 6, 2023 (176 pages).

Petition for Inter Partes Review Under 37 C.F.R. § 42.100 in the Inter Partes Review of U.S. Pat. No. 10,775,935 Oct. 6, 2023 (125 pages).

Declaration of Darran Cairns Ph.D. Under 37 C.F.R. §42.100 Regarding U.S. Pat. No. 10,775,935 Oct. 6, 2023 (170 pages).

Ahn Y. et al. "A slim and wide multi-touch tabletop interface and its applications" BigComp2014 IEEE 2014 in 6 pages.

Chou N. et al. "Generalized pseudo-polar Fourier grids and applications in regfersting optical coherence tomography images" 43rd Asilomar Conference on Signals Systems and Computers Nov. 2009 in 5 oaaes.

Fihn M. "Touch Panel—Special Edition" Veritas et Visus Nov. 2011 in 1 page.

Fourmont K. "Non-Equispaced Fast Fourier Transforms with Applications to Tomography" Journal of Fourier Analysis and Applications vol. 9 Issue 5 2003 in 20 pages.

Iizuka K. "Boundaries Near-Field Optics and Near-Field Imaging" Elements of Photonics vol. 1: In Free Space and Special Media Wiley & Sons 2002 in 57 pages.

International Search Report for International App. No. PCT/SE2017/050102 dated Apr. 5, 2017, in 4 pages.

Johnson M. "Enhanced Optical Touch Input Panel" IBM Technical Disclosure Bulletin 1985 in 3 pages.

Kak et al. "Principles of Computerized Tomographic Imaging" Institute of Electrical Engineers Inc. 1999 in 333 pages.

The Laser Wall MIT 1997 http://web.media.mit.edu{joep/SpectrumWeb/captions/Laser.html.

Liu J. et al. "Multiple touch points identifying method involves starting touch screen driving specific emission tube and computing and transmitting coordinate of touch points to computer system by direct lines through interface of touch screen" 2007 in 25 pages.

Natterer F. "The Mathematics of Computerized Tomography" Society for Industrial and Applied Mathematics 2001 in 240 pages.

Natterer F. et al. "Fourier Reconstruction" Mathematical Methods in Image Reconstruction Society for Industrial and Applied Mathematics 2001 in 12 pages.

Paradiso J.A. "Several Sensor Approaches that Retrofit Large Surfaces for Interactivity" ACM Ubicomp 2002 Workshop on Collaboration with Interactive Walls and Tables 2002 in 8 pages.

Tedaldi M. et al. "Refractive index mapping of layered samples using optical coherence refractometry" Proceedings of SPIE vol. 7171 2009 in 8 pages.

Supplementary European Search Report for European App. No. EP 16759213 dated Oct. 4, 2018, in 9 pages.

Extended European Search Report for European App. No. 16743795.3 dated Sep. 11, 2018, in 5 pages.

International Search Report for International App. No. PCT/SE2017/051224 dated Feb. 23, 2018, in 5 pages.

International Search Report for International App. No. PCT/IB2017/057201 dated Mar. 6, 2018, in 4 pages.

Extended European Search Report in European Application No. 19165019.1 dated Jul. 18, 2019, in 8 pages.

International Preliminary Report on Patentability received in International Application No. PCT/SE2017/051233 dated Jun. 11, 2019, in 6 pages.

International Search Report for International App. No. PCT/SE2018/050070 dated Apr. 25, 2018, in 4 pages.

Extended European Search Report in European Application No. 17750516.1 dated Jul. 16, 2019, in 5 pages.

Report on the Filing or Determination of an Action Regarding a Patent or Trademark. For U.S. Pat. No. 10,282,035 U.S. District of Delaware dated Dec. 10, 2019, in 1 page.

Civil Cover *Sheet Flatfrog Laboratories AB* v. *Promethean Ltd. and Promethean Inc.*, dated Dec. 10, 2019, in 1 page.

Complaint for Patent Infringement *Flatfrog Laboratories AB* v. *Promethean Ltd. and Promethean Inc. C.A.* No. 19-2246 dated Dec. 10, 2019, in 83 pages.

Executed Summons in a Civil Action to Promethean Inc. C.A. No. 19-2246 dated Dec. 10, 2019, in 2 pages.

Summons in a Civil Action to Promethean Inc. C.A. No. 19-2246 dated Dec. 10, 2019, in 2 pages.

Summons in a Civil Action to Promethean Ltd. C.A. No. 19-2246 dated Dec. 10, 2019, in 2 pages.

Defendants' Answer to Second Amended Complaint and Defendant Promethean Inc.'s Counterclaims Against FlatFrog Laboratories AB. C.A. No. 19-2246 dated May 22, 2020, in 29 pages.

Extended European Search Report in European Application No. 16873465.5 date Jun. 25, 2019, in 9 pages.

Extended European Search Report for European App. No. 18772370.5 dated Dec. 9, 2020, in 8 pages.

Extended European Search Report for European App. No. 18772178.2 dated Dec. 10, 2020, in 8 pages.

Extended European Search Report for European App. No. 18774232.5 dated Dec. 21, 2020, in 9 pages.

(56) References Cited

OTHER PUBLICATIONS

Invalidity Notification in Chinese Application No. 201820923674.2 Dated Sep. 9, 2025 (91 pages).

* cited by examiner

TOUCH DEVICE

INCORPORATION BY REFERENCE TO ANY PRIORITY APPLICATIONS

Any and all applications for which a foreign or domestic priority claim is identified in the Application Data Sheet as filed with the present application are hereby incorporated by reference under 37 CFR 1.57.

BACKGROUND

Field of the Invention

This invention relates in general to the field of optical touch sensitive systems. More particularly, the invention relates to a curved plate and an assembly for holding a plate of the system, such as a glass plate, relative to a panel such that curvature of the plate is controlled. The invention also relates to a method for assembling a plate of an optical touch sensitive system with a panel (such as a display panel) in such a way that curvature is controlled.

Background of the Invention

In one category of touch sensitive panels known as above surface optical touch systems and known from e.g. U.S. Pat. No. 4,459,476, a plurality of optical emitters and optical receivers are arranged around the periphery of a touch surface to create a grid of intersecting light paths above the touch surface. Each light path extends between a respective emitter/receiver pair. An object that touches the touch surface will block certain ones of the light paths. Based on the identity of the receivers detecting a blocked light path, a processor can determine the location of the intercept between the blocked light paths. This type of system is only capable of reliably detecting the location of one object (single-touch detection). Further, the required number of emitters and receivers, and thus cost and complexity, increases rapidly with increasing surface area and/or spatial resolution of the touch panel.

In a variant, e.g. shown in WO2006/095320, each optical emitter emits a beam of light that diverges across the touch surface, and each beam is detected by more than one optical receiver positioned around the periphery of the touch surface.

These systems typically direct light to travel across the surface of the touch surface at a height of up to 5 mm.

Other above surface touch sensitive systems use tomographic touch imaging for sensing a touch, e.g. as described in WO2016/130074. Such systems allow for directing the light much closer to the touch surface, which in turn allows for significant improvements in accuracy and requires a lower light budget. The light is typically directed at a height of up to about 1 mm above the plate.

Typically, the touch surface is a glass plate. In systems where the light is directed closer to the touch surface, distortions in the plate have a disproportionally large effect on the light signal. Therefore, glass plates as used in previously known above surface optical touch systems are unsuitable when the light is transmitted closer to the plate, since the accuracy of the system is impaired by the distortions in the plate.

Additionally, a frame for assembly of the plate of the optical touch sensitive system and a panel, such as an LCD panel, may introduce distortion in the form of uncontrolled warpage, i.e. a twist or curve in the plate is introduced even if it is usually flat. The uncontrolled warpage may even block the light transmitted across the plate. This is due to uncontrolled twisting of the frame as such when it is attached to the panel.

Although not described in relation to touch systems, methods of minimizing glass warpage are known from the window industry and from the display panel industry. Such solutions include pre-bent glass in order to control warpage. However, such solutions are unsuitable/insufficient for touch sensitive systems since they typically require bulky frames at the border of the glass and/or pressure points closer to the center of the panel where force may be applied to control the shape of the glass. These solutions are unsuitable where a minimal/lightweight border bezel is required, and no supporting objects may touch the glass further in than at the borders. Additionally, pre-bent glass is expensive and fragile to transport.

Therefore, an improved frame assembly for holding a plate of an optical touch sensitive system relative to a panel would be advantageous and in particular allowing for improved precision, increased compactness, cost-effectiveness, and/or controlled curvature would be advantageous. Further, a touch panel having a shape conducive to transmitting as much light from the emitters as possible to the detectors is needed.

SUMMARY OF THE INVENTION

Accordingly, embodiments of the present invention preferably seek to mitigate, alleviate or eliminate one or more deficiencies, disadvantages or issues in the art, such as the above-identified, singly or in any combination by providing an assembly, a method for assembling, and a kit of frame elements according to the appended patent claims.

A first embodiment of the invention describes an assembly for holding and controlling curvature of a plate for an optical touch sensitive system, comprising a first frame element extending in a first plane and configured to extend at least partially around a panel; at least one second frame element extending in a second plane and forming a support portion for the plate, and at least one spacing element positioned at least partially between the support portion and the first frame element, the spacing element being configured to control a curvature of the first frame element, and wherein the at least one second frame element is configured to engage the plate at the support portion, is attached to the first frame element, and wherein the shape and/or position of the second frame element is controlled by the curvature of the first frame element with said spacing element, to control a curvature of the plate.

A second embodiment of the invention describes a method for assembling a panel and a plate for an optical touch sensitive system, comprising: providing a first frame element extending in a first plane and configured to extend at least partially around a panel; providing at least one second frame element forming a support portion for the plate; supporting the plate by the support portion; attaching the second frame element to the first frame element such that the support portion extends at least partially in a second plane generally opposite at least a portion of the first frame element and is spaced apart from the first plane; and controlling a curvature of the first frame element with a spacing element attached to the first frame element and thereby tilting the support portion to control a curvature of the plate.

A third embodiment of the invention describes a kit of frame elements for assembling a panel and a plate for a touch sensitive system, comprising: a first frame element extending in a first plane; at least one second frame element forming a support portion for the plate and being attachable to the first frame element, and a spacing element adjustably attachable to the first frame element; wherein at least a portion of the support portion is tiltable, by the spacing element, relative to the first frame element to extend in the second plane, which is curved.

Some embodiments of the invention provide for controlling curvature of a plate for an optical touch sensitive system such that it does not occur when the plate is assembled with a panel. This prevents distortion in the plate from affecting a light signal transmitted across the plate, which in turn allows improvements in accuracy and lower light budget of the system. Additionally, or alternatively, embodiments provide for controlling curvature such that the field of view, for a detector receiving light from a light emitter of the touch sensitive system, is increased compared to a substantially flat plate. Again, the improved field of view provides for improved accuracy of the touch sensitive system and allows for a better light budget. Furthermore, embodiments provide for an assembly that is compact at the same time as curvature may be controlled. Also, the curvature may be controlled without contacting the center of the plate.

A fourth embodiment of the invention describes a touch sensing apparatus, comprising a touch surface; a set of emitters arranged around the touch surface to emit first beams of light to propagate across the touch surface, a set of light detectors arranged around the touch surface to receive light from the first set of emitters, wherein each light detector is arranged to receive light from more than one emitter; a processing element configured to determine, based on output signals of the set of light detectors, the position of an object on the touch surface, wherein the touch surface is curved in a first axis according to a first parabola.

It should be emphasized that the term "comprises/comprising" when used in this specification is taken to specify the presence of stated features, integers, steps or components but does not preclude the presence or addition of one or more other features, integers, steps, components or groups thereof.

BRIEF DESCRIPTION OF THE DRAWINGS

These and other aspects, features and advantages of which embodiments of the invention are capable of will be apparent and elucidated from the following description of embodiments of the present invention, reference being made to the accompanying drawings, in which.

DETAILED DESCRIPTION OF THE PREFERRED EMBODIMENT

Figure 1:
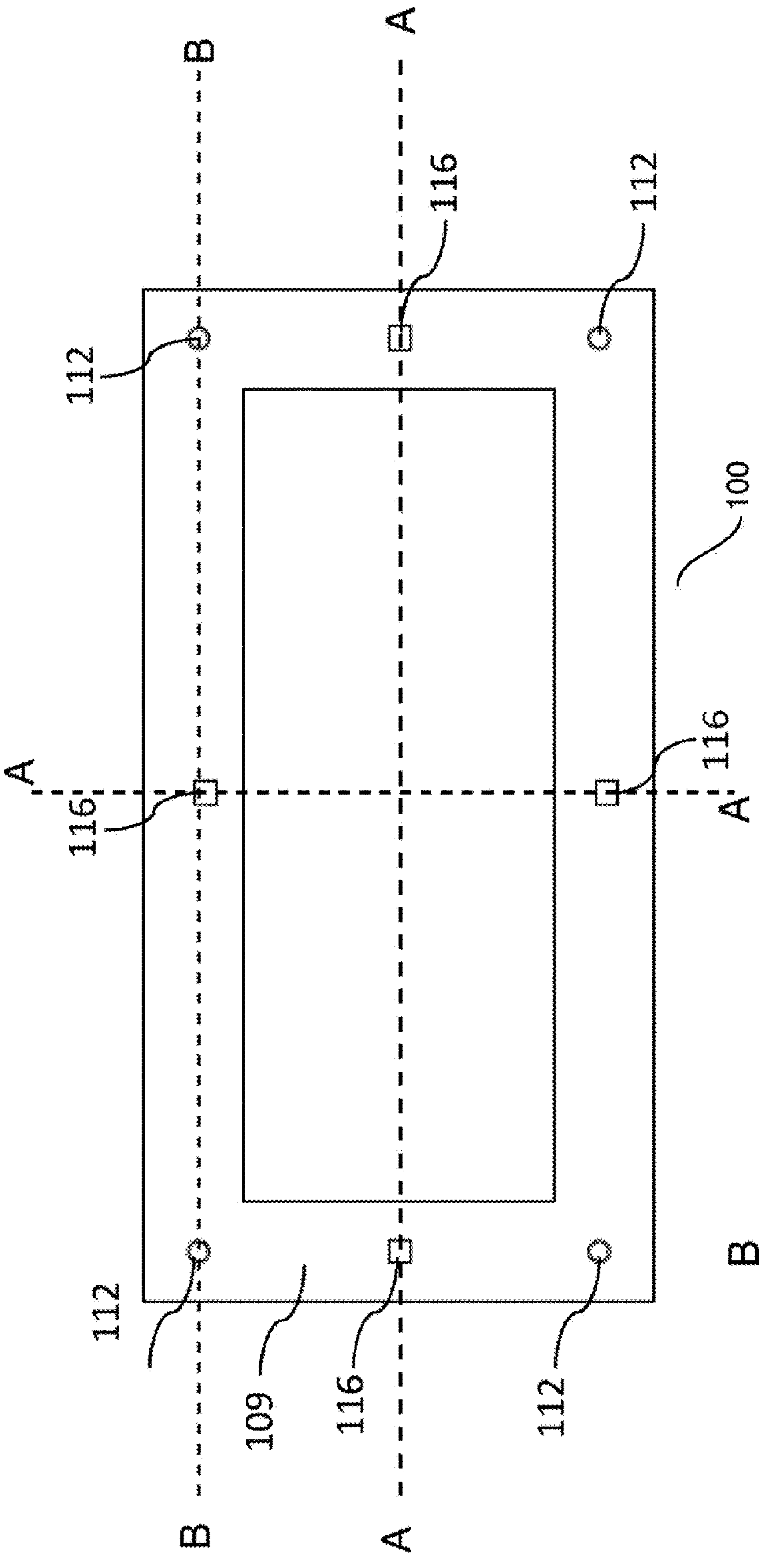
FIG. 1 is a top view of the first frame element showing cross-sectional axes A-A and B-B.

Specific embodiments of the invention will now be described with reference to the accompanying drawings. This invention may, however, be embodied in many different forms and should not be construed as limited to the embodiments set forth herein; rather, these embodiments are provided so that this disclosure will be thorough and complete, and will fully convey the scope of the invention to those skilled in the art. The terminology used in the detailed description of the embodiments illustrated in the accompanying drawings is not intended to be limiting of the invention. In the drawings, like numbers refer to like elements.

In optical touch sensitive systems, a plate 2 of the system, such as a glass plate may be arranged opposite a panel 1, such as an LCD panel or additional frame. The plate 2 is normally substantially flat. The perimeter of the plate 2 after integration is a concern: the four sides/edges of the plate 2 must all be plane or slightly concave as seen from the touch surface, i.e. the side of the plate 2 above which light is transmitted. An aspect of this is to ensure that the mechanical parts that hold or support the perimeter of the plate 2 are free from convexity. Sometimes, there are several components that are involved in holding the plate 2 (back cover, carriers, edge cover, screw bosses etc.) The stiffer component of the assembly, the more it will govern the final shape of the plate 2.

In prior art solutions, the frame that holds the plate 2 at the edge/perimeter may introduce some twist (the corners will not lay perfectly on a flat plane) to the plate. Twist may induce convexity along the plate diagonals and should thus be minimized or avoided. The twist tolerance depends, e.g., on glass specification, product, size, shape of integrated glass perimeter, and on how a VESA mount is attached.

FIG. 1 shows an embodiment of a frame assembly 100, 200 that prevents inducement of convexity along the plate, such as along the plate edges and/or diagonals. Some embodiments avoid convexity and may even induce concavity to further improve the touch system. Frame 109 is formed from first frame element 102. Attachment element 112 and spacing element 116 are described in the embodiments below.

According to some embodiments of the invention, an assembly 100, 200, which is configured to hold or support the plate 2 and the panel 1, applies a controlled force to the plate 2 such that curvature of the plate 2 is controlled. In the embodiments illustrated in FIGS. 2*a*-2*c* and 3*a*-3*d*, the force applies a torque to a support portion 101*a*, 101*b* for the plate 2. In the embodiments of FIGS. 4*a*-4*c*, the force is substantially straight and perpendicular to the plate 2. In the following, the embodiments of FIGS. 2*a*-2*c*, 3*a*-3*d*, 4*a*-4*c*, and 5*a*-5*g* will be described separately. However, these embodiments may be combined to provide further embodiments, such as the combination illustrated in FIGS. 6*a*-6*c*.

FIGS. 2*a*-2*d* illustrate embodiments wherein the frame assembly 100 comprises a first frame element 102 and at least one second frame element 103*a*, 103*b*. The first frame element 102 may form a rear bracket frame that extends at least partially over the backside of the panel 1. The second frame element 103*a*, 103*b* may form a holder or support bracket. Furthermore, second frame element 103*a*, 103*b* may extend along at least a portion of a perimeter of the plate 2 and/or the panel 1. Separate second frame elements 103*a*, 103*b* may extend at least partially along the perimeter of different sides of the plate 2 and/or panel 1. For example, two second frame elements 103*a*, 103*b* may extend along opposing perimeters of the plate 2 and/or panel 1. Alternatively, four second frame elements 103*a*, 103*b* may extend along the perimeter of the plate 2 and/or panel 1, i.e. one along each side of a rectangular plate 2 and/or panel 1.

As is illustrated in FIGS. 4*a*-4*c*, the panel 1 may be held between the first frame element 102 and the second frame element 103*a*, 103*b*. The plate 2 may be supported or held at a first side of a portion of the second frame element 103*a*, 103*b* forming the support portion 101*a*, 101*b*. The panel 1 may be held or supported by a second side of the support portion 101*a*, 101*b*, which forms a support portion for the panel 1. An adhesive 104, such as an adhesive tape, may be arranged between the support portion 101*a*, 101*b* and the plate 2. A gasket 105 may be arranged between the support portion 101*a*, 101*b* and the panel 1.

In one embodiment, elements 102, 103 (shown in the figure as comprising elements 103*a* and 103*b*) are formed from a single piece.

The second frame element 103*a*, 103*b* may be attached to the first frame element 102.

In the embodiments of FIGS. 2*a*-2*c* and 3*a*-3*d*, the second frame element 103*a*, 103*b*, is attached to the first frame element 102 by at least one attachment member 106*a*, 106*b*, such as a screw, a weld, a rivet etc. Therefore, the second frame element 103*a*, 103*b* may be rigidly attached to the first frame element 102.

The first frame element 102 may comprise a flange 107*a*, 107*b* that extends at the perimeter of the first frame element 102. Similarly, the second frame element 103*a*, 103*b* may comprise a flange 108*a*, 108*b*. When assembled, the flange 107*a*, 107*b* of the first frame element 102 may be arranged in abutment with the flange 108*a*, 108*b* of the second frame element 103*a*, 103*b*. The flange 107*a*, 107*b* of the first frame element 102 may be held together with the flange 108*a*, 108*b* of the second frame element 103*a*, 103*b* by the attachment member 106*a*, 106*b*.

The first frame element 102 may form a frame 109 (shown in FIG. 1) that extends in a first plane. The frame 109 is configured to extend at least partially around a first side of a panel 1. The first side of the panel 1 may be the backside of the panel 1. In some embodiments, the frame 109 has a width, such as 3-10 cm. The frame 109 may extend from the edges of the first side towards the center of the first side of the panel 1. Therefore, the frame 109 may be rectangular, and made from a single piece of material.

Figure 3A:
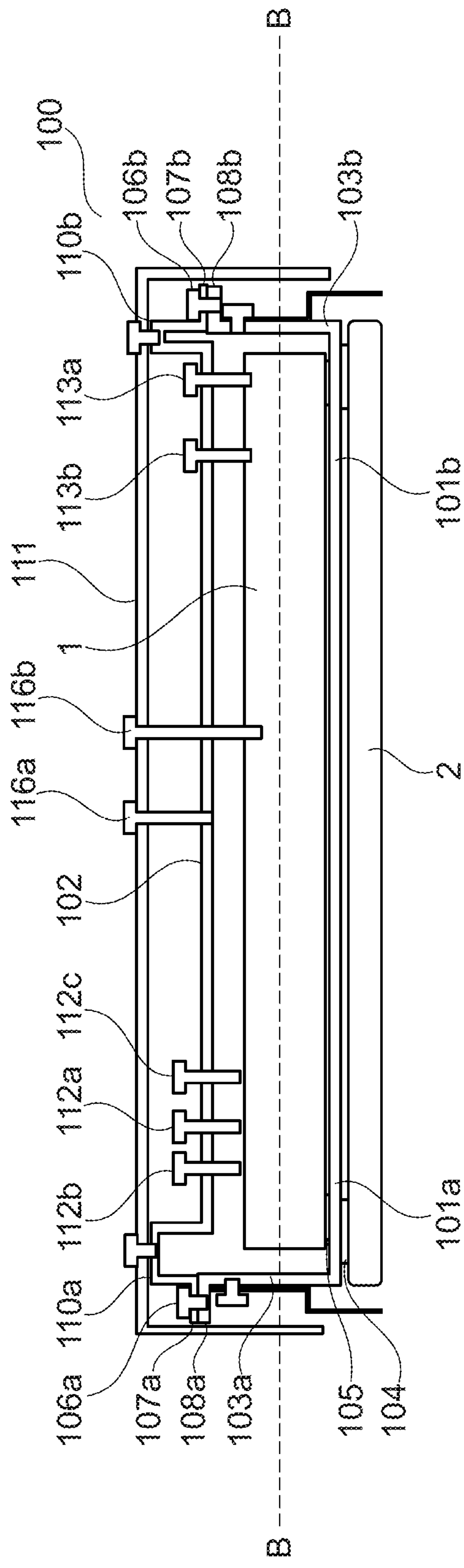
FIG. 3*a* is a schematic illustration showing the cross-section axis B-B of FIG. 1 of the assembly with the second frame element relative to the first frame element and holding the plate in a flat plane.
Figure 3B:
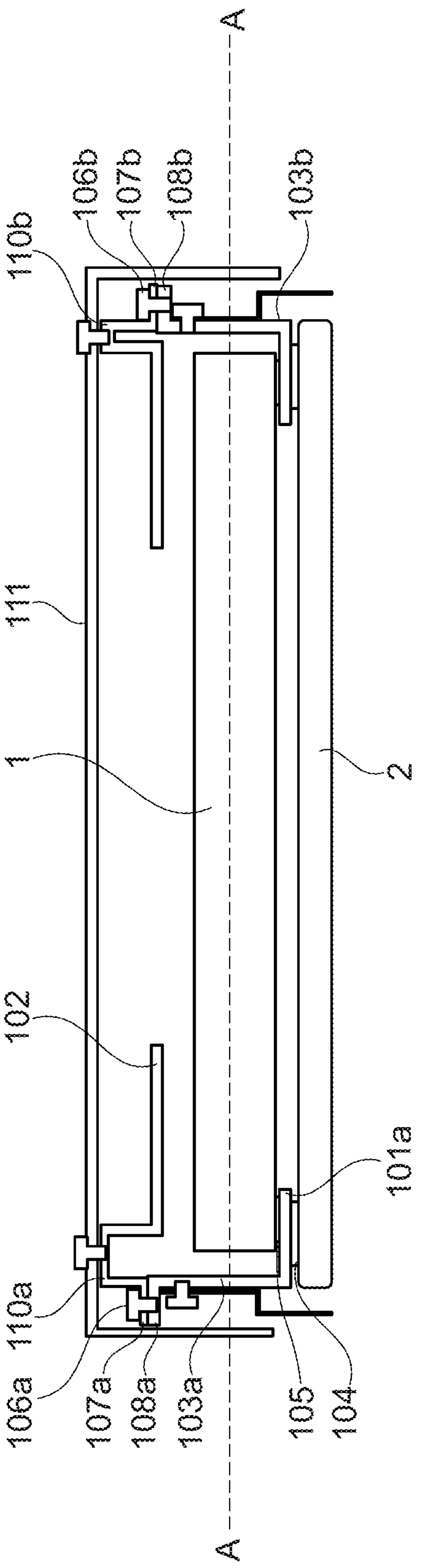
FIG. 3*b* is a schematic illustration showing the cross-section axis A-A of FIG. 1 of the assembly with the second frame element relative to the first frame element and holding the plate in a flat plane.
Figure 4A:
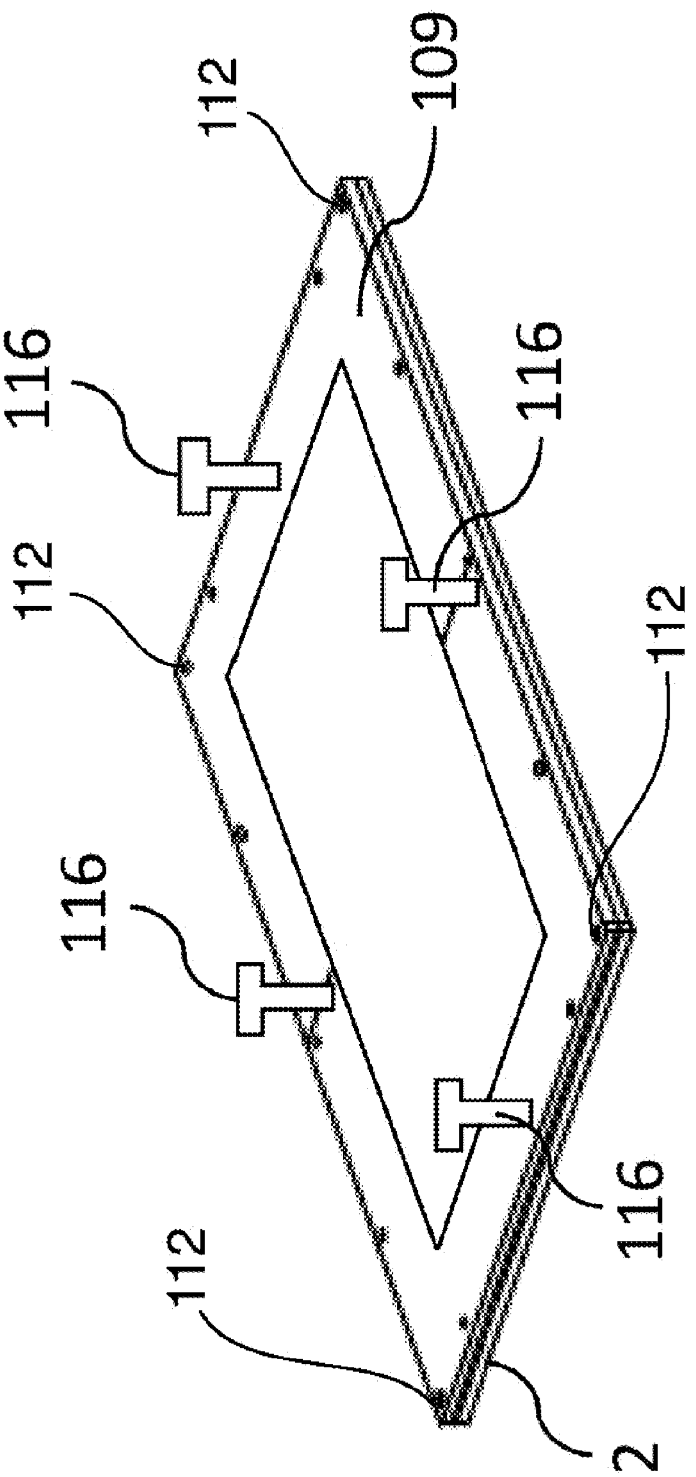
FIG. 4*a* is a perspective view of the first frame element.
Figure 4B:
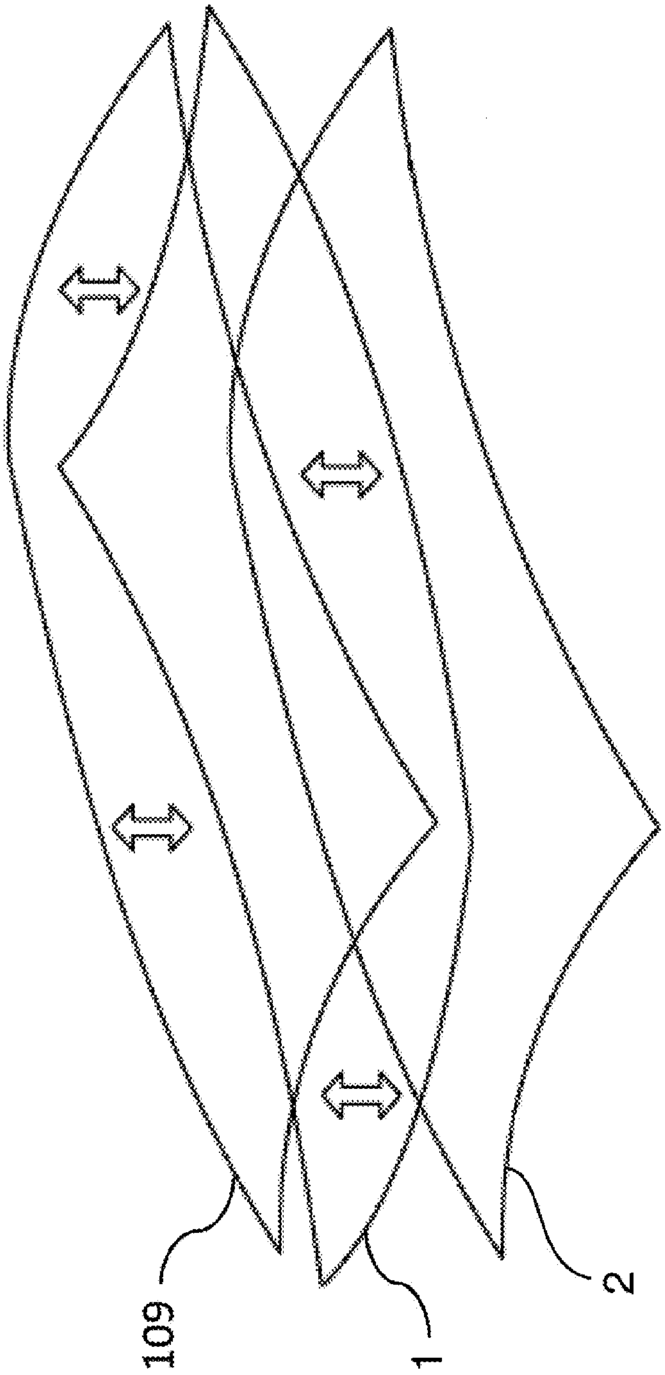
FIG. 4*b* is a schematic illustration of the panel in a convex shape and the frame of the first frame element in a concave shape, including plate 2 also controlled into a concave shape.
Figure 4C:
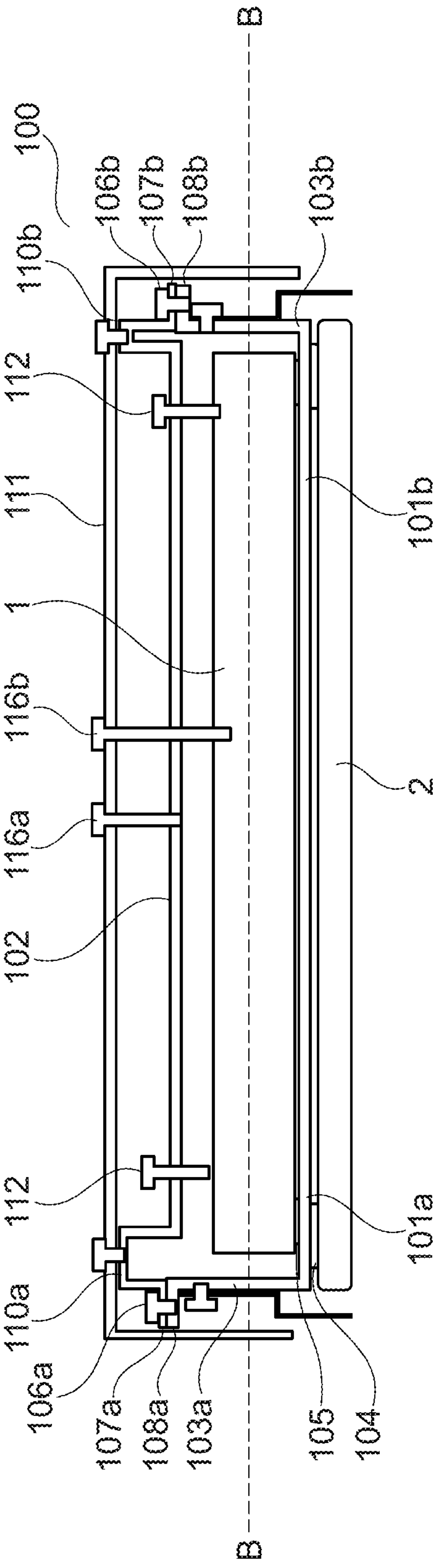
FIG. 4*c* is a side view showing screws 116*a* and 116*b;*

As is illustrated in FIGS. 3*a* and 3*b*, the assembly 100 may comprise at least one support area 110*a*, 110*b* for supporting a back cover 111. The support area 110*a*, 110*b* may extend in a plane that is substantially parallel to the first plane, in which the frame 109 extends. The support area 110*a*, 110*b* may be located further away from the support portion 101*a*, 101*b* of the second frame element 103*a*, 103*b* than the frame 109, such that the frame 109 and the back cover 111 are spaced apart. In the illustrated embodiment, the support area 110*a*, 110*b* is provided between the flange 107*a*, 107*b* and the frame 109 of the first frame element 102. The back cover 111 may be attached to the support area 110*a*, 110*b*, e.g. by attachment elements, such as screws.

In other embodiments, the support area 110*a*, 110*b* is provided by the flange 108*a*, 108*b* of the second frame element 103*a*, 103*b*. The flange 107*a*, 107*b* of the first frame element 102 may be connected to the second frame element 103*a*, 103*b* between the flange 108*a*, 108*b* and the support portion 101*a*, 101*b* of the second frame element 103*a*, 103*b*.

The second frame element 103*a*, 103*b* may form the support portion 101*a*, 101*b*. For example, the second frame element 103*a*, 103*b* may form an elongated member that is at least partly L-shaped in cross-section. When assembled, the second frame element 103*a*, 103*b* may extend along the perimeter of the panel 1, and wrap around the perimeter of the panel such that the support portion 101*a*, 101*b* extends at least partially in a second plane generally opposite the frame 109 and spaced apart from the first plane. Thereby the second frame element 103*a*, 103*b* is configured to extend at least partially at a second side of the panel 1, e.g. at a front side of the panel 1.

In some embodiments, the second frame element 103*a*, 103*b* has a first portion and a second portion. The first portion may be provided at an angle relative to the second portion. The second portion may form the support portion 101*a*, 101*b* and be configured to extend in the second plane opposite the frame 109. The first portion may extend between the second portion and the first frame element 102. Also, the first portion may extend along the edge or side surface of the plate 2 when assembled. The first frame element 102 may be connected to the first portion of the second frame element 103*a*, 103*b*. The first portion may be substantially perpendicular to the second portion.

Figure 3C:
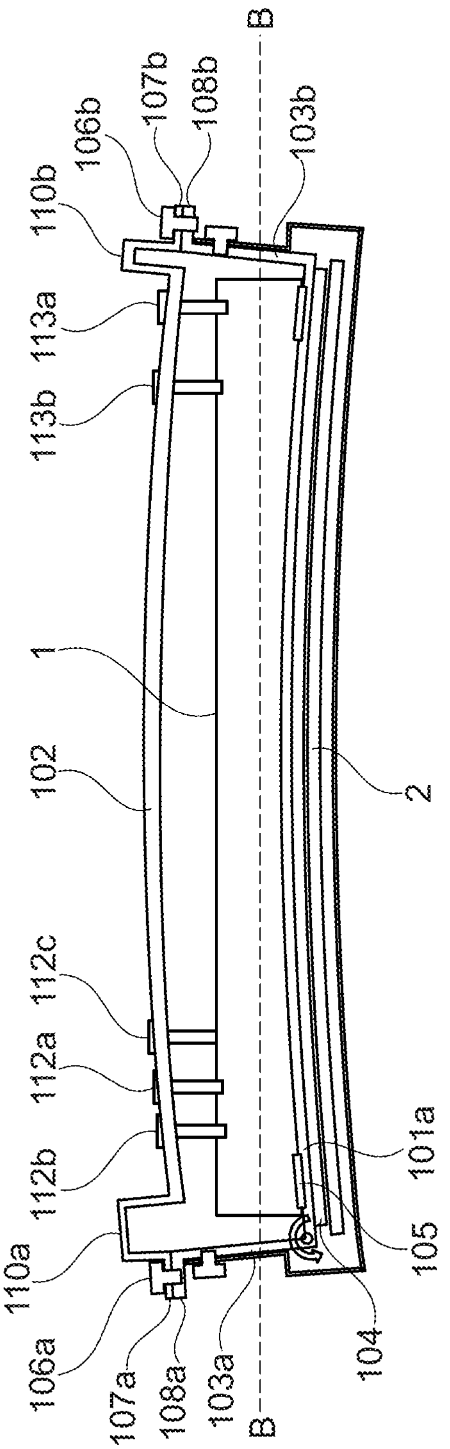
FIG. 3*c* is a schematic view (cross section) showing the cross-section axis B-B of FIG. 1 of the assembly with the second frame element warped relative to the first frame element and holding the plate in a curved plane that is concave.
Figure 3D:
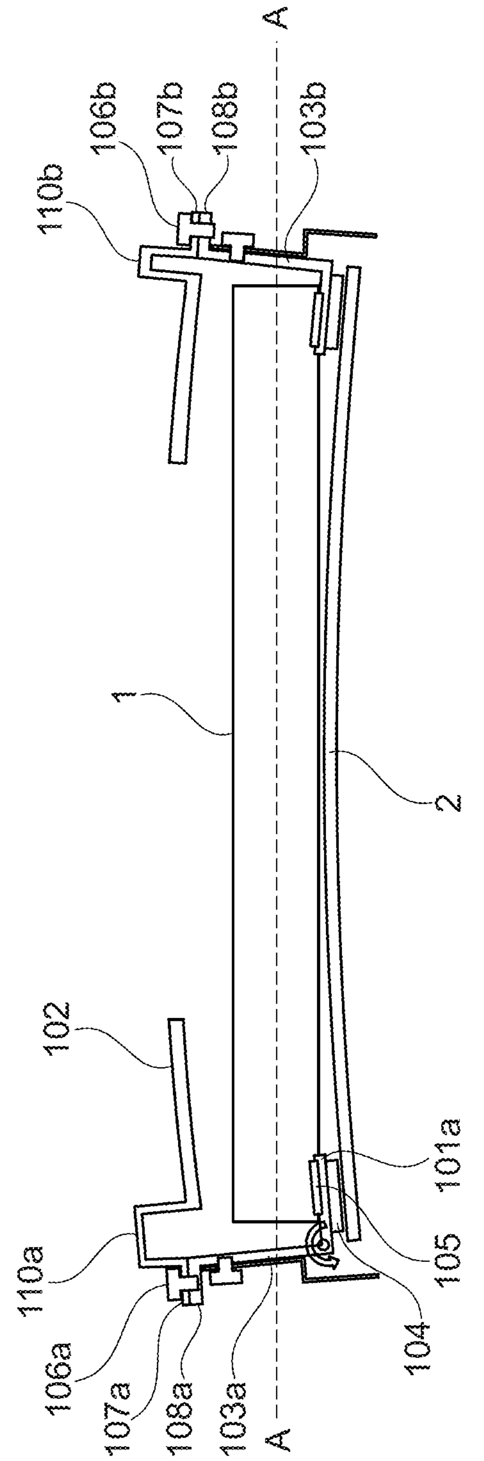
FIG. 3*d* is a schematic view (cross section) showing the cross-section axis A-A of FIG. 1 of the assembly with the second frame element warped relative to the first frame element and holding the plate in a curved plane that is concave.

As is illustrated in FIGS. 3*a*-3*d*, the first frame element 102 may be attached to the first portion of the second frame element 103*a*, 103*b* such they are fixed relative to each other. Furthermore, the second frame element 103 is tiltable relative to the first frame element 102. A force applied to the first frame element 102 is transferred to the second frame element 103 such that the support portion 101*a*, 101*b* is tilted towards the first frame element 102. Thus, a torque may control tilt of the second portion of the second frame element 103*a*, 103*b*, i.e. the support portion 101*a*, 101*b* that supports the plate 2, relative to the first frame element 102, which is illustrated with a curved arrow in FIGS. 3*c* and 3*d*. In some embodiments, the angle of tilt of the support portion 101*a*, 101*b* is controlled to be neutral, i.e. the angle of tilt of the support portion 101*a*, 101*b* is controlled such that it is substantially parallel with the panel 1 and/or controls the plate 2 to be in a flat plane, as is illustrated in FIGS. 3*a* and 3*b*. In other embodiments, the angle of tilt of the support portion 101*a*, 101*b* is controlled to be negative relative to the touch surface, i.e. the angle of tilt of the support portion 101*a*, 101*b* is controlled such that the free end of the support portion 101*a*, 101*b* is tilted towards the frame 109, as is illustrated in FIGS. 3*c* and 3*d*. In the latter case, the plate 2 is given a slightly concave shape, i.e. in the direction from the touch surface of the plate 2 towards the panel 1. In each of these cases curvature is controlled such that the field of view, for a detector receiving light from a light emitter of the touch sensitive system, is improved since convexity in the plate is avoided. Again, improved field of view provides for improved accuracy of the touch sensitive system and allows for lower light budget. Furthermore, since the support portion 101*a*, 101*b* only needs to extend a short distance over the plate 2 at the perimeter the assembly is compact at the same time as curvature may be controlled. Also, curvature may be controlled without contacting the center of the plate. When the concavity is applied, the sensitivity of the system may be even further improved.

FIGS. 2*a*-2*d* and 3*a*-3*d* illustrate embodiments of an attachment element 112 for attaching the first frame element 102 to the panel. A plurality of attachment elements 112 (e.g. as shown in triplicate as elements 112*a*, 112*b*, and 112*c*) may be arranged around the frame 109, such as at each corner of the frame 109, which is illustrated as circles in FIG. 4*a*. Each attachment element may comprise a group of screws 112*a*, 112*b*, 112*c*, 113*a*, 113*b*. Each screw may be arranged in a hole of the frame 109, which may be threaded. Each attachment element may comprise at least two screws 112*a*, 112*b*, 112*c*, 113*a*, 113*b*. At least one of the screws 112*a*, 113*a* may be arranged to displace the frame 109 away from panel 1, which is indicated with an arrow in FIG. 2*d* e.g. by having a thread in the frame 109 and pushing on the panel 1. At least one other of the screws 112*b*, 112*c*, 113*b* may be arranged to displace the frame 109 towards the panel 1, which is also indicated with an arrow in FIG. 2*d*. e.g. by having a thread in the panel and a hole in frame 109.

Figure 2A:
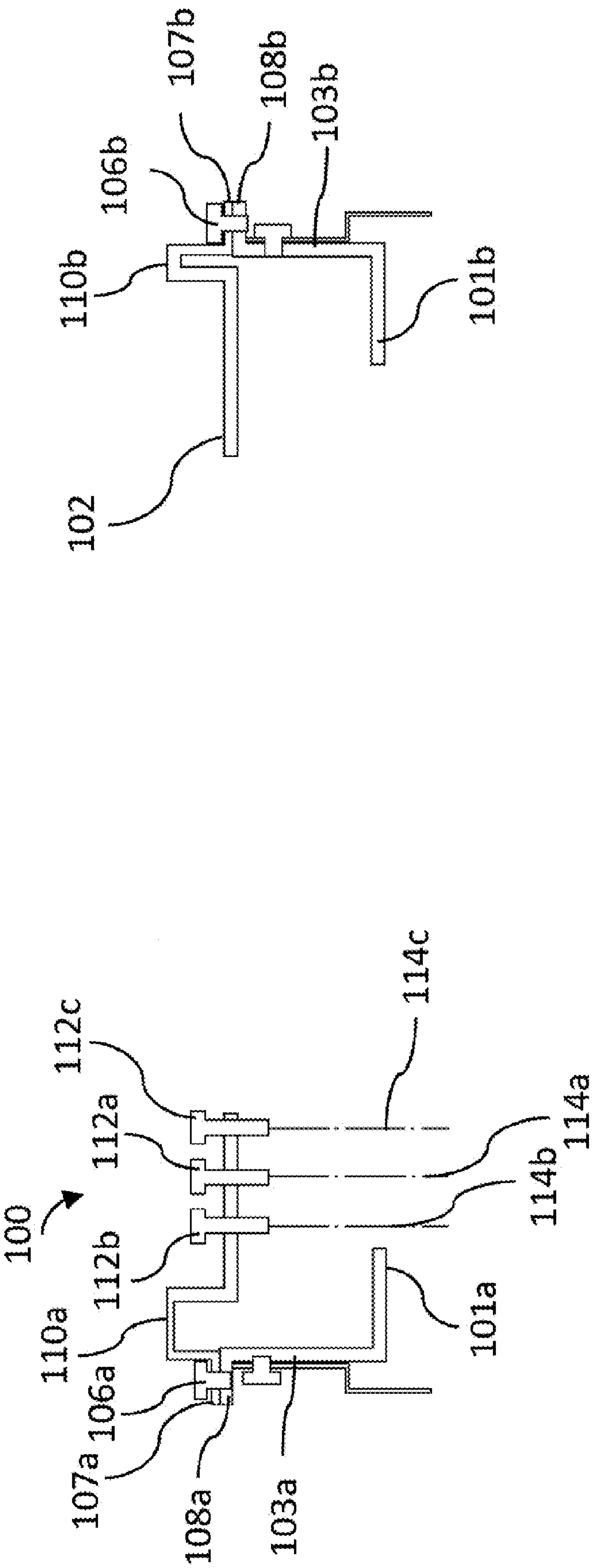
FIGS. 2*a*-2*d* are cross-sectional views of embodiments of assemblies.

FIG. 2*a* illustrates an embodiment wherein each attachment element comprises at least three screws 112*a*, 112*b*, 112*c*. All three screws 112*a*, 112*b*, 112*c* are arranged closer to a center of the first frame element 102 than a perimeter of the support portion 101*a*, 101*b*, i.e. an imaginary extension 114*a*, 114*b*, 114*c* of the longitudinal axis of each screw 112*a*, 112*b*, 112*c* passes outside the support portion 101*a*, 101*b* when viewed in cross-section, as is illustrated in FIG. 2*a*. In the illustrated embodiment, a first screw 112*a* is arranged between a second screw 112*b* and a third screw 112*c*. FIG. 2*a* only illustrates one group of screws. However, a group of screws may be arranged at any location around the frame 109 to attach the first frame element 102 to the panel 1.

Figure 2B:
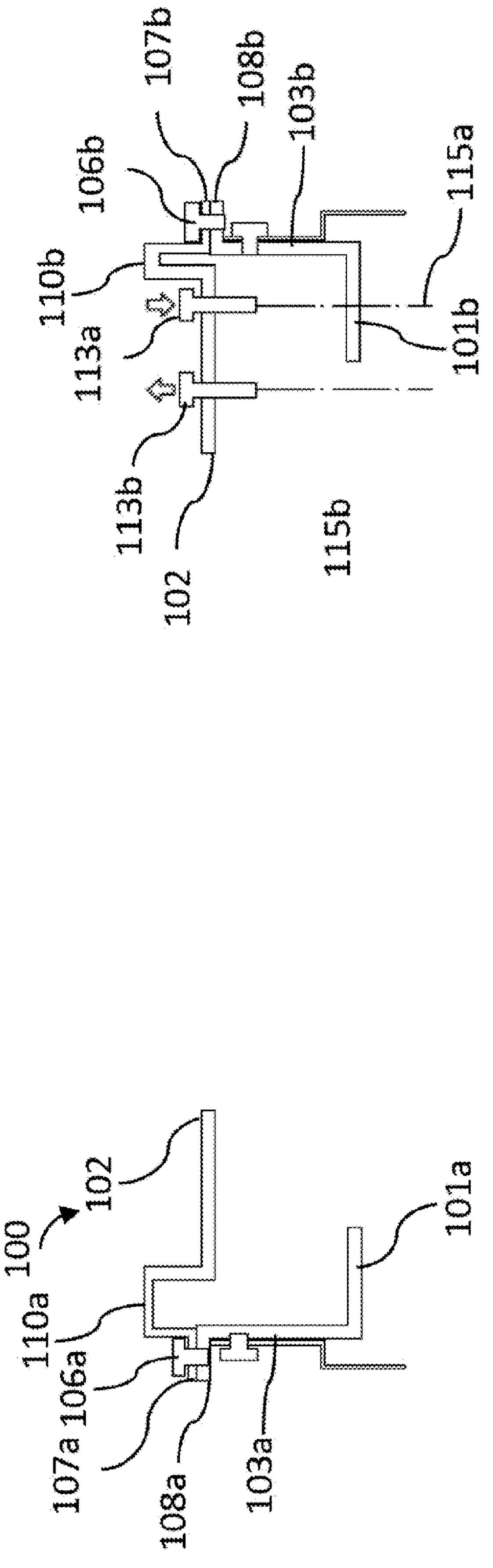

FIG. 2*b* illustrates an embodiment wherein each group of screws consists of only two screws 113*a*, 113*b*. A first screw 113*a* is arranged opposing the support portion 101*a*, 101*b*, i.e. an imaginary extension 115*a* of the longitudinal axis of the first screw 113*a* passes through the support portion 101*b* when viewed in cross-section, such as through the center thereof, as is illustrated in FIG. 2*b*. A second screw 113*b* of the two screws is arranged closer to a center of the first frame element 102 than a perimeter of the support portion 101*b*, i.e. an imaginary extension 115*b* of the longitudinal axis of the first screw 113*b* passes outside the support portion 101*b* when viewed in cross-section, as is illustrated in FIG. 2*b*.

Figure 2C:
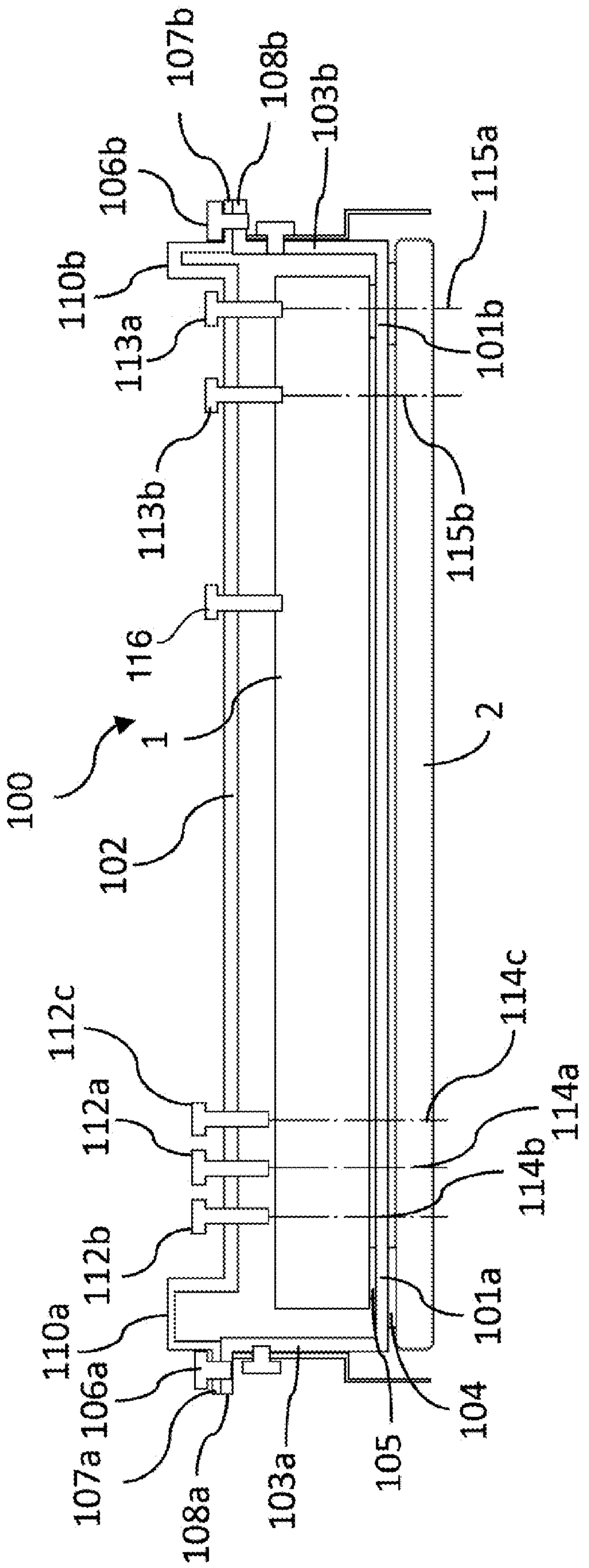
Figure 2D:
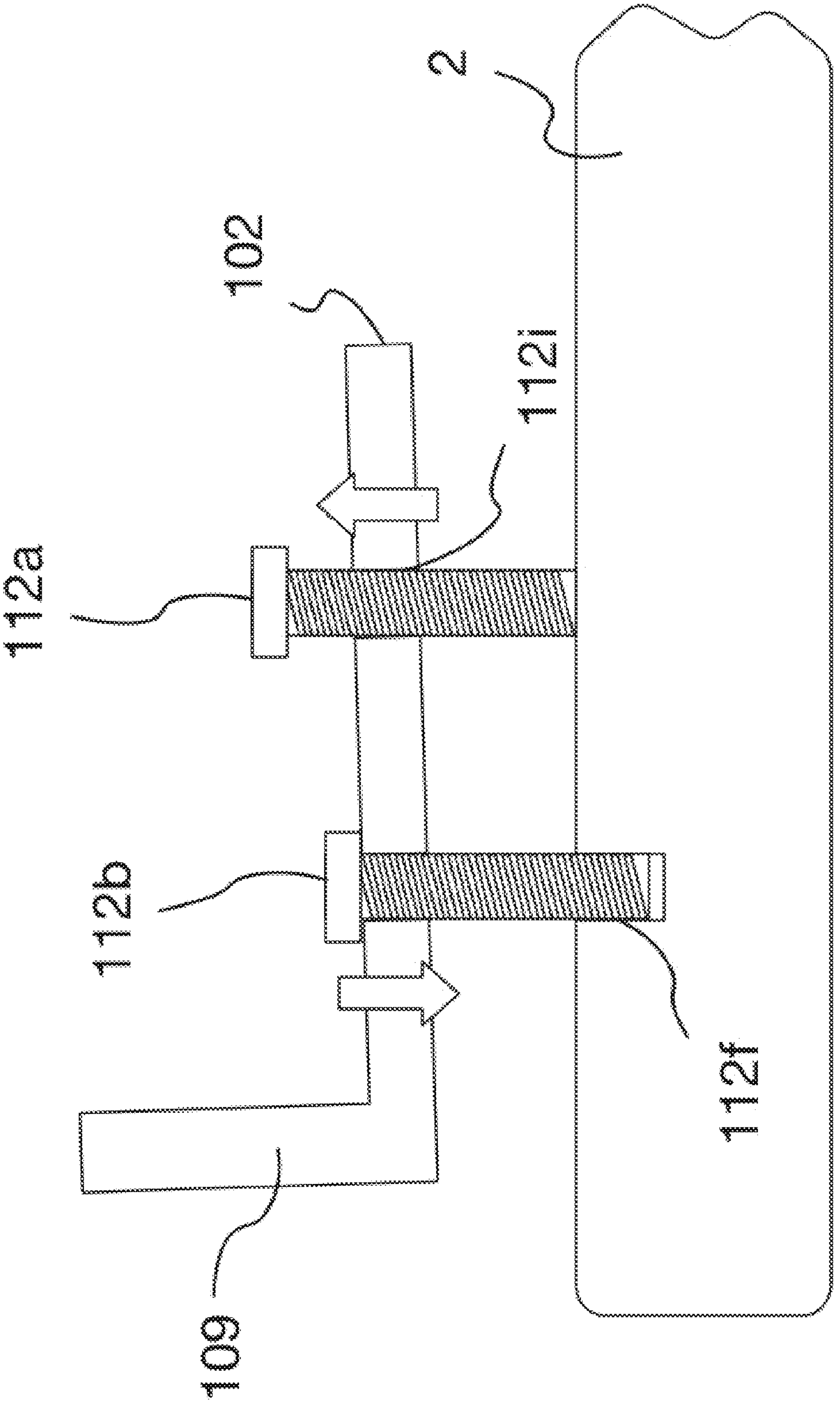

As shown in FIG. 2*d*, the first screw 112*a* is arranged to displace the frame 109 away from panel 1. This may be enabled by a threaded hole 112*i* in the frame 102 which the first screw engages while a head of the screw abuts the panel 1. The second screw 112*b* is arranged to displace the frame 109 towards the panel. This may be enabled by a threaded hole 112*f* in the panel 1, which the second screw 112*b* engages while the head of the second screw 112*b* abuts the surface of the frame. By using screw 112*a* and/or 112*b*, forces may be applied to frame 102 and/or panel 2 to control bending or rotation of the frame/panel.

Since the first screw 113*b* is aligned over the support portion 101*a*, 101*b* in the embodiment of FIG. 2*b*, only two screws are required to control bending or rotation of the frame.

In FIGS. 2*a*-2*b*, only one group of screws is illustrated. However, a group of screws may be arranged at any location around the frame 109 to support the plate 2 and the panel 1.

FIG. 2*c* illustrates that a combination the embodiment of FIGS. 2*a* and 2*b*, i.e. groups of screws with two as well as three screws may be arranged around the frame 109. Therefore, flexibility is provided for.

As is illustrated in FIGS. 2*a*-2*c* and 3*c* and 3*d*, each group of screws 112*a*, 112*b*, 112*c*, 113*a*, 113*b* may apply a force to the frame 109. Therefore, a torque may be applied at the second frame element 103*a*, 103*b* via controlling the curvature of the frame 109 such that tilt of the support portion 101*a*, 101*b*, and thereby curvature of the plate, is controlled. In the assembly illustrated in FIG. 3*a*, a net force is applied such that the frame is substantially flat and parallel with the panel 1. In the assembly illustrated in FIGS. 3*c* and 3*d*, a net force away from the support portion 101*a*, 101*b* is provided to the frame 109, which will be slightly concave when viewed from the touch surface of the plate 2. As a consequence, a torque will be provided at to the second frame element 103*a*, 103*b*, which will tilt the support portion 101*a*, 101*b* along the edge or perimeter of the plate 2. Therefore, controlling the curvature of the first frame element 109 may control curvature of the plate. The plate 2 may become concave as viewed from the touch surface of the plate 2.

FIGS. 4*a*-4*c*, 5*a*-5*g* and 6*a*-6*c* illustrate embodiments wherein an alternative or additional control of the shape of the frame 109 may be introduced. As shown in FIG. 4*a*, attachment elements 112 may be arranged at the corners of the frame 109. The attachment elements 112 may comprise the group of screws 112*a*, 112*b*, 112*c*, 113*a*, 113*b* as described above with regard to FIGS. 2*a*-2*c* and 3*a*-3*d*. The attachment elements 112 may be arranged to pull the panel 1 towards the frame 109. This may be done with or without tilting the support portion 101*a*, 101*b* as described above. At least one spacing element 116 (where spacing element 116 may comprise screw 112 and a separate spacing component) may be arranged along the perimeter of the frame 109 between two attachment elements 112. The spacing element 116 is arranged in the assembly to apply a force to the frame 109 directed away from the panel 1. Thereby, a force applied by the spacing element 112 may be transferred to the second frame element 103*a*, 103*b* such that the support 101*a*, 101*b* is tilted as described above, whereby curvature of the plate 2 is controlled.

As is illustrated in FIG. 4*b*, the general shape of the frame 109 will be concave, whereas the general shape of the panel 1 may be convex. The panel may also remain substantially plane depending on its rigidity. The resulting shape of the plate 2 will be concave. Therefore, each side of the frame 109 may be controlled to follow a curved path. The curvature may be controlled by adjusting the force applied by each spacing element 116 and/or via the number of spacing elements 116 along each side of the frame 109. As a result, the support portion 101*a*, 101*b*, at least at the free end of the support portion 101*a*, 101*b*, may also follow a curved path. Therefore, at least a portion of the support portion 101*a*, 101*b* may extend in a plane that is curved.

When the second frame element 103*a*, 103*b* is disassembled or only attached to the first frame element 102, it may have a relaxed state. In the relaxed state, the support portion 101*a*, 101*b* extends in a plane that is substantially flat. The second frame element 103*a*, 103*b* may be deflectable from the relaxed state to a deflected state or stressed state, such as by the attachment elements 112 and spacing elements 116. The level of tilt at the opposing ends of the support 101*a*, 101*b* where the attachment elements 112 are provided may be less than the level of tilt between the ends where spacing element(s) 116 is/are provided. As consequence, the second frame element 103*a*, 103*b* may be deflected to the deflected or stressed state. In the deflected or stressed state, the support portion 101*a*, 101*b* extends, along its length, in a plane that is curved. A cross section of this plane taken along the support portion 101*a*, 101*b*, such as at the free end or tip of the support portion 101*a*, 101*b* may form a parabolic concave curve along at least a portion of the length of the support portion 101*a*, 101*b*. A combination of the attachment element 112 and the spacing element 116, that together may form a screw arrangement, may hold the second frame element 103*a*, 103*b* in the deflected or stressed state when assembled with the first frame element 102.

The spacing element 116 may be provided by a single screw that engages a thread in the frame 109 while its tip engages or abuts a surface on panel 1. Alternatively, panel 1 comprises a threaded hole into which spacing element 116 is threaded so that spacing element 116 can be used to displace the frame 109 towards panel 11. Additionally, element 116 may comprise a spacer component such as a washer, spacer, etc. In FIGS. 3*a* and 3*b* and FIG. 6*a*, two spacing elements 116*a*, 116*b* are shown for illustrative purposes and may form separate embodiments. A single-spacing element 116*a*, 116*b* may be used in other embodiments. The head of the spacing element 116*a*, 116*b* may abut the back cover 111 while the spacing element 116*a*, 116*b* may engage the frame 109, wherein the frame 109 may be pulled towards the back cover 111. As a result, the frame 109 becomes concave. In some embodiments, the spacing element 116*a* does not abut or engage the panel 1, wherein the panel 1 may be unaffected by the force applied to the frame 109. In other embodiments, the spacing element 116*b* is sufficiently long such that a tip of the spacing element 116*b* abuts a surface of the panel 1. This adds further control of the shape of the plate 2.

In some of the embodiments, the frame assembly 100 comprises a plurality of spacing elements 116 arranged spaced apart from corners of the frame 109. One or several spacing elements 116 may be arranged along each perimeter or side of the frame 109. If a single spacing element 116 is arranged along each side, it is preferably centered between the corners of the frame 109.

Each spacing element 116 may comprise a screw with a predefined length. This means that the screw can be fully seated such that the head and tip abut respective surfaces, whereby a predefined curvature of the plate 2 is obtained. The level of curvature may be adjusted by one or several spacers arranged between the head and the surface which the head engages. This is particularly useful if multiple spacing elements 116 are arranged along a single side, or if different sides have different lengths. The more spacers provided, the less force will be applied to the frame 109. Alternatively, as shown in FIG. 5*h*, predefined height differences may be generated via other methods, e.g. by milling the frame to the predefined heights, allowing a more continuous support structure.

FIGS. 5*a*-5*h* illustrate embodiments of an assembly 200, which may be combined with the first frame element 102 described above. The embodiments shown in FIGS. 5*a*-5*h* are shown inverted relative to the embodiments shown previously, with the plate 2 at the top.

Figure 5A:
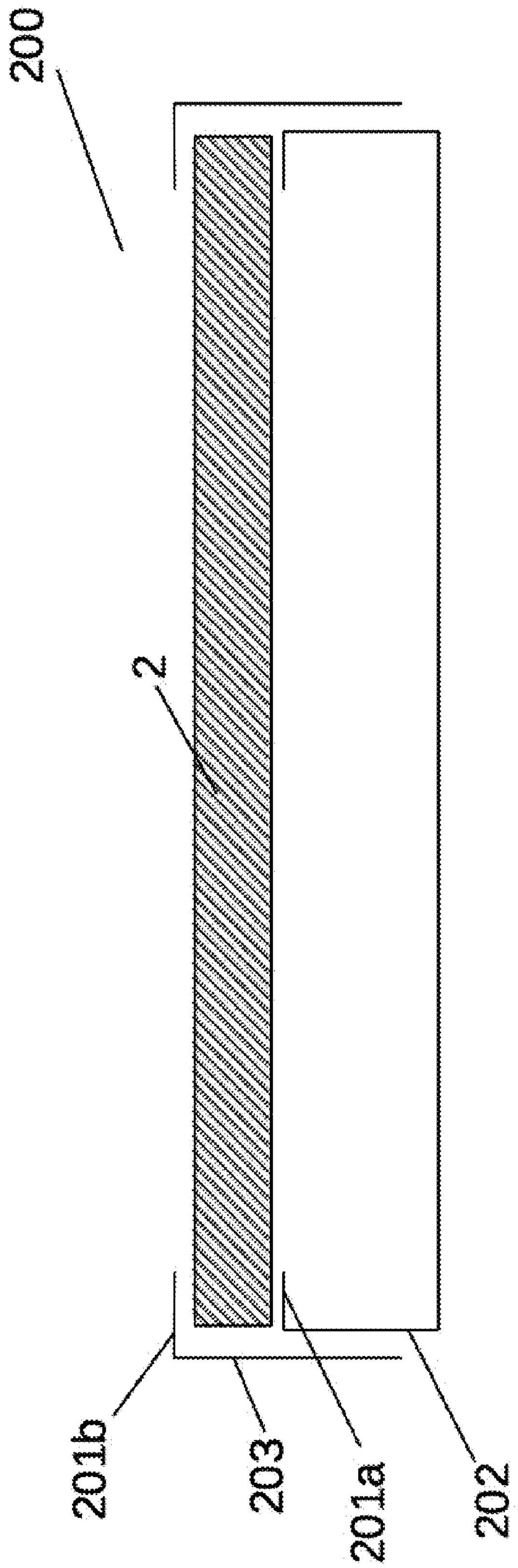
FIGS. 5*a*-5*h* are side views and perspective views of an embodiment of the assembly comprising a screw arrangement for configuring frame shape.
Figure 5B:
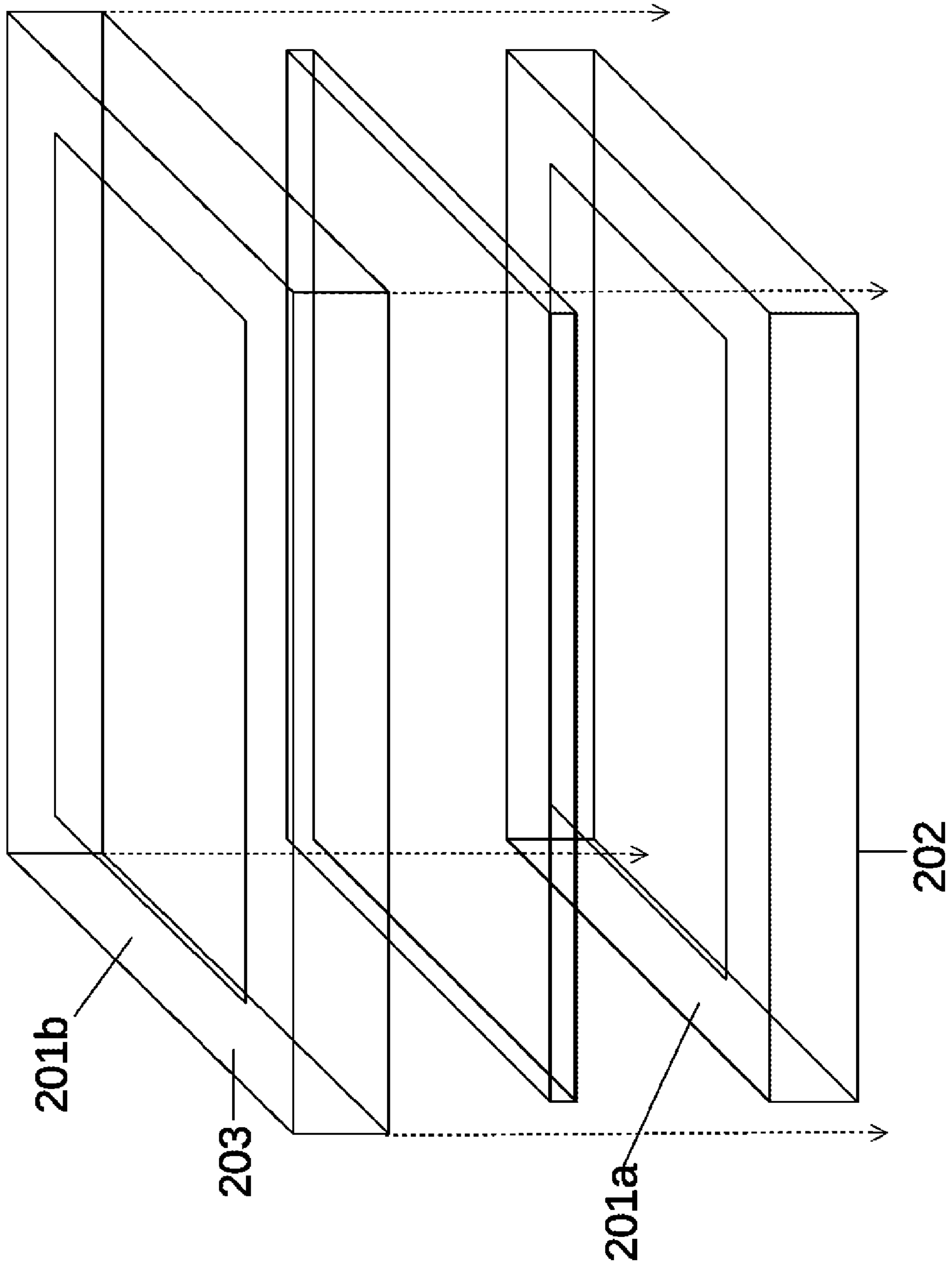

As shown in FIGS. 5*a* and 5*b*, the frame assembly 200 may comprise a first frame element 202, and a second frame element 203. The first frame element 202 and the second frame element 203 may be elongated members, each having a support portion 201*a*, 201*b*. The first frame element 202 and the second frame element 203 may e.g. be L-shaped in cross section. A first portion of each of the first frame element 202 and the second frame element 203 may be configured to extend along the edge of the panel 1. A second portion of each of the first frame element 202 and the second element 203 forms the support portion 201*a*, 201*b*, and may be configured to extend from the perimeter of the plate 2 a short distance, such as a 1-3 cm, over the surface of the plate 2 when assembled. Furthermore, the second frame element 203 may be arranged on top of the first frame element 202 and such that the perimeter of the plate 2 is arranged between the second portion of each of the frame elements 202, 203 when assembled. Therefore, each support portion 201*a*, 201*b* may support or engage opposing surfaces of the plate 2, such as is illustrated in FIG. 5*g*.

Figure 5C:
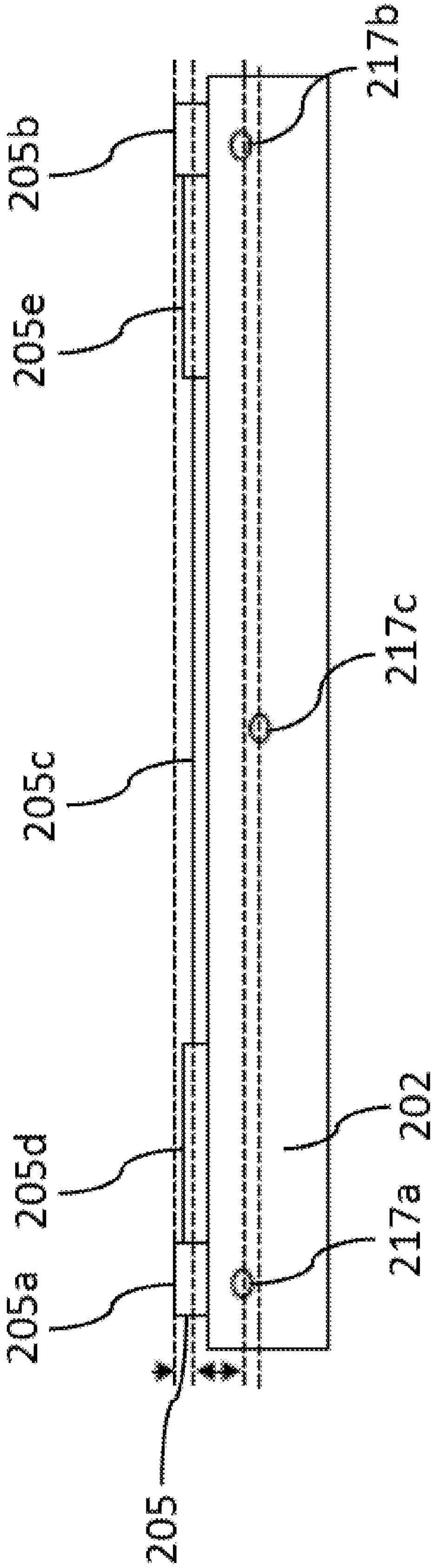
Figure 5D:
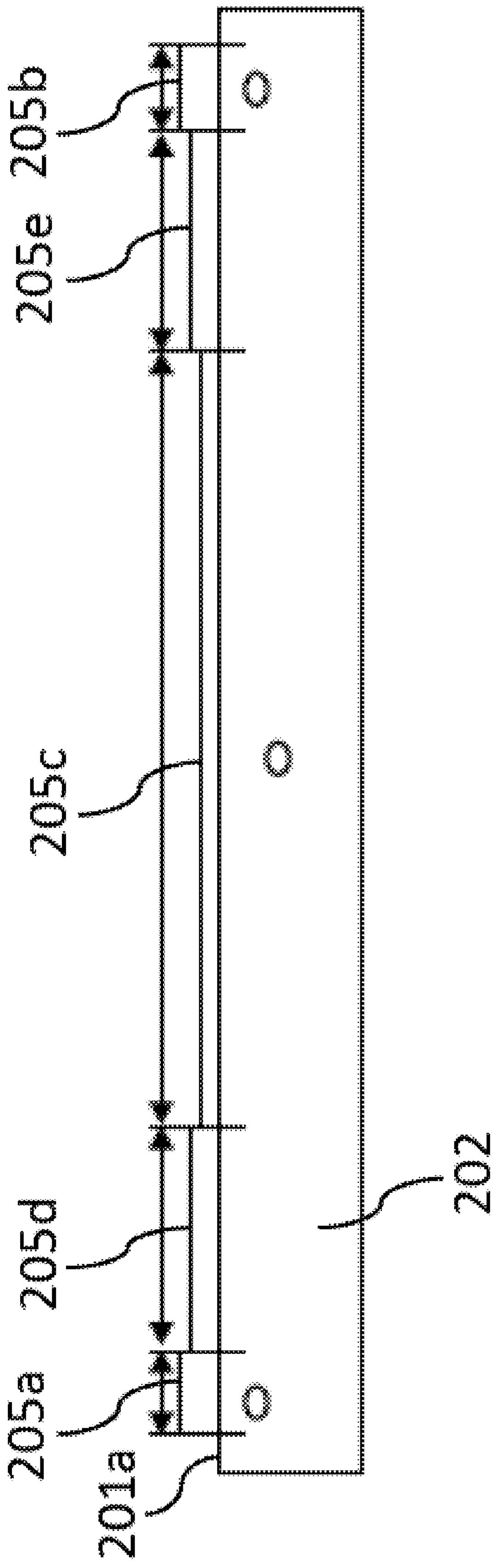

In some embodiments, such as illustrated in FIGS. 5*c*-5*d*, a gasket 205 (e.g. gaskets 205*a*, 205*b*, 205*c*, 205*d*, 205*e*) is arranged between the first frame element 202 and the second frame element 203. The gasket may e.g. be arranged on the support portion 201*a* of the first frame element 202. Also, a sealing 204*a* may be arranged on the support portion 201*b* of the second frame element 203.

The gasket 205 may have a varying thickness along its length, i.e. also along the length of the first frame element 202. This provides for obtaining a desired curved shape of the perimeter of the plate 2 when captured between the first frame element 202 and the second frame element 203, as is illustrated in FIGS. 5*f*-5*g*. For example, the gasket 205 has opposing ends and may be thinner between the opposing ends than at said ends. This provides for obtaining a predefined concavity of the perimeter of the plate 2. The gasket is sufficiently stiff that it is thicker at the ends even when compressed. The gasket 205 may be about 1.5-2.0 mm at the ends and about 1 mm thinner at the center.

In some embodiments, the gasket 205 has a plurality of sections along its length. The thickness of each section may vary. For example, a first section 205*a* of the gasket is provided at one of its ends and a second section 205*b* of the gasket at the other of its ends. The first section 205*a* and the second section 205*b* may have a first thickness that may be equal at each section. At least a third section 205*c* of the gasket is arranged between the first section 205*a* and the second section 205*b*. The third section 205*c* has a second thickness. The first thickness is thicker than the second thickness. For example, difference in thickness is about 0.5-2 mm, preferably about 1.0 mm. The difference in thickness may vary depending on the length of the gasket 205 and the edge of the plate 2 at which the concavity is to be introduced. In some embodiments, fourth and fifth sections 205*d*, 205*e* may be provided between the first and second sections 205*a*, 205*b* and the third section 205*c*, respectively. The fourth and fifth sections 205*d*, 205*e* may add further control of the shape of the concave curve provided by the arrangement 200. The length of each the first and second sections 205*a*, 205*b* may be about 2-20% of the total length of the gasket 205. The length of the third section may be about 60-96% of the total length of the gasket 205. The length of each of the fourth and fifth sections 205*d*, 205*e* may be about 10-20% of the total length of the gasket 205. In some embodiments the total length of the fourth and fifth sections 205*d*, 205*e* is shorter than the length of the third section 205*c*, and the total length of the first and second sections 205*a*, 205*a* is shorter than total length of the fourth and fifth sections 205*d*, 205*e*. This provides for a parabolic concave curve along the length of the frame assembly 200.

Figure 5E:
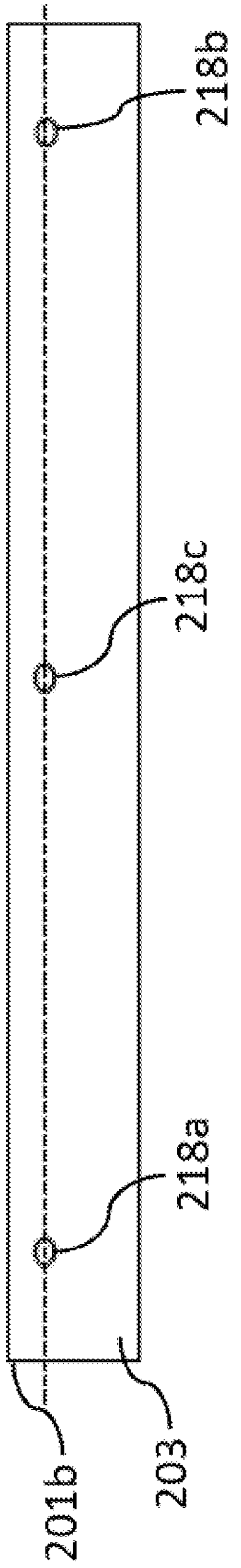
Figure 5F:
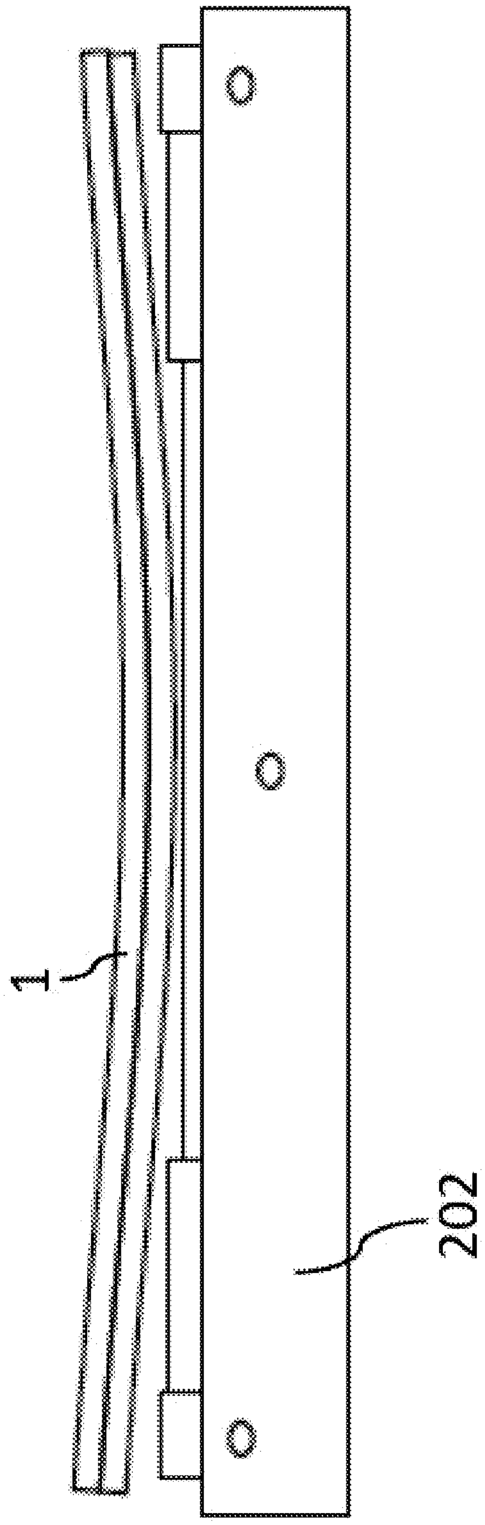
Figure 5G:
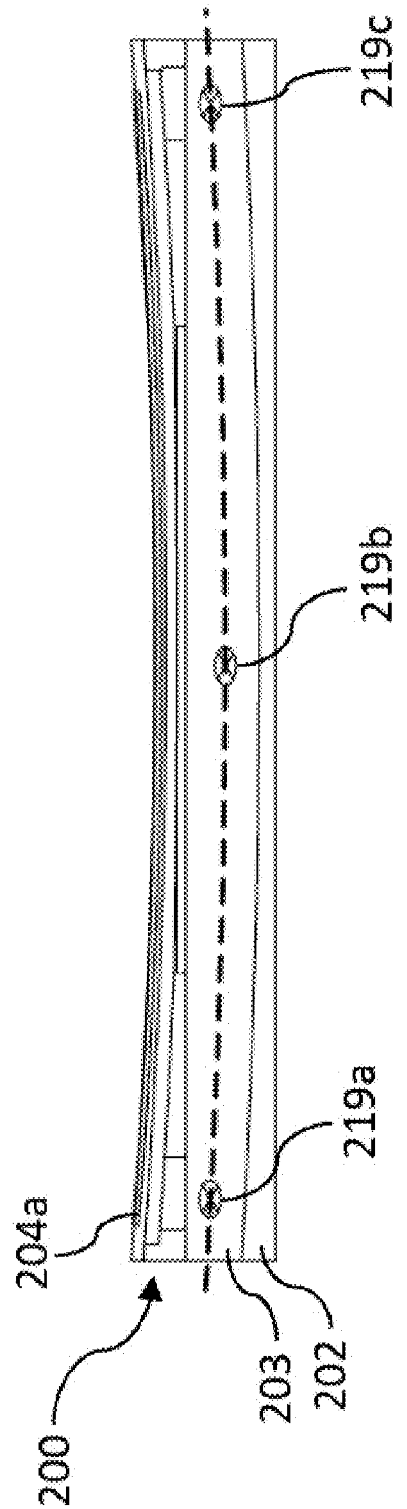
Figure 5H:
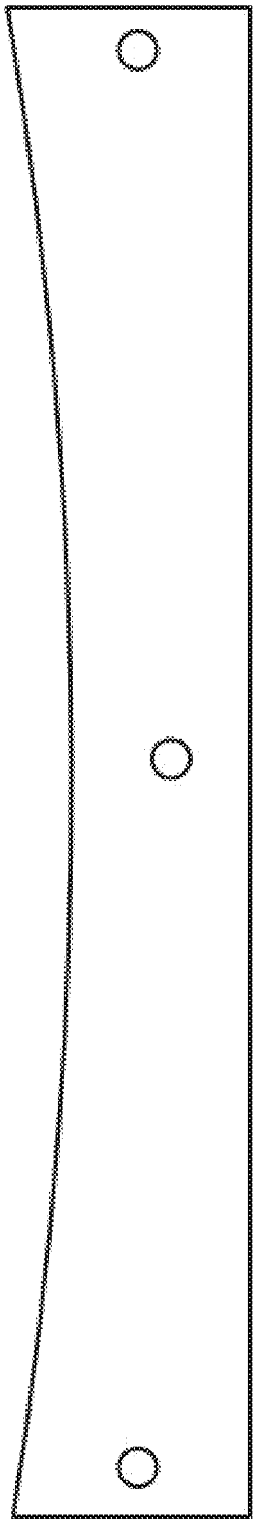

A distance between the support portion 201*a* of the first frame element 202 and the support portion 201*b* of the second frame element 203 may be discontinuous in an assembled state, as can be seen in FIG. 5*e*.

In order to maintain the concavity of the plate 2, the first frame element 202 and the second frame element 203 may be held together such that the distance between the support portions 201*a*, 201*b* is maintained in the assembled state. The first frame element 202 has a first hole 217*a* and a second hole 217*b* arranged at opposing ends of the first frame element 202, such as at the second portion of the first frame element 202. The first and the second hole 217*a*, 217*b* are arranged in a first plane. A third hole 217*c* is arranged between the first hole 217*a* and the second hole, such as centered between the first hole 217*a* and the second hole 217*b*. The third hole 217*c* is provided in a plane that is different from the first plane. The distance or offset between the plane in which the first and second holes 217*a*, 217*b* are arranged and the plane in which the third hole 217*c* is arranged may be substantially the same as the difference in thickness between the first and second sections 205*a*, 205*b* and the third section 205*c*, i.e. about 0.5-2 mm. In some embodiments the first and second holes 217*a*, 217*b* are centered in each of the first and second sections 205*a*, 205*b* of the gasket 205 along the length of the first frame element 202.

Similarly, the second frame element 203 may comprise a first hole 218*a* and a second hole 218*b* arranged at opposing ends of the second frame element 203. A third hole 218*c* may be arranged between the first hole 218*a* and the second hole 218*b* of the second frame element 203. The first hole 218*a*, the second hole 218*b*, and the third hole 218*c* of the second frame element 203 is generally arranged in the same plane when the second frame element 203 is disconnected from the first frame element 202. The second frame element 203 may be less stiff or weaker than the first frame element 202 and be deflectable such that each hole 218*a*, 218*b*, 218*c* of the second frame element 203 is aligned with the holes 217*a*, 217*b*, 217*c* of first frame element 202. Therefore, the support portion 201*b* of the second frame element 203 may be deflected such that it extends in plane, which is curved in the assembled state of the frame assembly 200. Screws 219*a*, 219*b*, 219*c* may be inserted through the aligned holes 217*a*, 217*b*, 217*c*; 218*a*, 218*b*, 218*c* and may directly engage the panel or engage a threaded hole in the panel 1, which will hold the frame elements 202, 203 in the assembled state. Other relative arrangements of the holes 217*a*, 217*b*, 217*c*; 218*a*, 218*b*, 218*c* are foreseen, wherein the center holes 217*c*, 218*c* of each frame element 202, 203 are misaligned in the relaxed state of the second frame element 203 but aligned in the deflected or stressed state of the second frame element 203.

In some embodiments, the first frame element 202 forms a frame side, and the second frame element 203 forms an edge cover. If used together with the frame 109 discussed with regard to FIGS. 4*a*-4*c*, the frame side may replace the second frame element of the embodiments of FIGS. 4*a*-4*c*. Therefore, the frame side comprises the support portion 201*a* with a support surface generally opposing the frame 109 and is configured to support the gasket 205.

Figure 6:
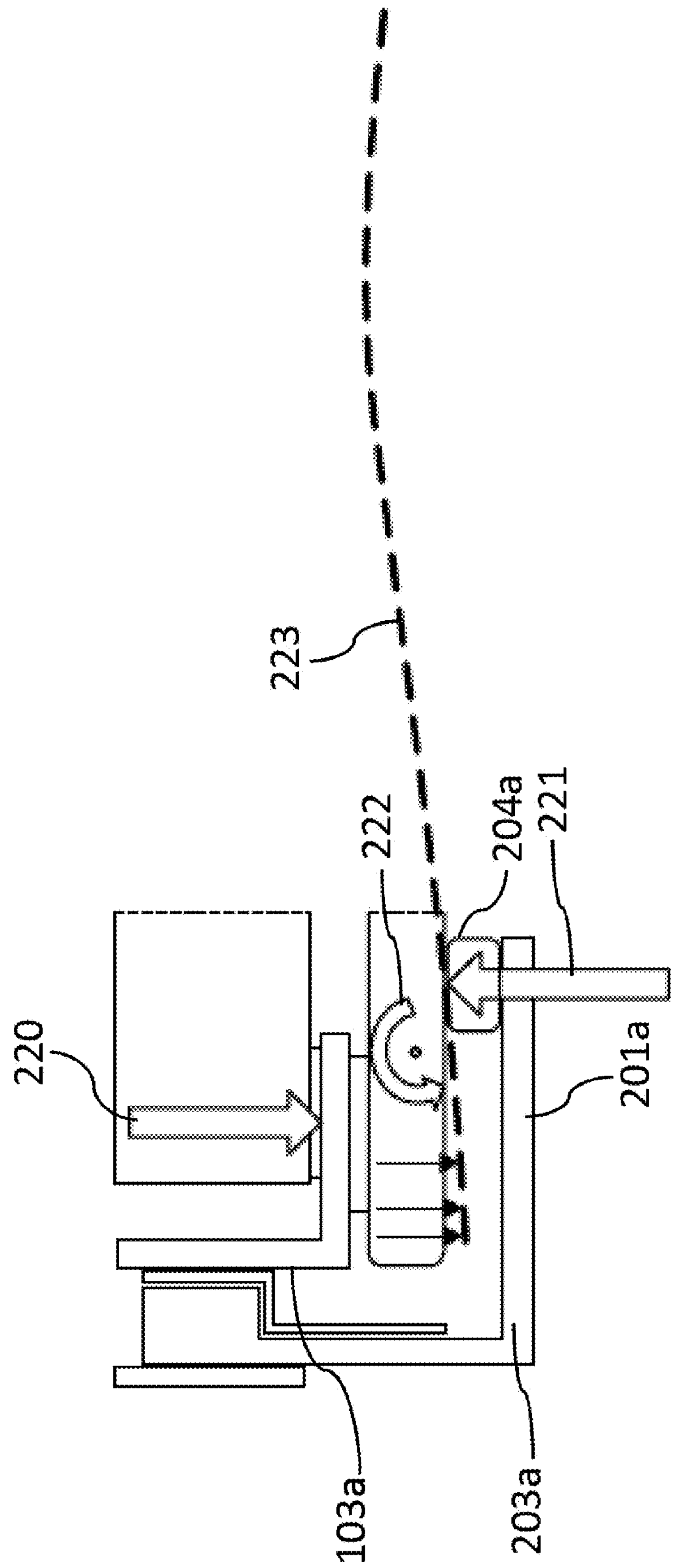
FIG. 6 is a schematic cross section from a first direction of an embodiment of the assembly.

As illustrated in FIG. 6, a component (e.g. a sealing component 204*a*) may be provided between the support portion 201*a* and the plate 2. FIG. 6 illustrates the resulting forces and torque generated when a force 220 is applied to second frame element 203*a*. A second force 221 is applied to support portion 201. Therefore, a net torque 222 is generated, i.e. counter-clockwise in the illustrated arrangement. The plate 2 will assume a curved path, as is illustrated with dotted line 223.

Figure 7:
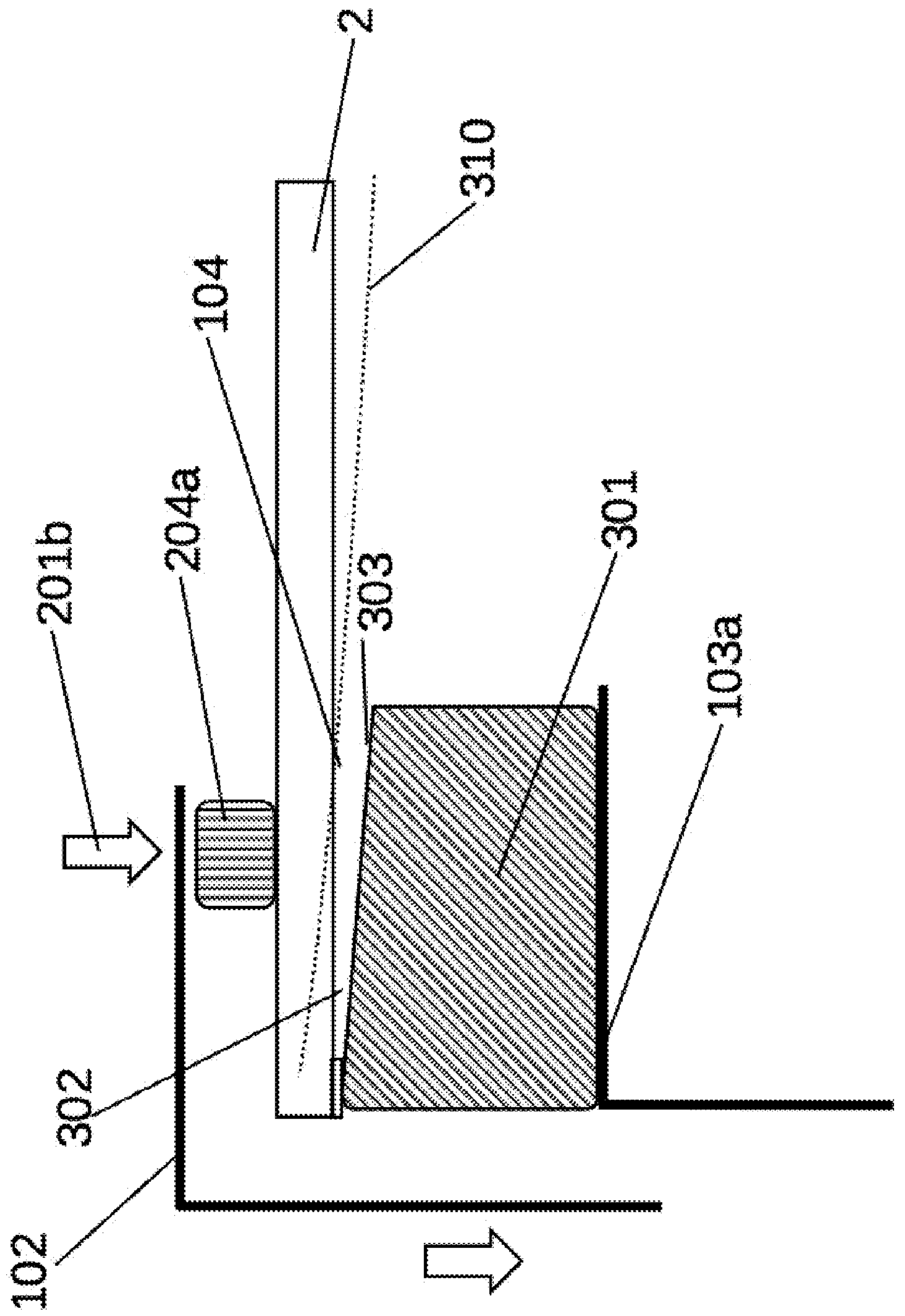
FIG. 7 is a schematic side-view of another embodiment for providing curvature of plate 2.

In an embodiment shown in FIG. 7, an alternative arrangement is provided for providing curvature of plate 2. In this embodiment, support block 301 is arranged to support glass plate 2. Support block 301 has a surface portion comprising a tapered edge 303 at an angle from second frame element 103A. Plate 2 is pressed against the top surface of support block 301 from pressure 201*b* from first frame element 102 and sealing 204*a*. Pressure 201*b* causes plate 2 to follow the contour of the top surface of block 301 and plate 2 is forced into a curving plane at an angle to the plane of second frame element 103A. The resulting path of plate 2 is shown by curvature path 310. Tapered surface portion 303 is angled between 0.5 degrees and 3 degrees from second frame element 103A.

Figure 8:
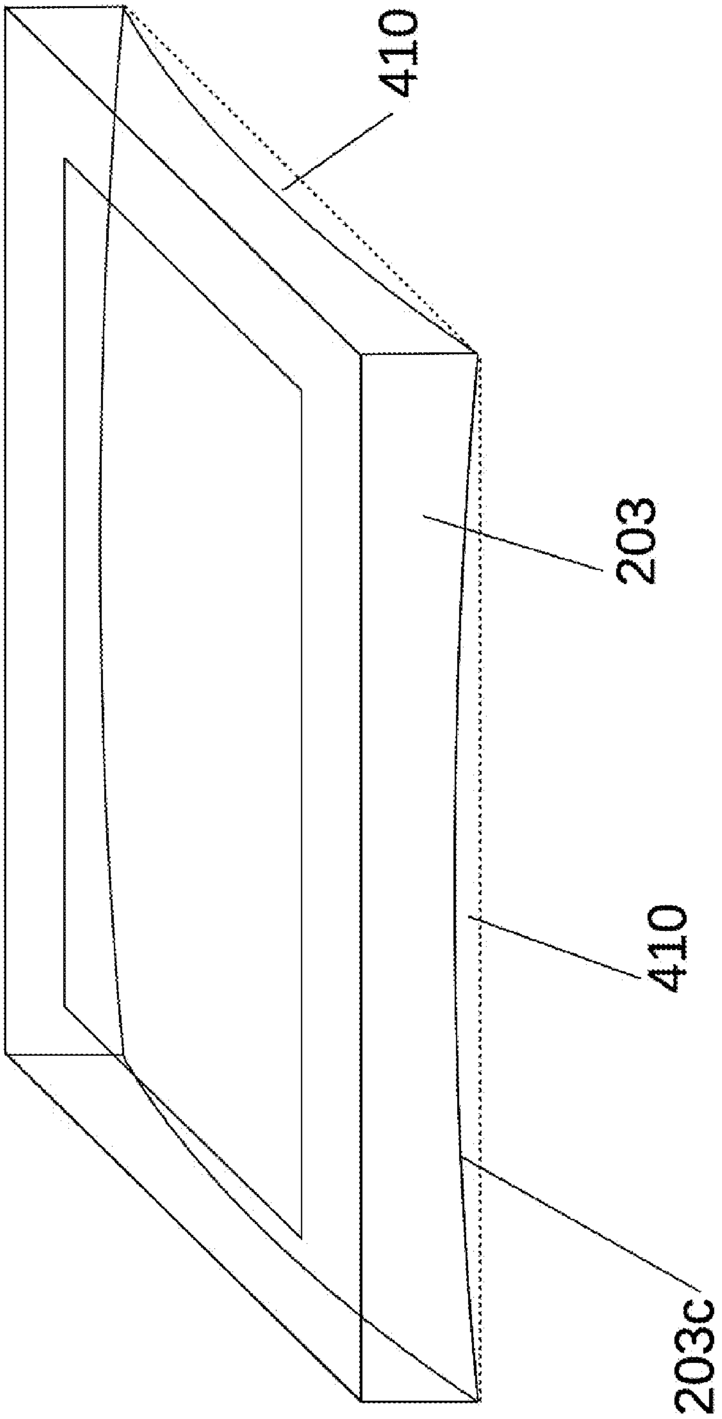
FIG. 8 shows an isometric view of a variation of the embodiment of FIGS. 5*a*-5*g;*

In an embodiment shown in FIG. 8, a variation of the embodiment shown in FIGS. 5*a*-5*g* is provided. In this embodiment, second frame element 203 has been modified, such that a portion 410 has been removed from the edge portion 203*c* of second frame element 203. This reduces the force required to bend second frame element 203 in a manner that results in a curvature of plate 2. Portion 410 may be removed by a milling process, by a carving or cutting process, or second frame element 203 may be formed without portion 410 via a molding process or similar. Portion 410 preferably reduces the depth of second frame element 203 at the narrowest point by between 5-20%.

The frame elements of the embodiments of the assembly may be made from sheet metal and given a desired design, thickness, and/or be made from different materials such that the forces, shapes, torques, etc. discussed above are obtained.

Embodiments comprise a method for assembling the panel 1 and the plate 2 for the optical touch sensitive system. The method may comprise providing the frame elements according to the embodiments presented herein. The method further comprises attaching the first frame element to the second frame element, supporting the plate at a support portion of the assembly, and attaching at least one of the first frame assembly and the second frame assembly to the panel such that the support portion extends in flat or curved plane. Also, the method comprises attaching the second frame element to the first frame element such that the support portion extends at least partially in a second plane generally opposite at least a portion of the first frame element and is spaced apart from the first plane. A curvature of the first frame element may be controlled with a spacing element attached to the first frame element and may thereby tilt the support portion to control a curvature of the plate.

Figure 9:
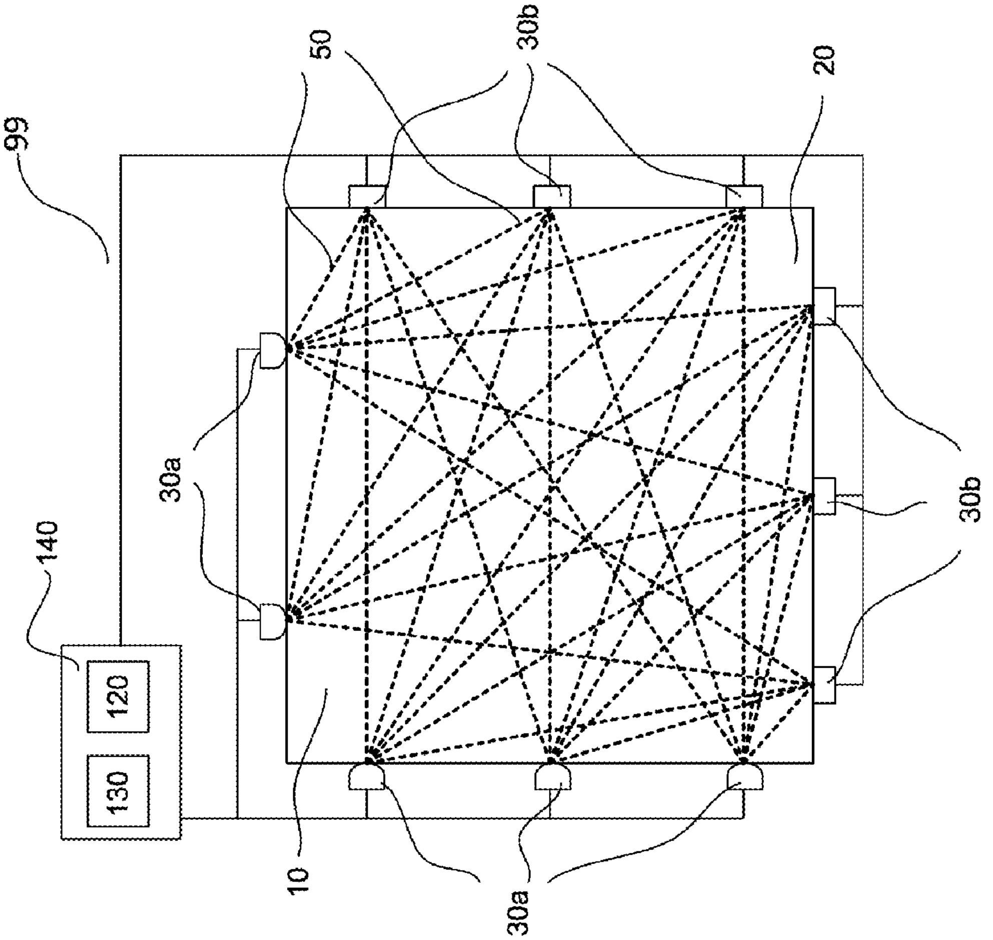
FIG. 9 is a diagram showing a top down view of an optical touch system and corresponding detection lines.

FIG. 9 illustrates a top plan view of an example of a touch-sensitive apparatus 99. Emitters 30*a* are distributed around the periphery of touch plate 10, to propagating light across touch surface 20. Detectors 30*b* are distributed around the periphery of touch surface 20, to receive part of the propagating light. The light from each of emitters 30*a* will propagate to a number of different detectors 30*b* on a plurality of light paths 50.

The embodiments above describe methods of achieving control of plate shape and curvature. The following embodiments describe desirable shapes of the plate for achieving improved performance of a touch sensor system. Light paths 50 may conceptually be represented as "detection lines" that extend across the touch surface 20 between pairs of emitters 30*a* and detectors 30*b*. The emitters 30*a* and detectors 30*b* collectively define a grid of detection lines 50 ("detection grid") on the touch surface 20, as seen in a top plan view. The spacing of intersections in the detection grid define the spatial resolution of the touch-sensitive apparatus 99, i.e. the smallest object that can be detected on the touch surface 20. The width of the detection line is a function of the width of the emitters and corresponding detectors. A wide detector detecting light from a wide emitter provides a wide detection line with a broader surface coverage, minimizing the space in between detection lines which provide no touch coverage. A disadvantage of broad detection lines may be a reduced ability to differentiate between separate objects and a lower signal to noise ratio.

As used herein, the emitters 30*a* may be any type of device capable of emitting radiation in a desired wavelength range, for example a diode laser, a VCSEL (vertical-cavity surface-emitting laser), an LED (light-emitting diode), an incandescent lamp, a halogen lamp, etc. The emitters 30*a* may also be formed by the end of an optical fiber. The emitters 30*a* may generate light in any wavelength range. The following examples presume that the light is generated in the infrared (IR), i.e. at wavelengths above about 750 nm. Analogously, the detectors 30*b* may be any device capable of converting light (in the same wavelength range) into an electrical signal, such as a photo-detector, a CCD device, a CMOS device, etc.

The detectors 30*b* collectively provide an output signal, which is received and sampled by a signal processor 130. The output signal contains a number of sub-signals, also denoted "projection signals", each representing the energy of light received by one of light detectors 30*b* from one of light emitters 30*a*. Depending on implementation, the signal processor 130 may need to process the output signal for separation of the individual projection signals. The projection signals represent the received energy, intensity or power of light received by the detectors 30*b* on the individual detection lines 50. Whenever an object partially or completely occludes detection line 50, the received energy on this detection line is decreased or "attenuated".

The signal processor 130 may be configured to process the projection signals so as to determine a property of the touching objects, such as a position (e.g. in a x, y coordinate system), a shape, or an area. This determination may involve a straight-forward triangulation based on the attenuated detection lines, e.g. as disclosed in U.S. Pat. No. 7,432,893 and WO2010/015408, or a more advanced processing to recreate a distribution of attenuation values (for simplicity, referred to as an "attenuation pattern") across the touch surface 20, where each attenuation value represents a local degree of light attenuation. The attenuation pattern may be further processed by the signal processor 130 or by a separate device (not shown) for determination of a position, shape or area of touching objects. The attenuation pattern may be generated e.g. by any available algorithm for image reconstruction based on projection signal values, including tomographic reconstruction methods such as Filtered Back Projection, FFT-based algorithms, ART (Algebraic Reconstruction Technique), SART (Simultaneous Algebraic Reconstruction Technique), etc. Alternatively, the attenuation pattern may be generated by adapting one or more basis functions and/or by statistical methods such as Bayesian inversion. Examples of such reconstruction functions designed for use in touch determination are found in WO2009/077962, WO2011/049511, WO2011/139213, WO2012/050510, and WO2013/062471, all of which are incorporated herein by reference.

In the illustrated example, the apparatus 99 also includes a controller 120 which is connected to selectively control the activation of the emitters 30*a* and, possibly, the readout of data from the detectors 30*b*. Depending on implementation, the emitters 30*a* and/or detectors 30*b* may be activated in sequence or concurrently, e.g. as disclosed in U.S. Pat. No. 8,581,884. The signal processor 130 and the controller 120 may be configured as separate units, or they may be incorporated in a single unit. One or both of the signal processor 130 and the controller 120 may be at least partially implemented by software executed by a processing unit 140.

Figure 10A:
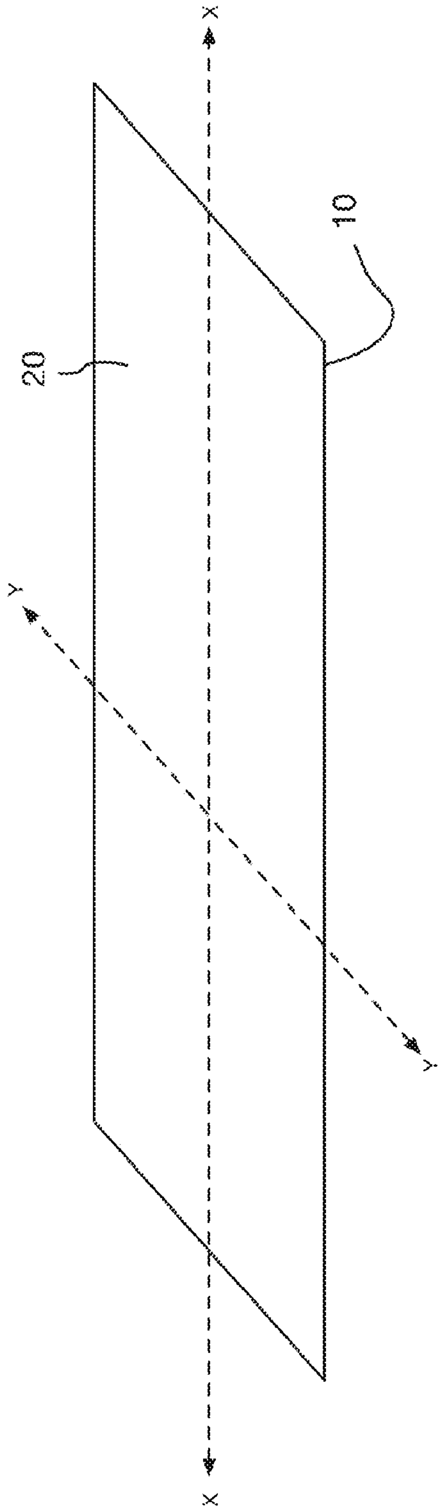
FIG. 10*a* shows an isometric view of a flat touch surface of an optical touch system.

FIG. 10*a* illustrates a substantially flat rectangular touch plate 10 according to the prior art. In this example, the touch plate is made of glass, plastic, or any other materials such as PMMA (Poly(methyl methacrylate)). Two axes are defined in FIG. 10*a*. The x-axis is defined as the axis running parallel to and equidistant from the pair of long edges of the rectangle and along the flat surface of the touch surface. The y-axis is defined as the axis running parallel to and equidistant from the pair of short edges of the rectangle and along the flat surface of the touch surface. At least a portion of the top surface of touch plate 10 comprises touch surface 20.

Figure 10B:
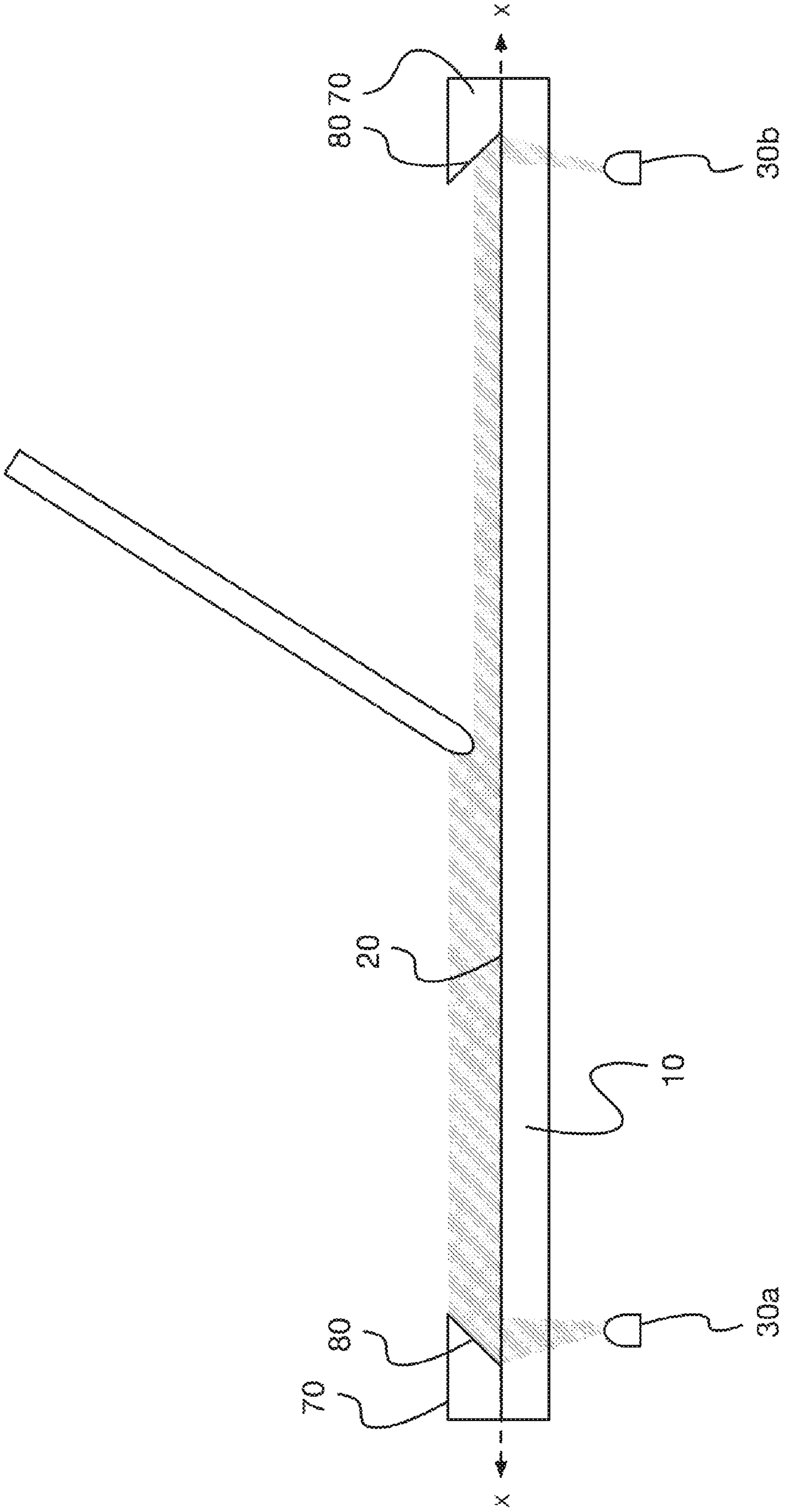
FIG. 10*b* shows a section view of an optical touch system with a flat touch surface.

FIG. 10*b* illustrates an example of a touch apparatus according to the prior art. FIG. 10*b* shows the touch apparatus in cross section wherein the cross section runs along the x-axis of the plate 10. Light is emitted by emitter 30*a*, passes through transmissive plate 10 through touch surface 20 and is reflected by reflector surface 80 of edge reflector 70 to travel in a plane substantially parallel with touch surface 20. The light will then continue until deflected by reflector surface 80 of the edge reflector 70 at an opposing edge of the transmissive plate 10, wherein the light will be deflected back down through transmissive plate 10 and onto detectors 30*b*. Where an object is applied to touch surface 20, some of the light above the touch surface 20 is occluded. This occlusion is detected by the touch apparatus and used to determine the presence, size, and/or shape of the object. The emitters and detectors may be arranged in a number of other configurations such that the light from the emitters is delivered to the touch surface and delivered from the touch surface to the detectors. Other known arrangements are that of arranging the emitters and detectors above the touch surface and transmitting and receiving the light directly without the use of reflecting surfaces. The light may also be delivered to the touch surface by means of a wave guide, fiber optic cable, or other optical component.

Figure 11A:
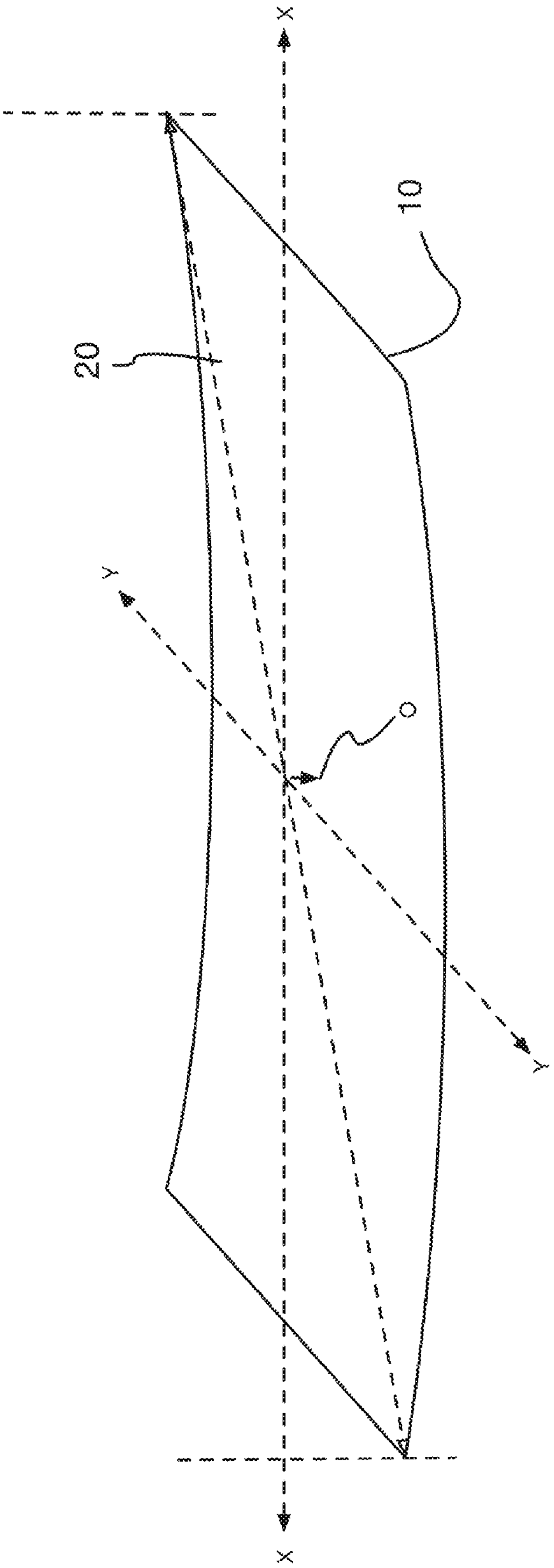
FIG. 11*a* shows an isometric view of a touch surface of an optical touch system having a curved profile in the x-axis.
Figure 11B:
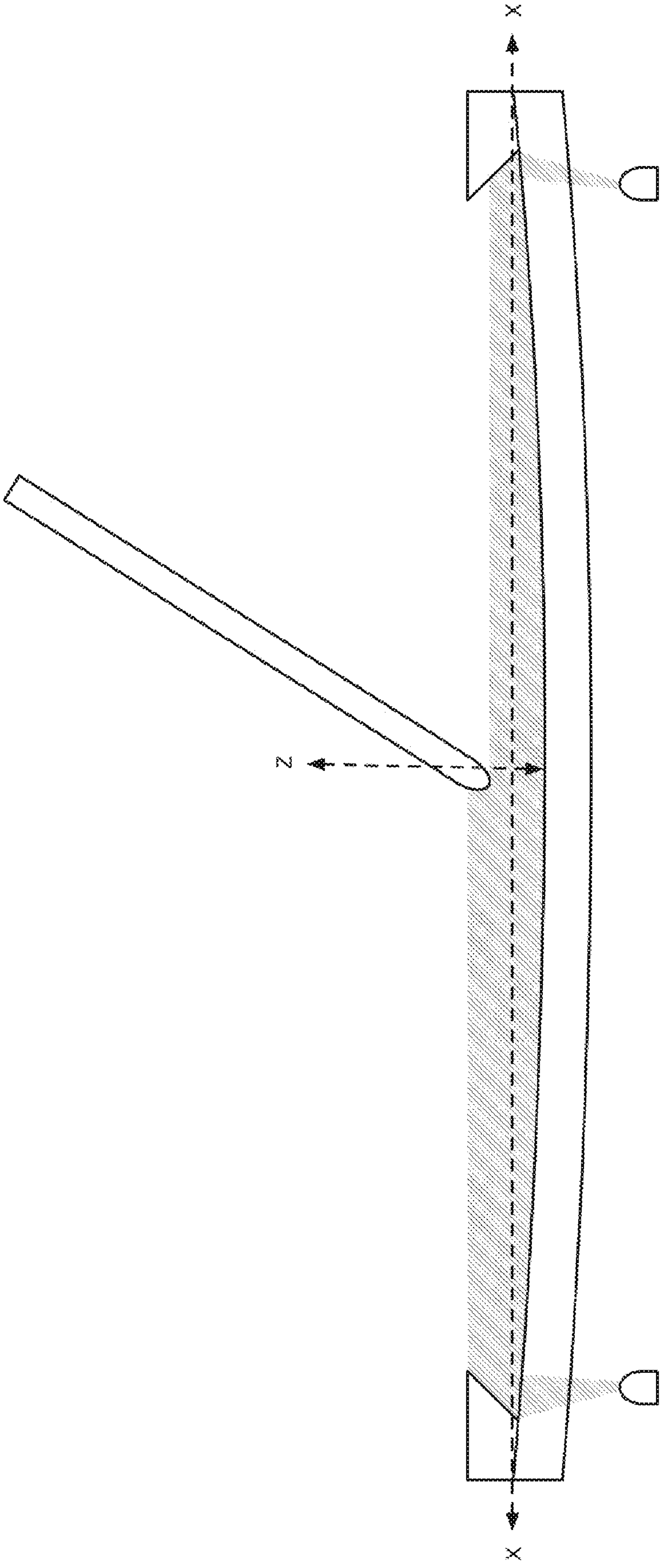
FIG. 11*b* shows a section view along the x-axis of an optical touch system with a touch surface having a curved profile in the x-axis.

FIG. 11*a* illustrates an embodiment of touch plate 10 similar to that shown in FIG. 10*a* but wherein the touch plate 10 is curved. In this embodiment, the plate remains substantially flat in the direction of the y-axis but is curved in a concave direction relative to the x-axis. In this embodiment, the x-axis is defined as the axis running parallel to and equidistant from the pair of long edges of the rectangle. The vertex of the parabola or paraboloid of the touch surface is where the touch surface is deepest relative to the edges of the touch plate. Where the x-axis is positioned at the height of the edge of the touch plate, the curvature of the plate can be measured using the distance of the touch surface from the x-axis. FIG. 11*b* shows a cross-section view along the x-axis of the touch plate 10 of FIG. 11*a*.

Figure 11C:
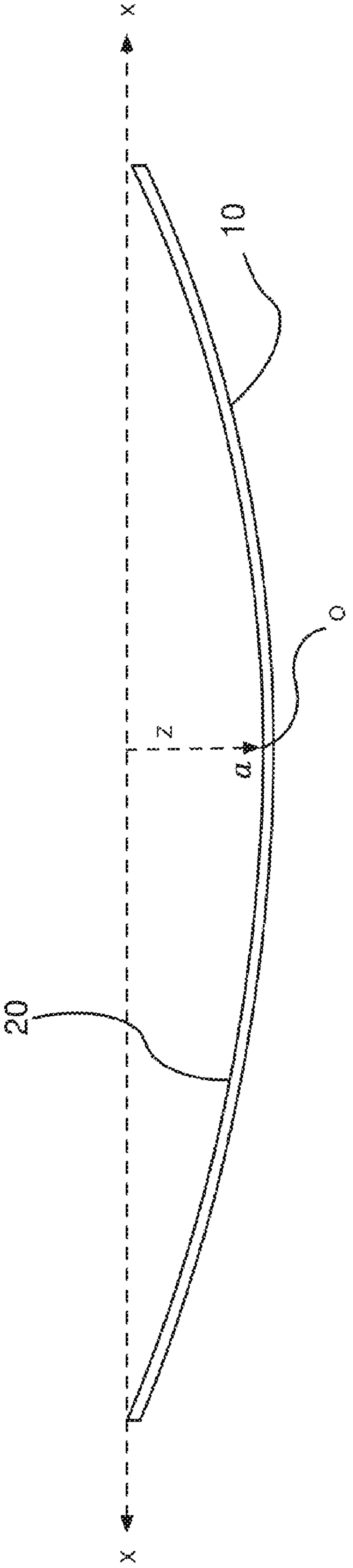
FIG. 11*c* shows a section view along the x-axis of an optical touch system with a touch surface having a curved profile in the x-axis.

FIG. 11*c* shows an example embodiment of a curved touch plate 10. The touch plate 10 has a width of 1900 mm along the x-axis and a height of 1070 mm along the y-axis. In this example embodiment, the glass is shaped such that the touch surface follows a parabolic curve relative to the x-axis. The midpoint O of touch surface 20 is the center of the touch surface and the midpoint of the x-axis. Where the curvature of the touch surface 20 is parabolic, the maximum distance a between the touch surface and the x-axis is at the center point O of the touch surface.

Figure 11D:
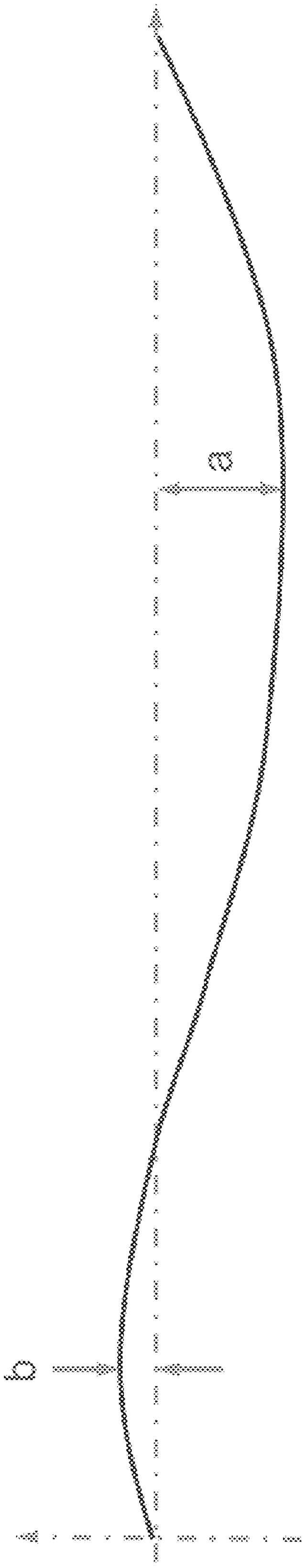
FIG. 11*d* shows an example of types of warpage that a touch panel may exhibit.

FIG. 11*d* shows the maximum allowed concave distance a and maximum allowed convexity b. The maximum allowed convexity b may be a significant consideration as a portion of the touch surface that is substantially convex may result in occlusion of the light between the emitters and detectors and significant loss of touch signal. The maximum allowed convexity b is a negative number in the present examples.

In one embodiment, the range of the distance a for vertically orientated touch plate is limited in order to improve the yield and performance of touch systems. The range is set dependent on the size of the touch system. A smallest value is needed to assure that non-parabolic deviations in the glass shape and convexity in the integration doesn't result in a convex integrated touch surface. A largest value is needed in order to assure that the height of the light field for the final touch system is kept reasonably low in order to enable better contact detection and lift-off detection for touch objects. Preferably, range of the distance a is 0-2.5 mm.

The maximum distance a is a positive number for a concave glass in the present examples. The curvature of the touch surface may therefore be modelled as:

$$F(x) = -a + cx^2$$

In the present example embodiment, a maximum distance a between the 1900 mm long cross section of the touch surface in FIG. 11*c* and the x-axis is 2.0 mm. Therefore, an ideal parabolic curve for touch surface 20 may be:

$$F(x) = 5.5 * 10^{-6} * x^2 - 2.0$$

where F(x) is the distance between the x-axis and the touch surface at position x wherein F(x) is zero at the mid points of the edges. i.e. where the x-axis intersects the perimeter.

Figure 12A:
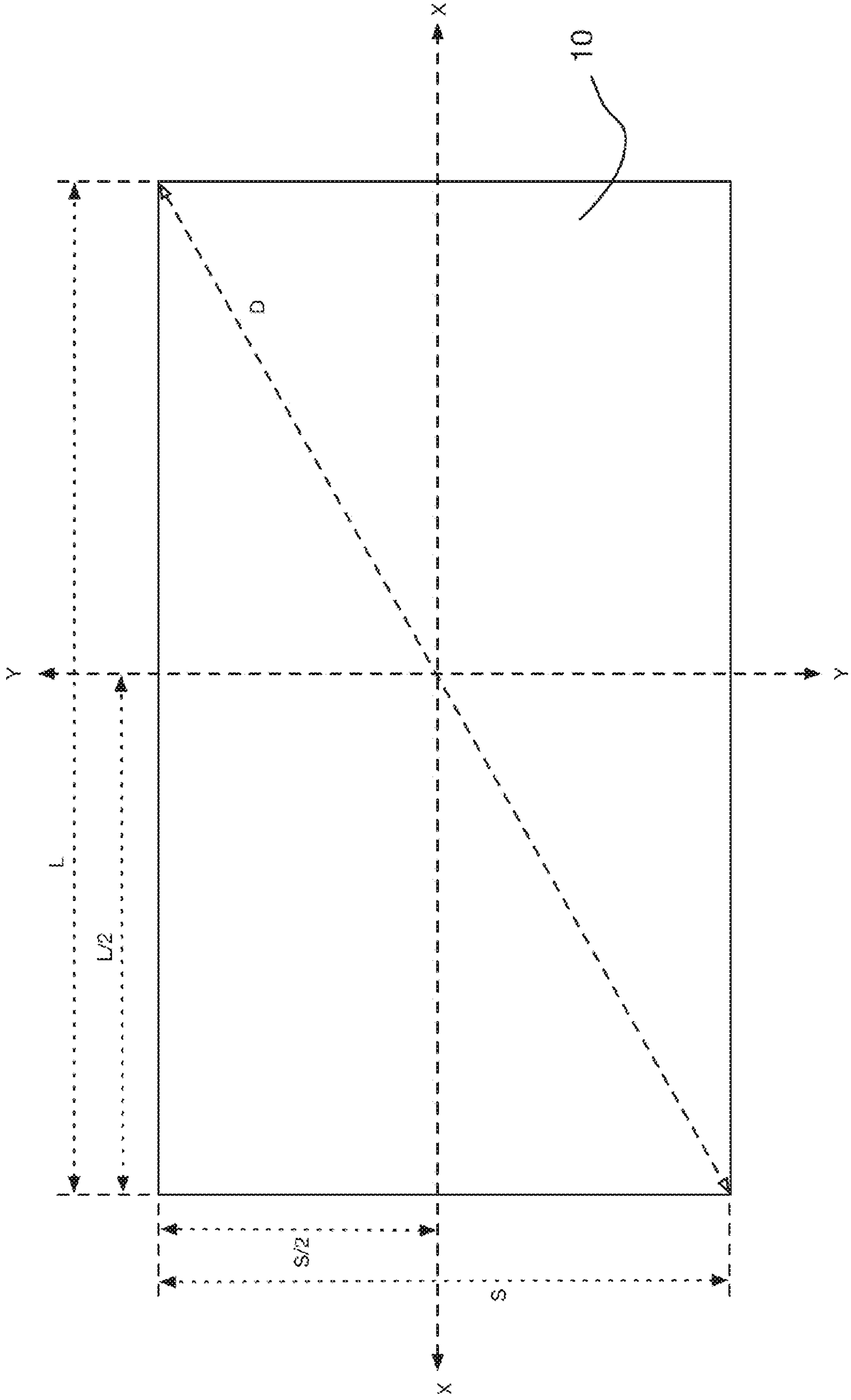
FIG. 12*a* shows top view of a touch surface of an optical touch system.
Figure 12B:
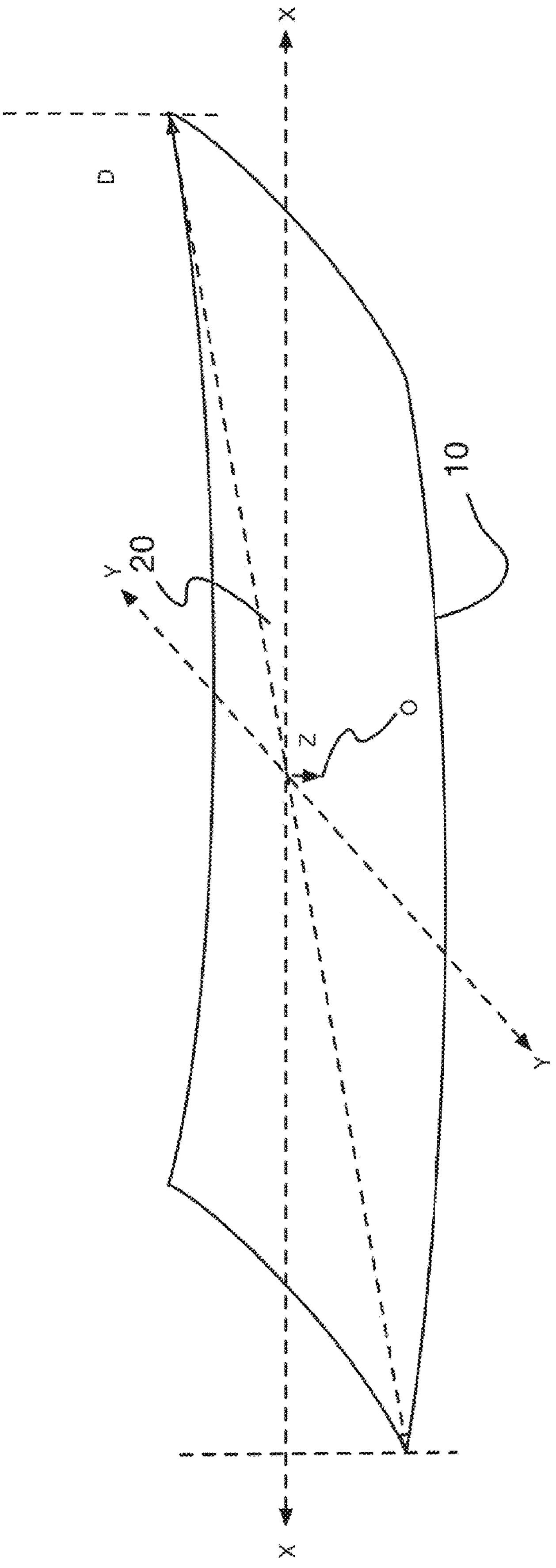
FIG. 12*b* shows an isometric view of a touch surface of an optical touch system having a curved profile in the x-axis and a curved profile in the y-axis.

FIGS. 12*a* and 12*b* illustrates an embodiment of touch plate 10 similar to that shown in FIG. 11*a* but wherein the touch plate 10 is curved in two axes. FIG. 12*a* shows a top plan view and FIG. 12*b* shows an isometric view of touch plate 10. In this embodiment, the plate is curved in a concave direction relative to the x-axis and is also curved in a concave direction relative to the y-axis. As with the embodiment shown in FIG. 11*a*, the x-axis is defined as the axis running parallel to and equidistant from the pair of long edges of the rectangle and passing over the center point 0 on the touch surface. Therefore, the curvature of the plate can be measured from the distance of the touch surface from the x-axis. Similarly, the y-axis is defined as the axis running parallel to and equidistant from the pair of short edges of the rectangle and passing over the center point 0 on the touch surface. Therefore, the curvature of the plate along this axis can be measured from the distance of the touch surface from the y-axis.

Figure 12C:
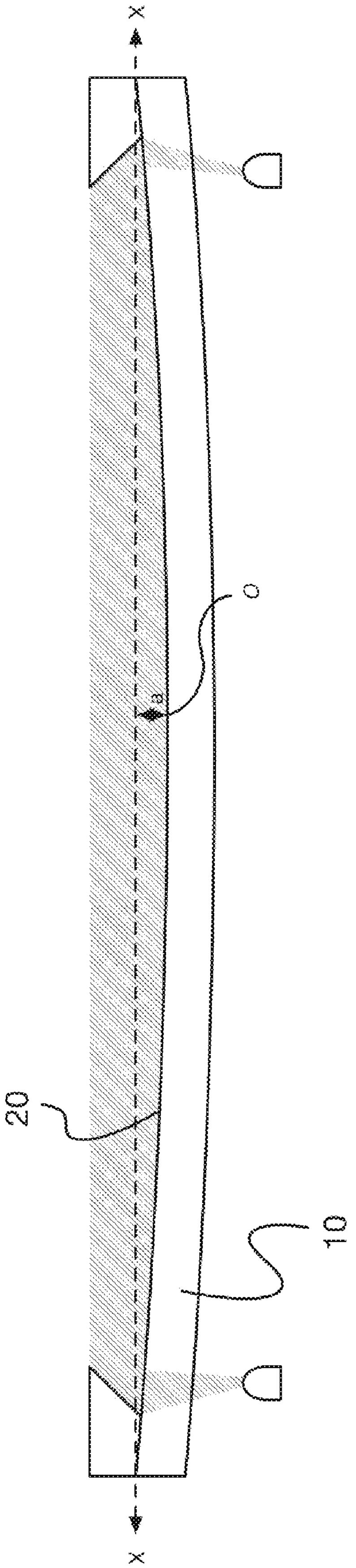
FIG. 12*c* shows a section view along the x-axis of an optical touch system with a touch surface having a curved profile in the x-axis and a curved profile in the y-axis.
Figure 12D:
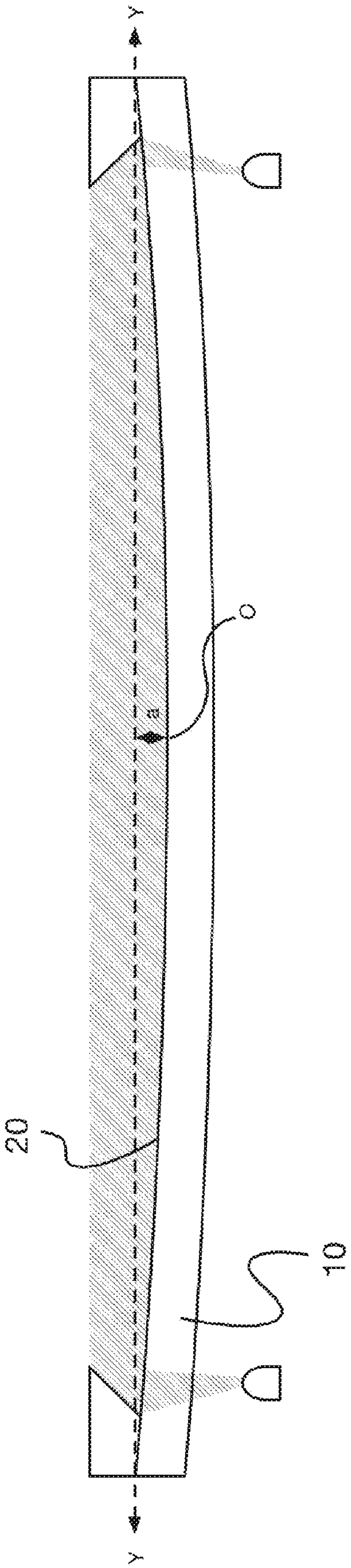
FIG. 12*d* shows a section view along the y-axis of an optical touch system with a touch surface having a curved profile in the x-axis and a curved profile in the y-axis.

FIGS. 12*c* and 12*d* shows respective section views along the x-axis and y-axis of the touch plate 10 of FIGS. 12*a* and 12*b*. In an example embodiment of a curved touch plate 10. The touch plate 10 has a width of 1900 mm along the x-axis and a height of 1070 mm along the y-axis. In this example embodiment, the glass is shaped such that the touch surface follows a parabolic curve relative to the x-axis. The center point O of touch surface 10 is the center of the touch surface and parallel with midpoint of the x-axis. Where the curvature of the touch surface 10 is parabolic, the maximum distance a between the touch surface and the x-axis is at the center point O. The maximum distance a is a positive number for a concave glass in the present examples. The curvature of the touch surface may therefore be modelled as:

$$z(x, y) = -a + b*x^2 + c*x^2y^2 + d*y^2$$

where z is the distance between the plane defined by the x-axis and y-axis and the touch surface, and x and y are co-ordinates in the plane of the glass.

In an example embodiment having a flat perimeter around the plate with a max distance of 2.0 mm measured along the x-direction for y=0 (i.e. middle of plate):

$$z(x, y) = -2 + 5.56e - 06*x^2 - 4.74e - 11*x^2y2 + 1.7e - 05*y^2$$

In another example embodiment having a concave perimeter around the plate with a max distance of 2.0 mm measured along the x-direction for y=0 (mid short to short of screen) and with a max distance of 1.5 mm measured along the y-direction for x=0 (mid long to long of screen). Where the top and bottom edges have 1.0 mm max distance and the left and right edges have 0.5 mm max distance:

$$z(x, y) = -2.5 + 5.56e - 06*x^2 - 2.37e - 11*x^2*y^2 + 1.28e - 05*y^2$$

Figure 13A:
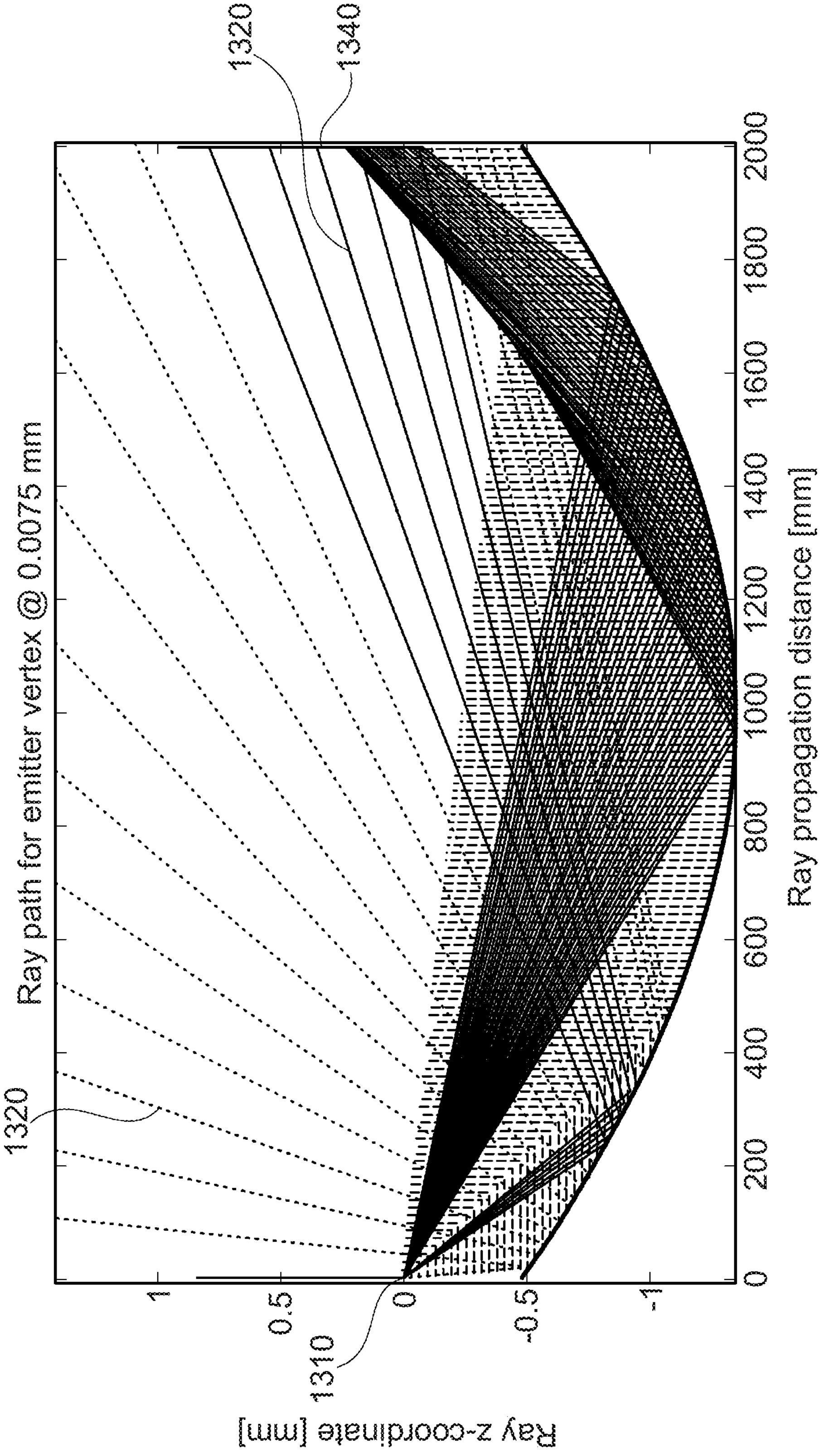
FIG. 13*a* shows a section render of light emitted from a point at an edge of a curved touch surface and propagating across the curved touch surface to be received at a detector at an opposite edge of the touch surface.

FIG. 13*a* shows a section view along the x-axis of light propagating across an example embodiment of a curved touch plate 10 touch surface having a curved profile in the x-axis. In the section view, the propagation paths of light from a point light source 1310 are shown. Dotted lines 1320 show propagation paths of light emitted from point light source 1310*a* that are not received by detector surface 1340. Solid lines 1330 show propagation paths of light emitted form point light source 1310 that are received by detector surface 1340. As shown in the figure, a portion of the light is lost above the detector, a portion is lost below the detector, and a portion of the light is received at the detector surface. A person looking from the emitter point towards the mirror image of the detector (mirrored in the touch surface) will perceive the detector size as 2.2 times larger than the real detector. This magnification effect is an effect of using an off axis parabolic mirror. In the specific case of touch systems, this results in a detection signal boost of a factor of 2.2, when comparing to a flat touch surface. This boost applies only to the signal and not significantly to the ambient light otherwise received by the detectors. In a preferred embodiment, the detectors and emitters of the touch system are 3 mm or less above the touch surface (either directly or indirectly) and the length of the detection lines being in the range from 100 to 2500 mm, the angle of incidence is extremely close to 90 degrees. With this, gracing incidence, dirt or anti-glare coatings on the touch surface have no practical impact of the reflection, so it is practically a mirror.

Figure 13B:
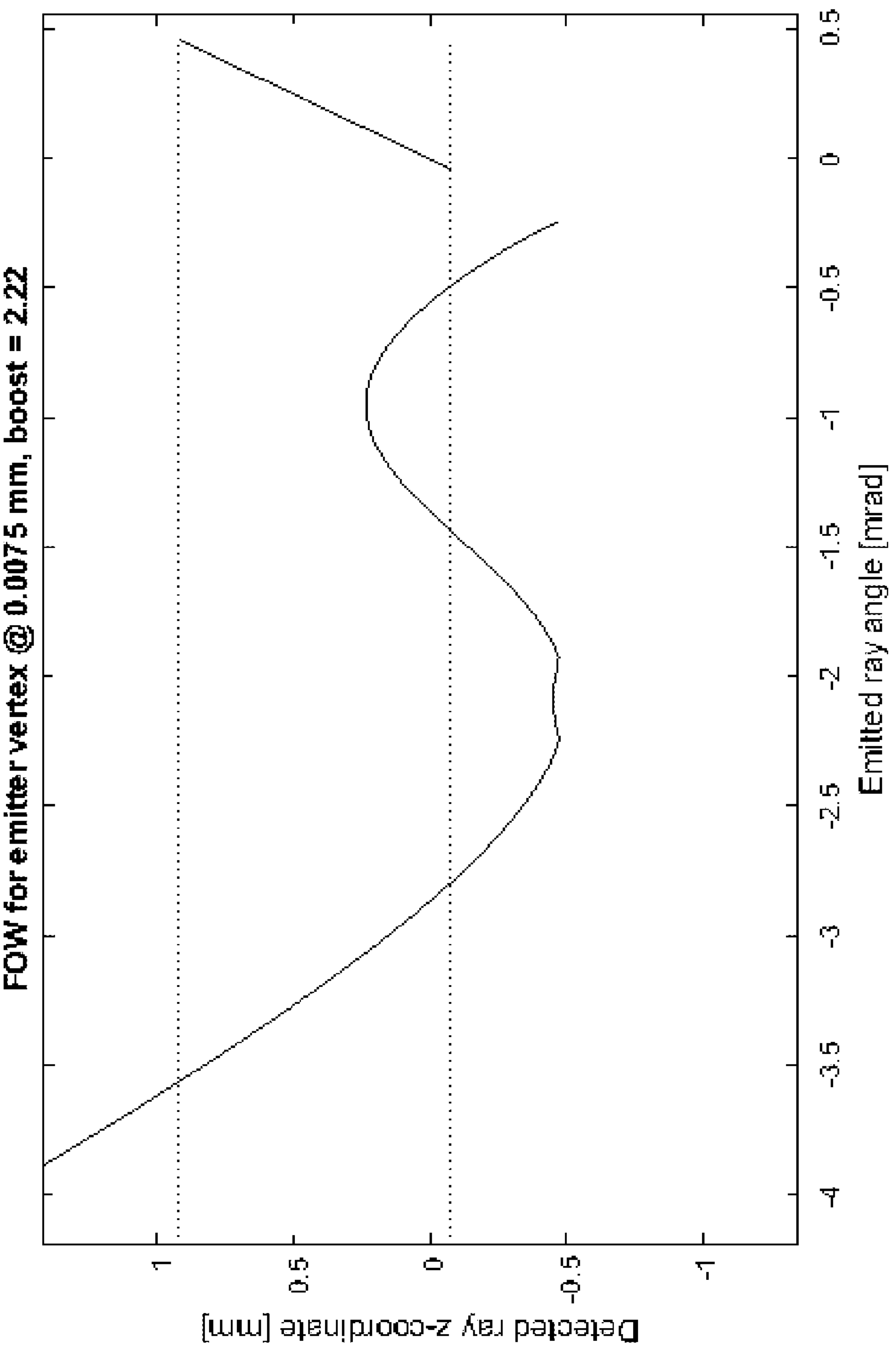
FIG. 13*b* shows a graph of light emitted from a point at an edge of a curved touch surface and received at a detector at an opposite edge of the touch surface with respect to the angle of the emitter light.

FIG. 13*b* provides a graph of the angle of the emitted light from the point light source 1310 with respect to the z-coordinate of the light path at the edge of the model of FIG. 13*a*. The detector surface z-coordinate range is shown by the vertical axis. Light emitted by point light source 1310 received at a z-coordinate within that range is received by the detector.

Figure 14A:
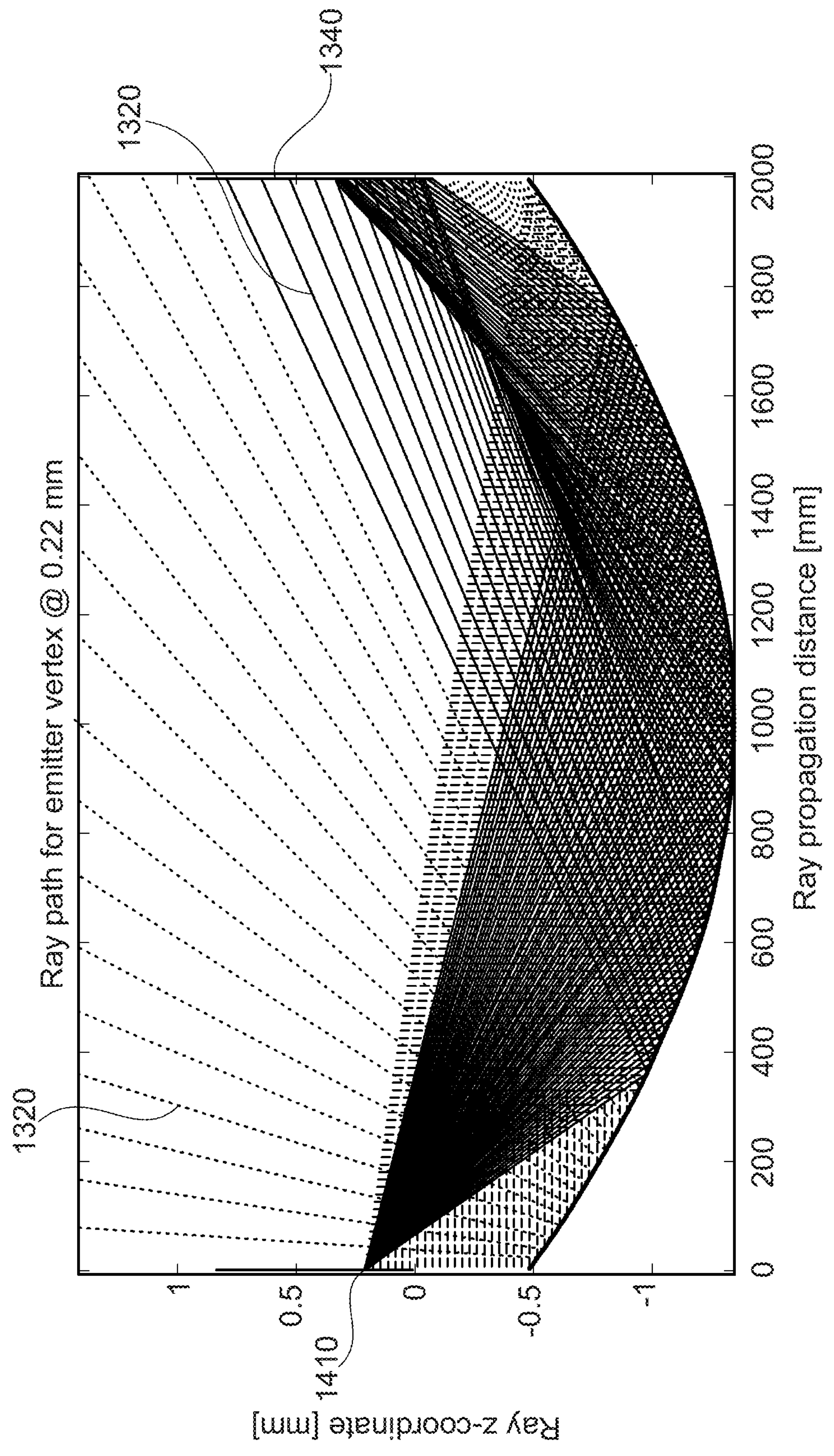
FIG. 14*a* shows a section render of light emitted from a point at an edge of a curved touch surface and propagating across the curved touch surface to be received at a detector at an opposite edge of the touch surface.
Figure 14B:
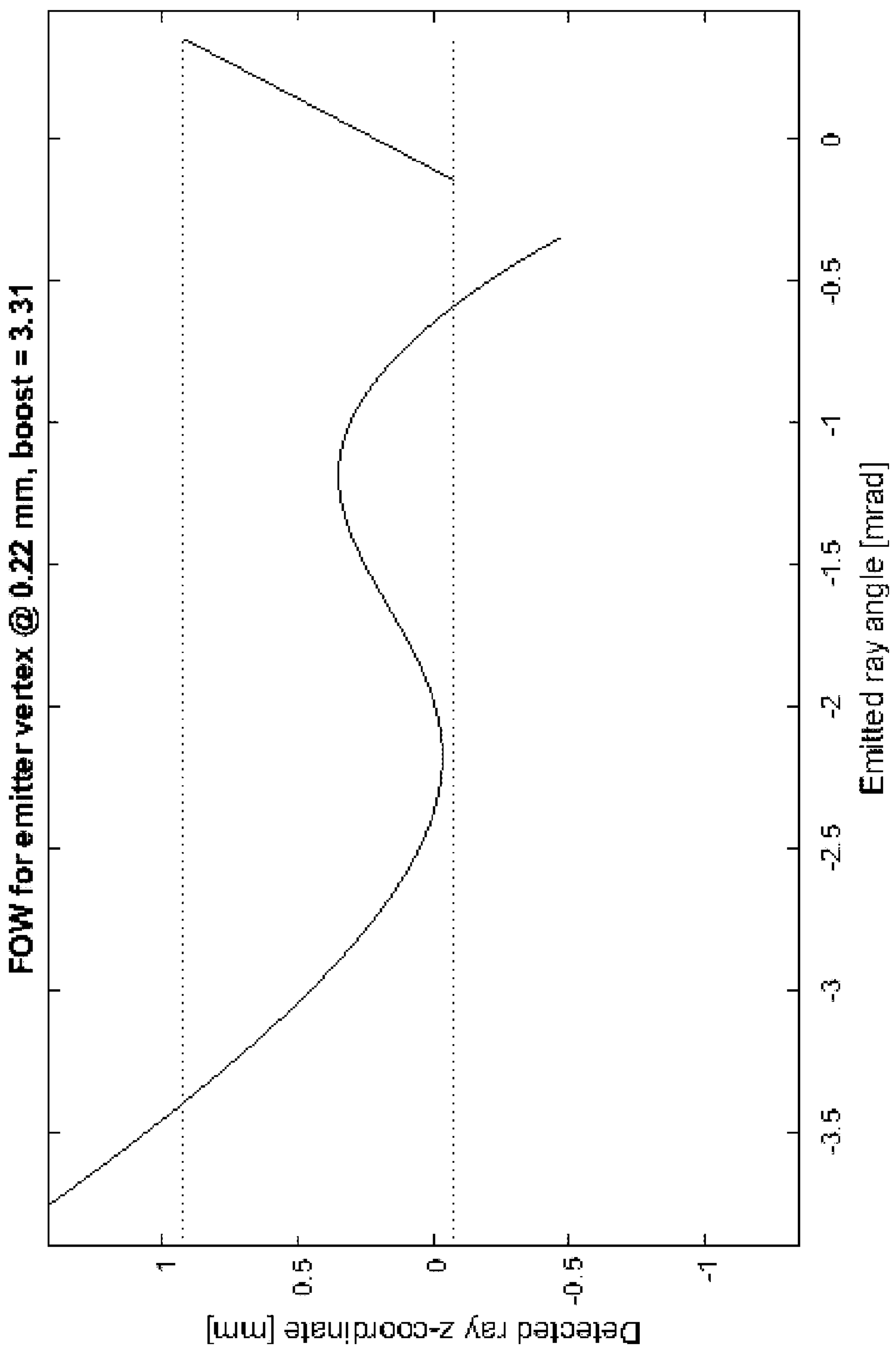
FIG. 14*b* shows a graph of light emitted from a point at an edge of a curved touch surface and received at a detector at an opposite edge of the touch surface with respect to the angle of the emitter light.

FIG. 14*a* shows a section view of the embodiment of FIG. 13*a*. In the section view, the propagation paths of light from a second point light source 1410 are shown. In this example, the detection signal boost is approximately 3.3. FIG. 14*b* shows the corresponding graph of FIG. 13*b* for the second point light source 1410.

Figure 15A:
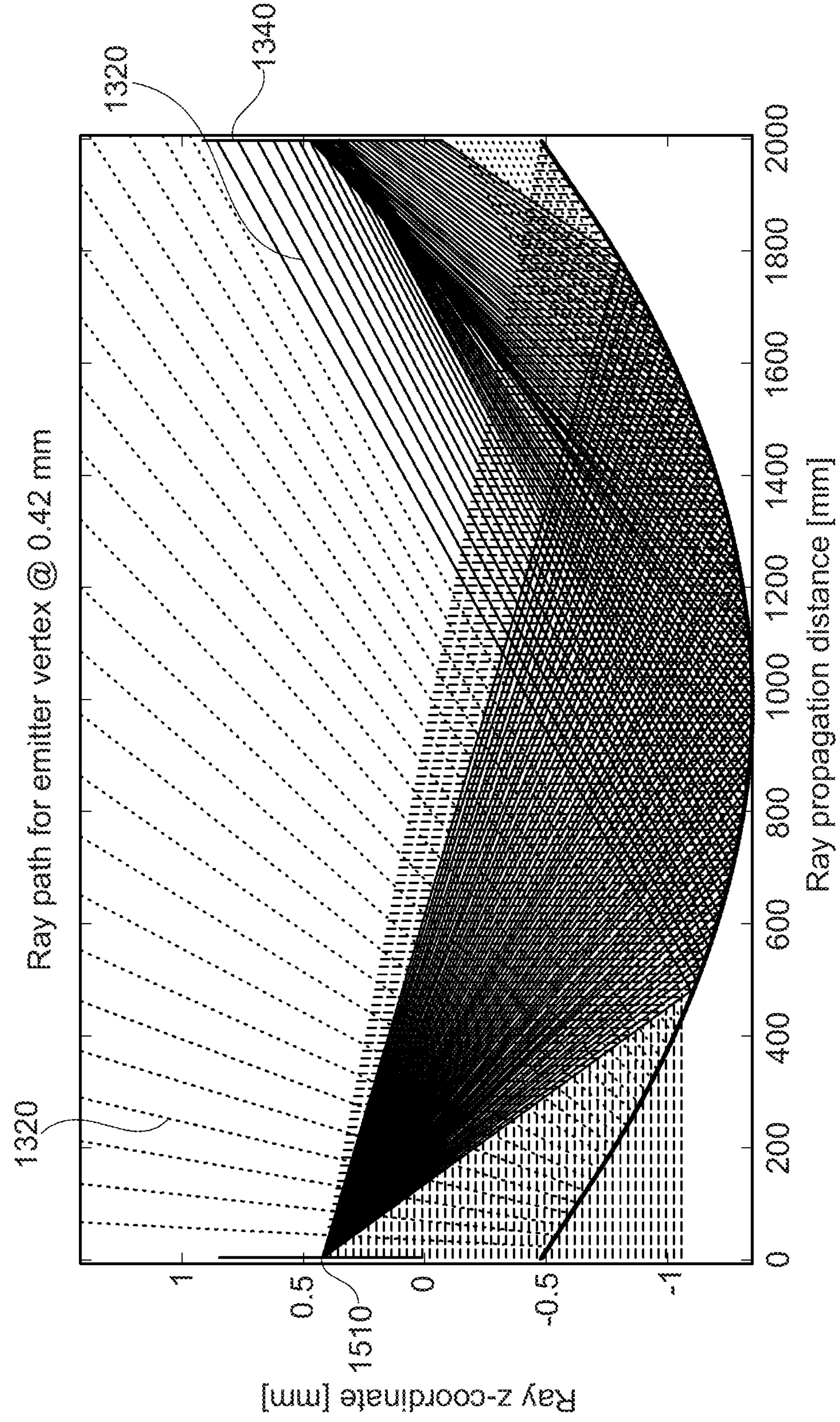
FIG. 15*a* shows a section render of light emitted from a point at an edge of a curved touch surface and propagating across the curved touch surface to be received at a detector at an opposite edge of the touch surface.
Figure 15B:
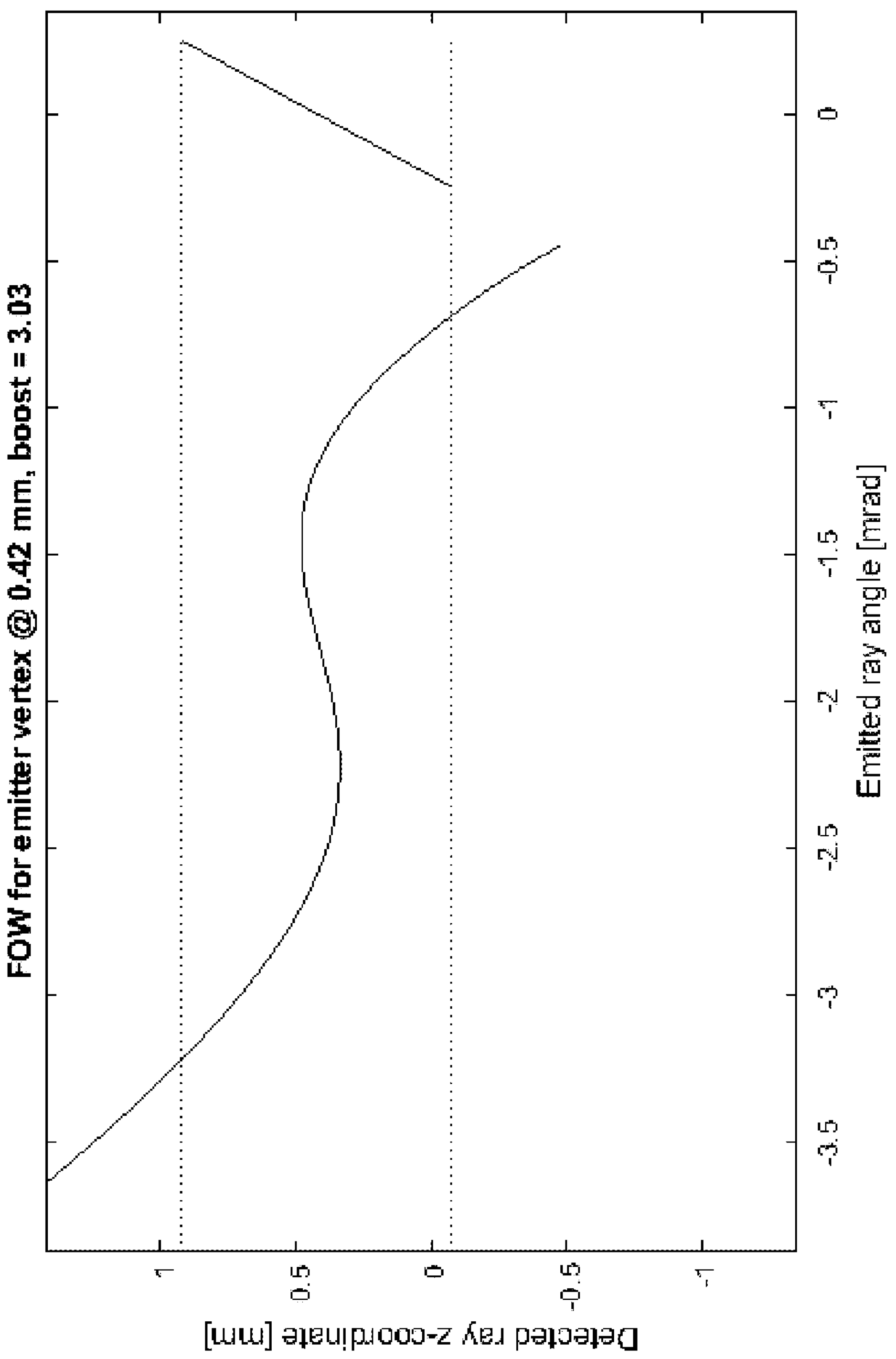
FIG. 15*b* shows a graph of light emitted from a point at an edge of a curved touch surface and received at a detector at an opposite edge of the touch surface with respect to the angle of the emitter light.

FIG. 15*a* shows a section view of the embodiment of FIG. 13*a*. In the section view, the propagation paths of light from a third point light source 1510 are shown. FIG. 15*b* shows the corresponding graph of FIG. 13*b* for the third point light source 1510. In this example, the detection signal boost is approximately 3.03.

Figure 16A:
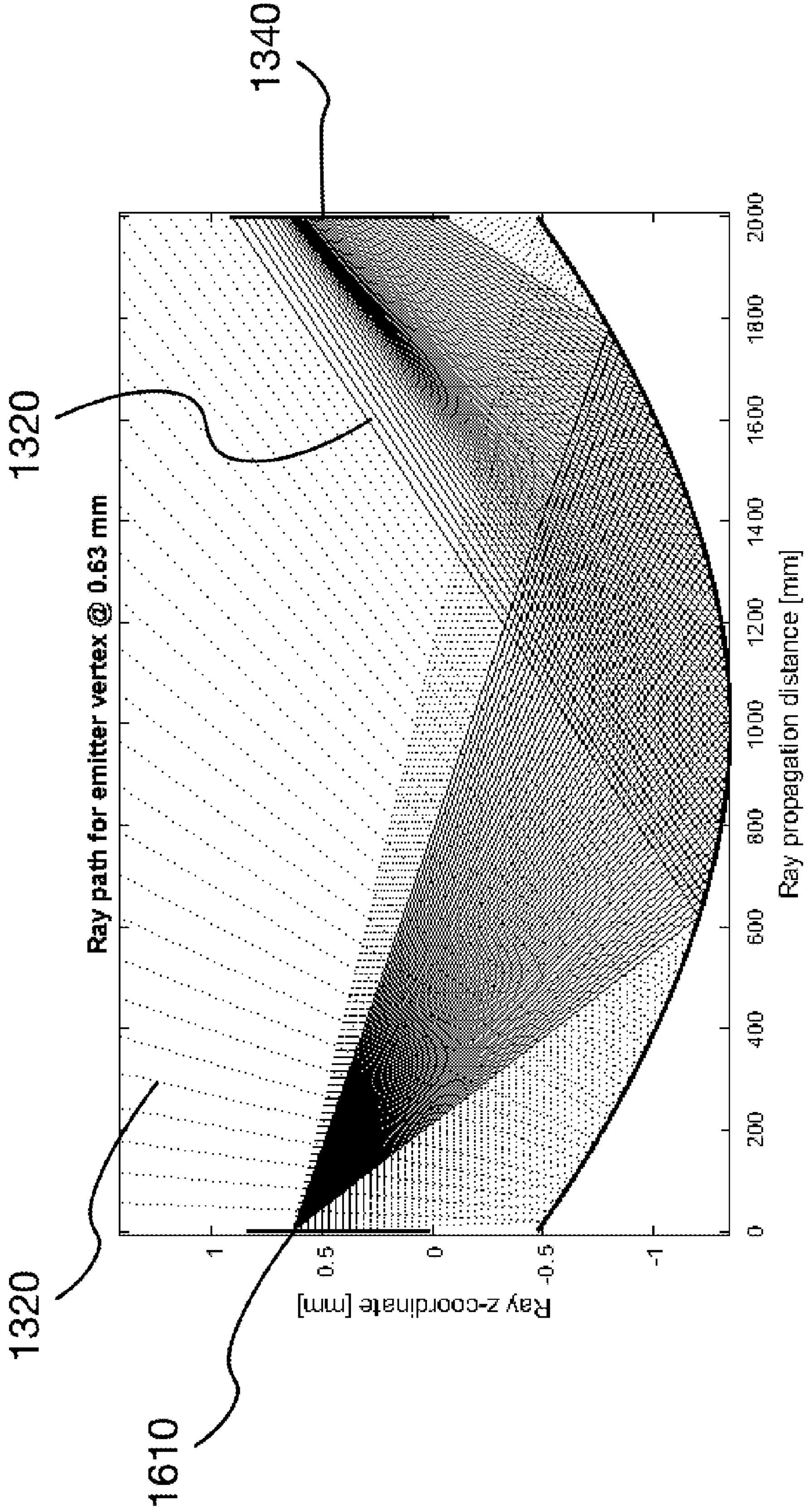
FIG. 16*a* shows a section render of light emitted from a point at an edge of a curved touch surface and propagating across the curved touch surface to be received at a detector at an opposite edge of the touch surface.
Figure 16B:
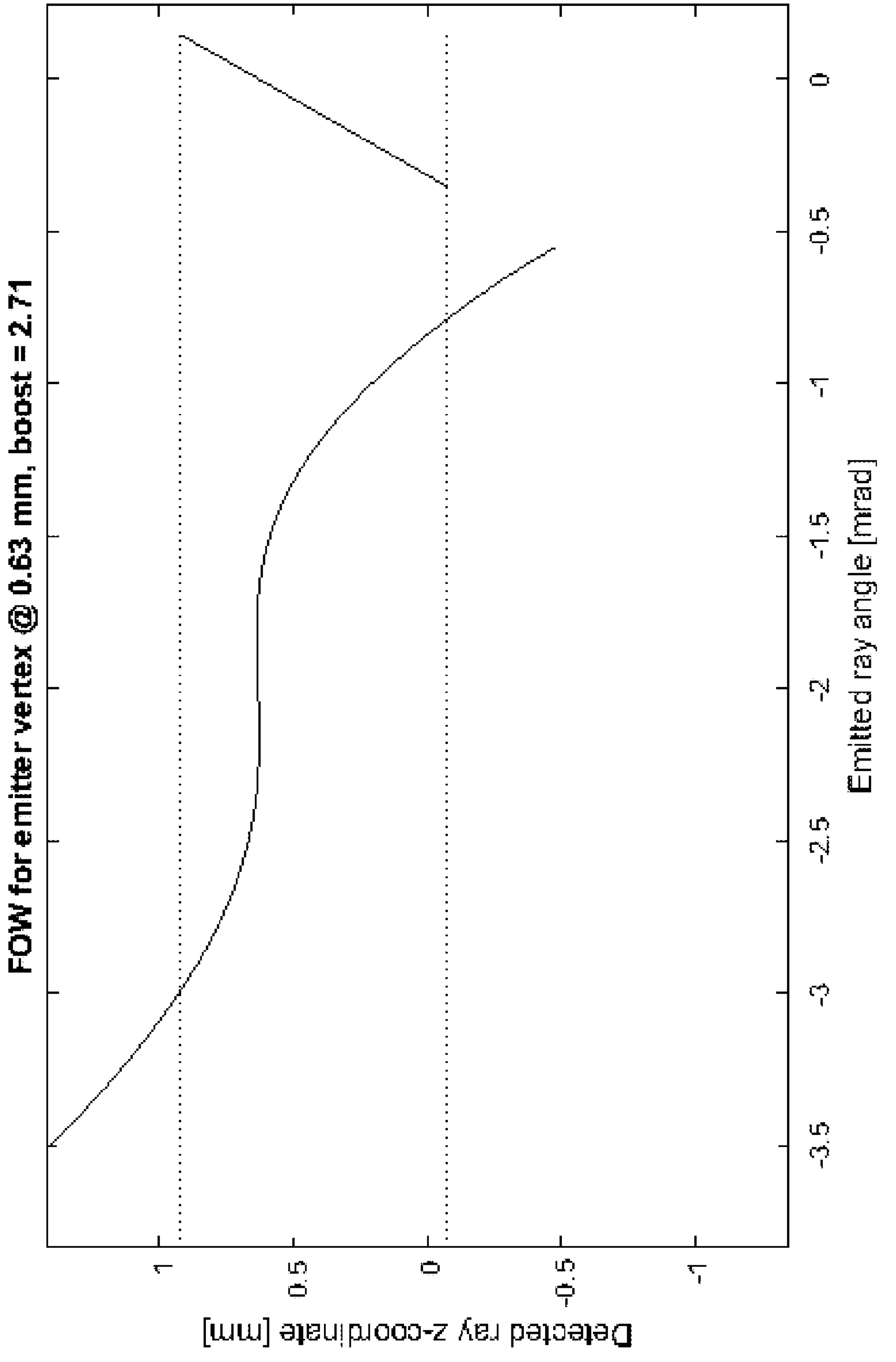
FIG. 16*b* shows a graph of light emitted from a point at an edge of a curved touch surface and received at a detector at an opposite edge of the touch surface with respect to the angle of the emitter light.

FIG. 16*a* shows a section view of the embodiment of FIG. 13*a*. In the section view, the propagation paths of light from a fourth point light source 1610 are shown. FIG. 16*b* shows the corresponding graph of FIG. 13*b* for the fourth point light source 1610. In this example, the detection signal boost is approximately 2.71.

Figure 17A:
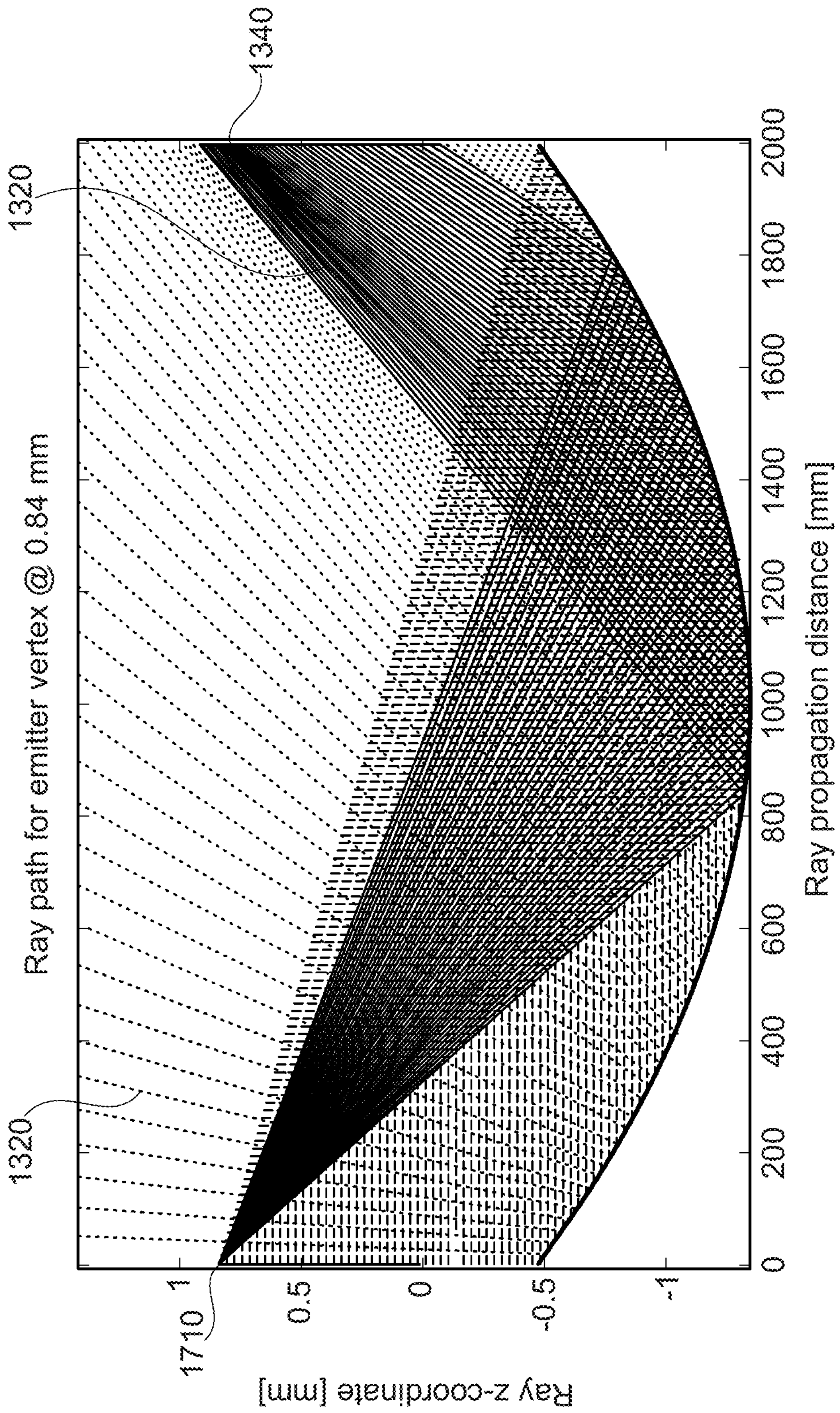
FIG. 17*a* shows a section render of light emitted from a point at an edge of a curved touch surface and propagating across the curved touch surface to be received at a detector at an opposite edge of the touch surface.
Figure 17B:
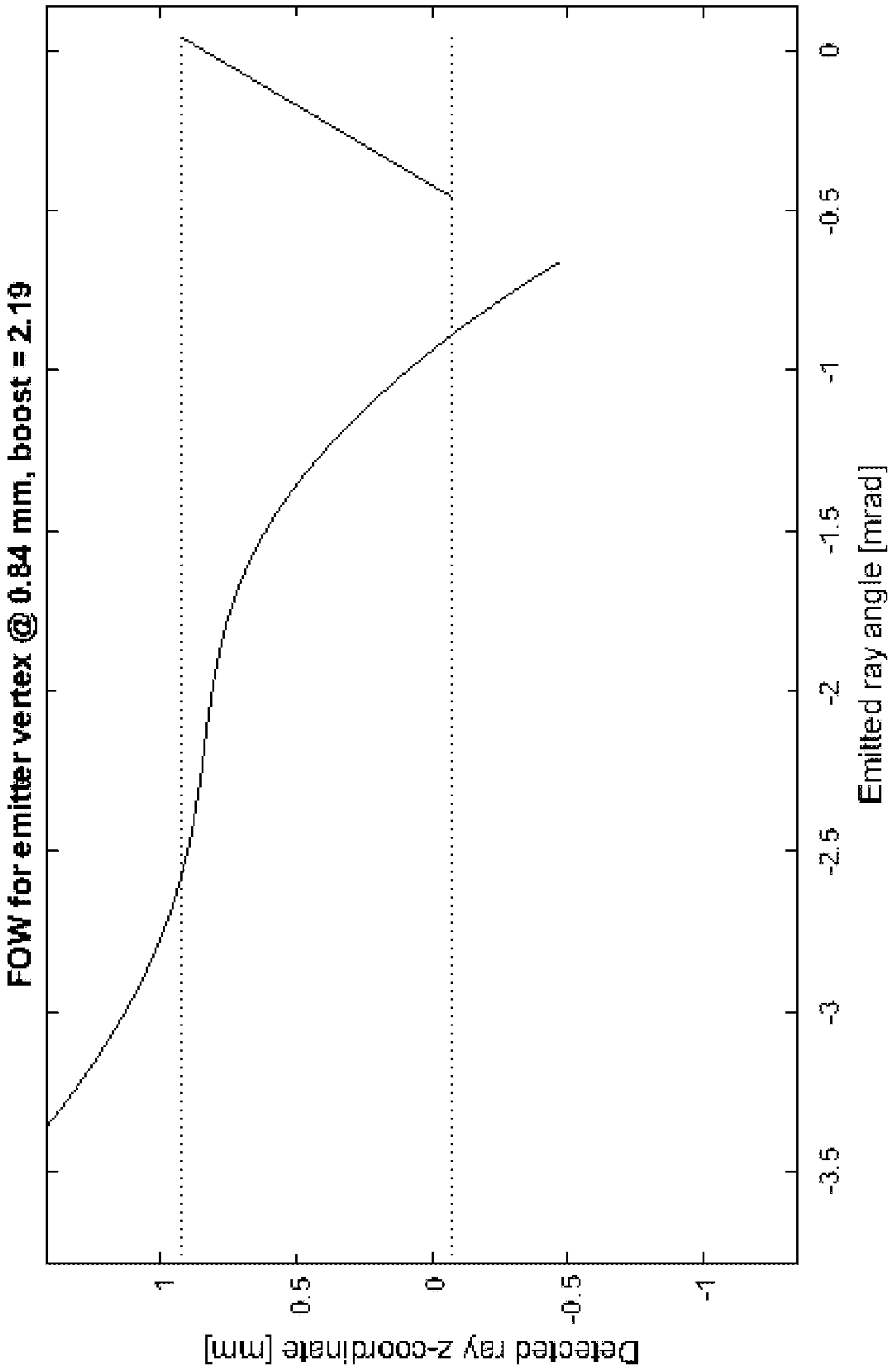
FIG. 17*b* shows a graph of light emitted from a point at an edge of a curved touch surface and received at a detector at an opposite edge of the touch surface with respect to the angle of the emitter light.

FIG. 17*a* shows a section view of the embodiment of FIG. 13*a*. In the section view, the propagation paths of light from a fifth point light source 1710 are shown. FIG. 17*b* shows the corresponding graph of FIG. 13*b* for the fifth point light source 1710. In this example, the detection signal boost is approximately 2.19.

FIGS. 13*a*-17*b* demonstrate that different emitter positions utilize different parts of the touch surface. The parts of the touch surface that work as reflectors will depend on the actual shape of the glass and the placement and sizes of the emitter and detector apertures surface 1340.

However, the touch plate 10 cannot be manufactured, positioned, or held in shape perfectly. Consequently, a certain amount of deviation can be expected between the curve followed by the touch surface and an ideal parabolic curve.

Figure 18A:
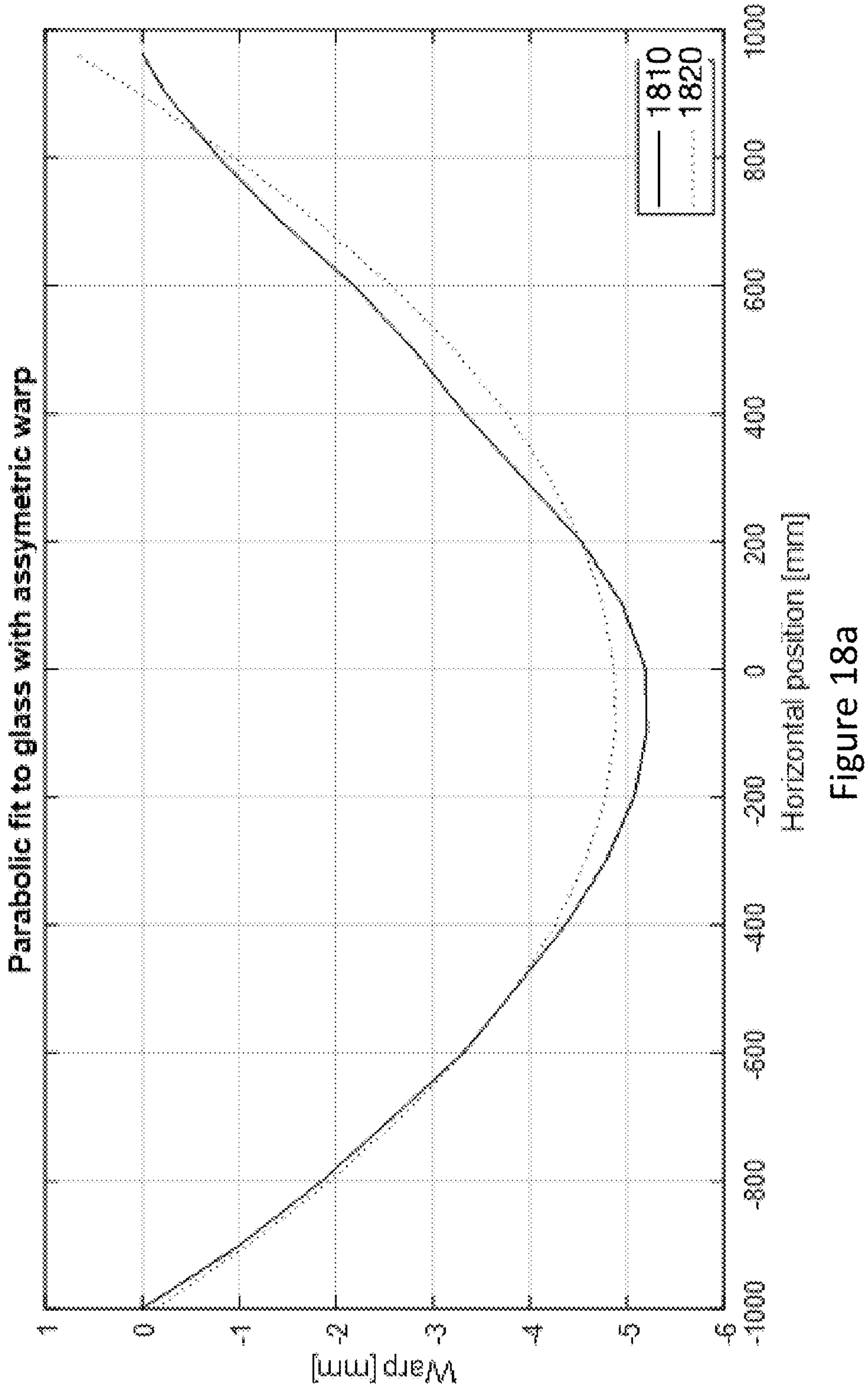
FIG. 18*a* shows a curvature of a real touch surface vs a parabolic curved surface along an x-axis.

FIG. 18*a* shows a graph of a mathematically defined parabolic curve and a real-world parabolic touch surface. In the example embodiment of FIG. 18*a*, a curved touch plate 10 has a width of 1900 mm along the x-axis and a height of 1070 mm along the y-axis (wherein the x-axis and y-axis are defined as in the embodiment shown in FIGS. 12*a*,4*b*). In this example embodiment, the glass is shaped such that the touch surface follows parabolic curve 1810 relative to the x-axis. The maximum distance a between the touch surface and the x-axis is 10 mm. The mathematically defined parabolic curve is defined as 1820. The graph shows the deviation between the mathematically defined parabolic curve represented by dotted line 1820 and real touch surface 1810. Here, the real touch surface is asymmetrically warped. FIG. 10*b* shows the short to short mid cross section of a 2180 mm diagonal, 16:9 ratio, thermally tempered glass that is just within or at the maximum limit of concave distance<6 mm as well as |parabolic deviation|<0.5 mm.

The parabolic fit of the touch surface 1810 has an s-shaped residual. Such asymmetrical warping may be the result of problems with transport rollers or an uneven temperature distribution during the rapid cooling phase of tempering process during manufacture.

Figure 18B:
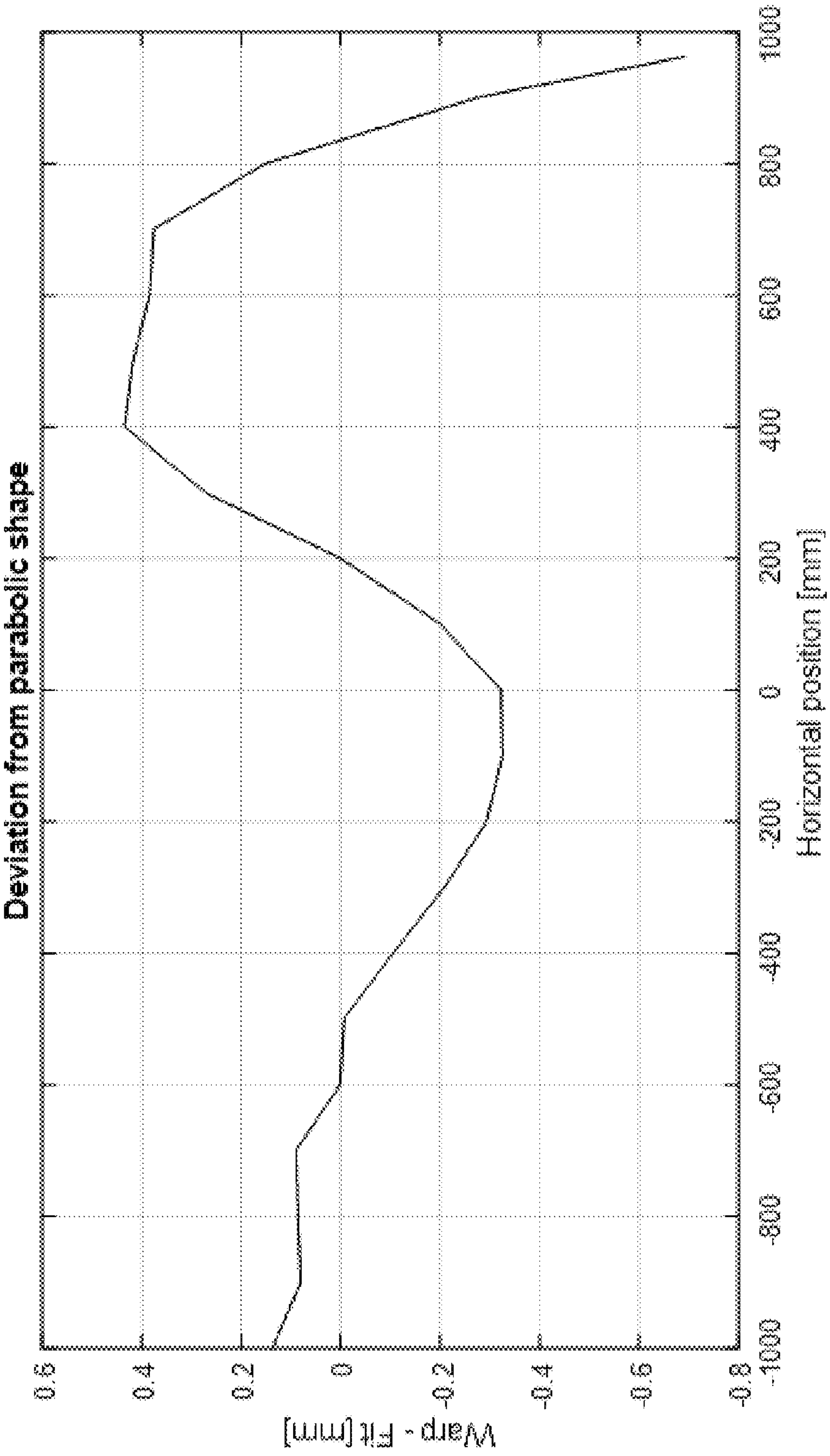
FIG. 18*b* shows a deviation between a real touch surface vs a parabolic curved surface along an x-axis.

FIG. 18*b* shows a graph of the deviation between the mathematically defined parabolic curve and a real-world parabolic touch surface of FIG. 18*a*.

The following table defines a preferred set of restrictions on the shape of the touch surface in order to achieve an optimal touch surface shape. The term 'warp' defines the distance of the touch surface from the respective axis intersecting the center point O in the direction of the z-axis.

| Glass size | Min x-axis warp (mm) | Max x-axis warp (mm) | Min y-axis warp (mm) | Max y-axis warp (mm) | Max convexity* (mm) | Max parabolic deviation (mm) |
|---|---|---|---|---|---|---|
| 55" | 1.0 | 3.50 | 0.0 | 1.35 | 0.1 | 0.5 |
| 65" | 1.0 | 4.50 | 0.0 | 1.65 | 0.1 | 0.5 |
| 70" | 1.0 | 5.10 | 0.0 | 1.85 | 0.1 | 0.5 |
| 75" | 1.0 | 5.70 | 0.0 | 2.00 | 0.1 | 0.5 |
| 84"-86" | 1.0 | 6.00 | 0.0 | 2.00 | 0.1 | 0.5 |

Convexity b is shown in FIG. 18*a*. Parabolic deviation is shown in FIG. 18*b*.

Figure 19A:
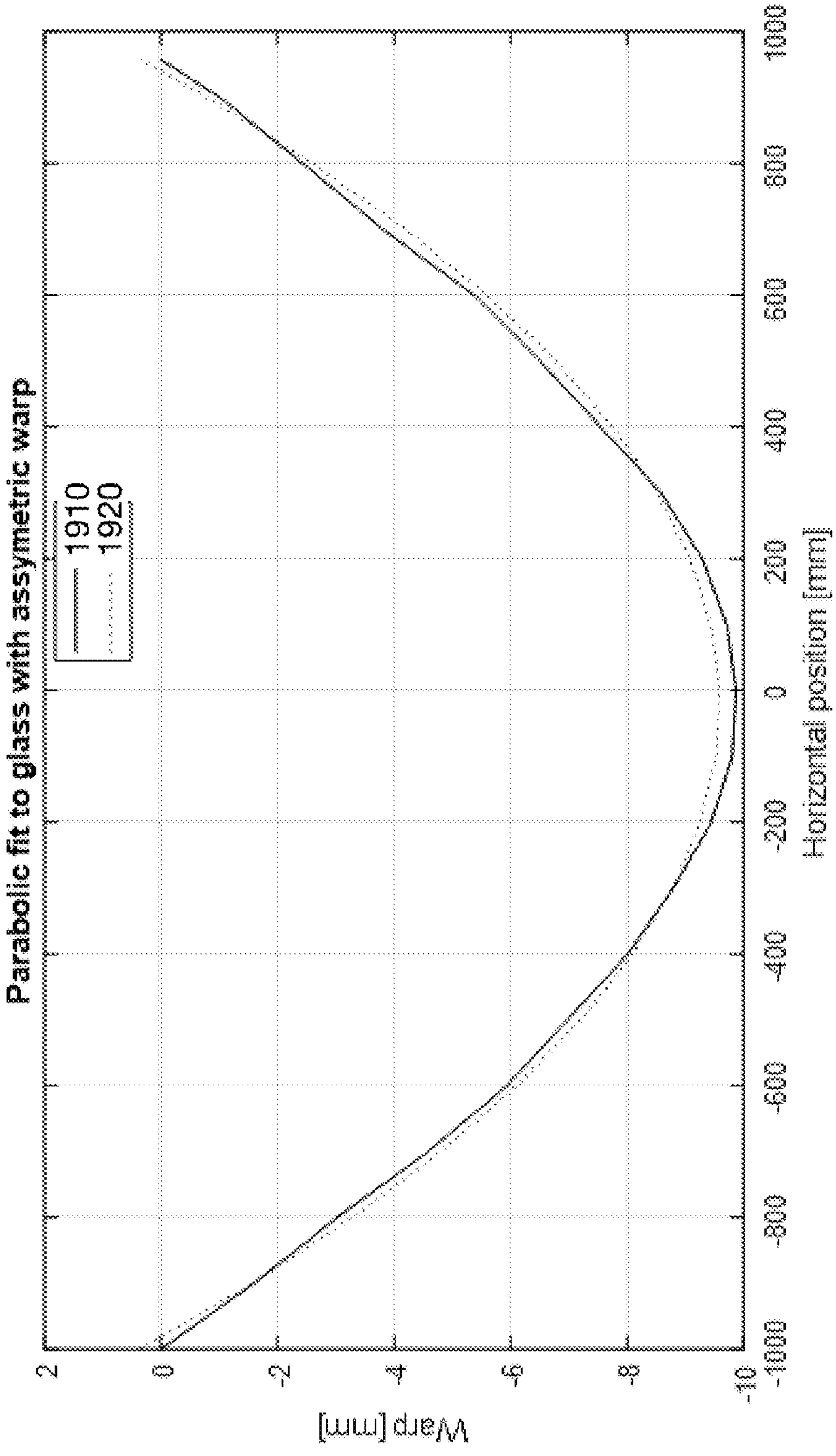
FIG. 19*a* shows a curvature of a real touch surface vs a parabolic curved surface along an x-axis.

FIG. 19*a* shows another graph of a mathematically defined parabolic curve and a similar glass to that of FIG. 18*a* but wherein the glass of FIG. 19*a* is out of range and not recommended for touch system production. One reason for the large concavity shown in FIG. 19*a* may be that the tempering process has been run with too large differences between bottom and top cooling parameters in a quenching process during manufacturing. The mathematically defined parabolic curve is defined as 1920. The graph shows the deviation between the mathematically defined parabolic curve and real touch surface 1910.

Figure 19B:
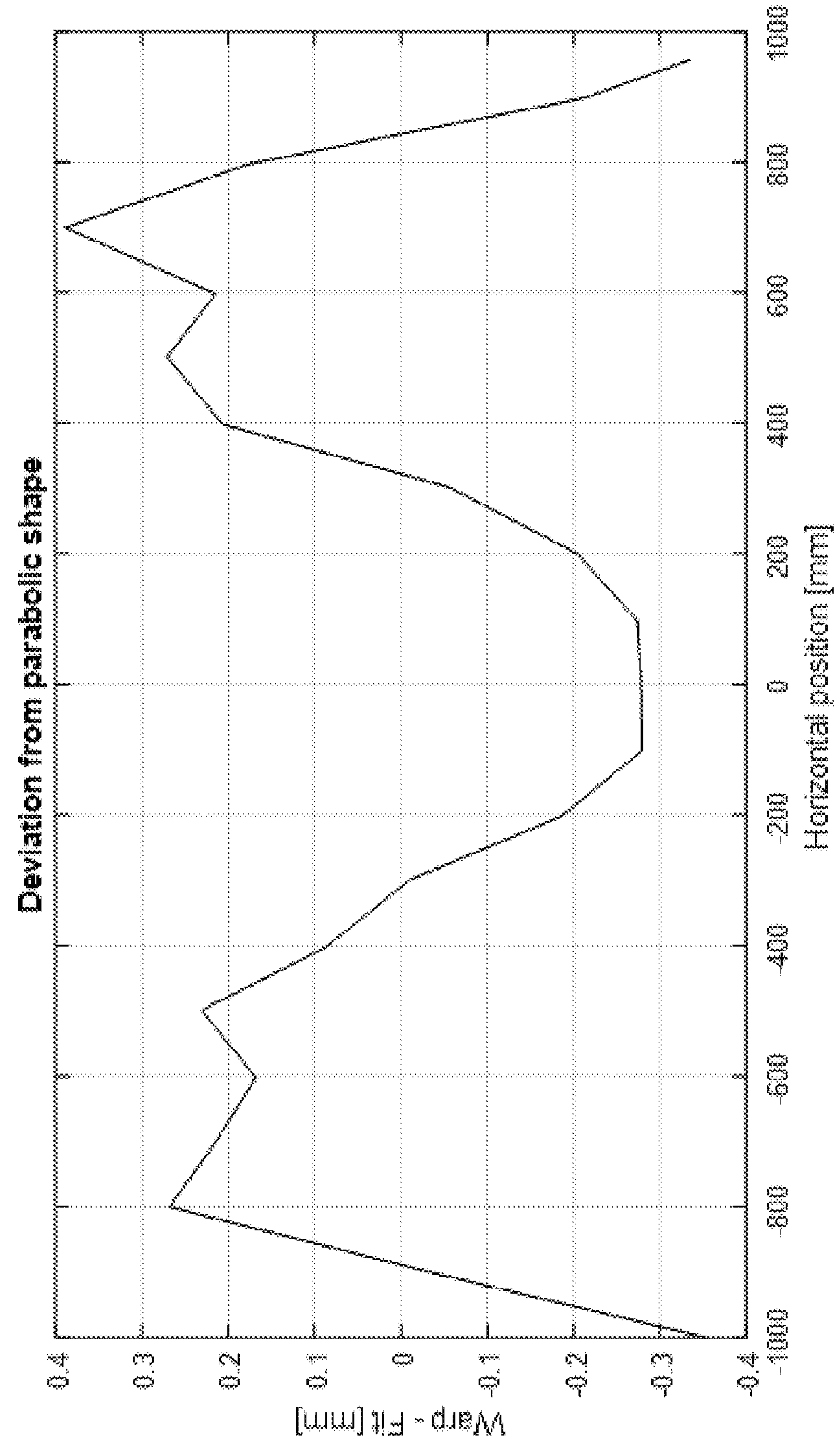
FIG. 19*b* shows a deviation between a real touch surface vs a parabolic curved surface along an x-axis.

FIG. 19*b* shows a graph of the deviation between the mathematically defined parabolic curve and a real-world parabolic touch surface of FIG. 19*a*. The real-world parabolic touch surface of FIG. 19*a* is an example of a symmetrical but higher order warping (e.g. W shaped). Such warping may significantly reduce signal boost and may be caused by symmetrical temperature problems (e.g. too hot in center or edge of glass) during the manufacturing tempering process.

Figure 20A:
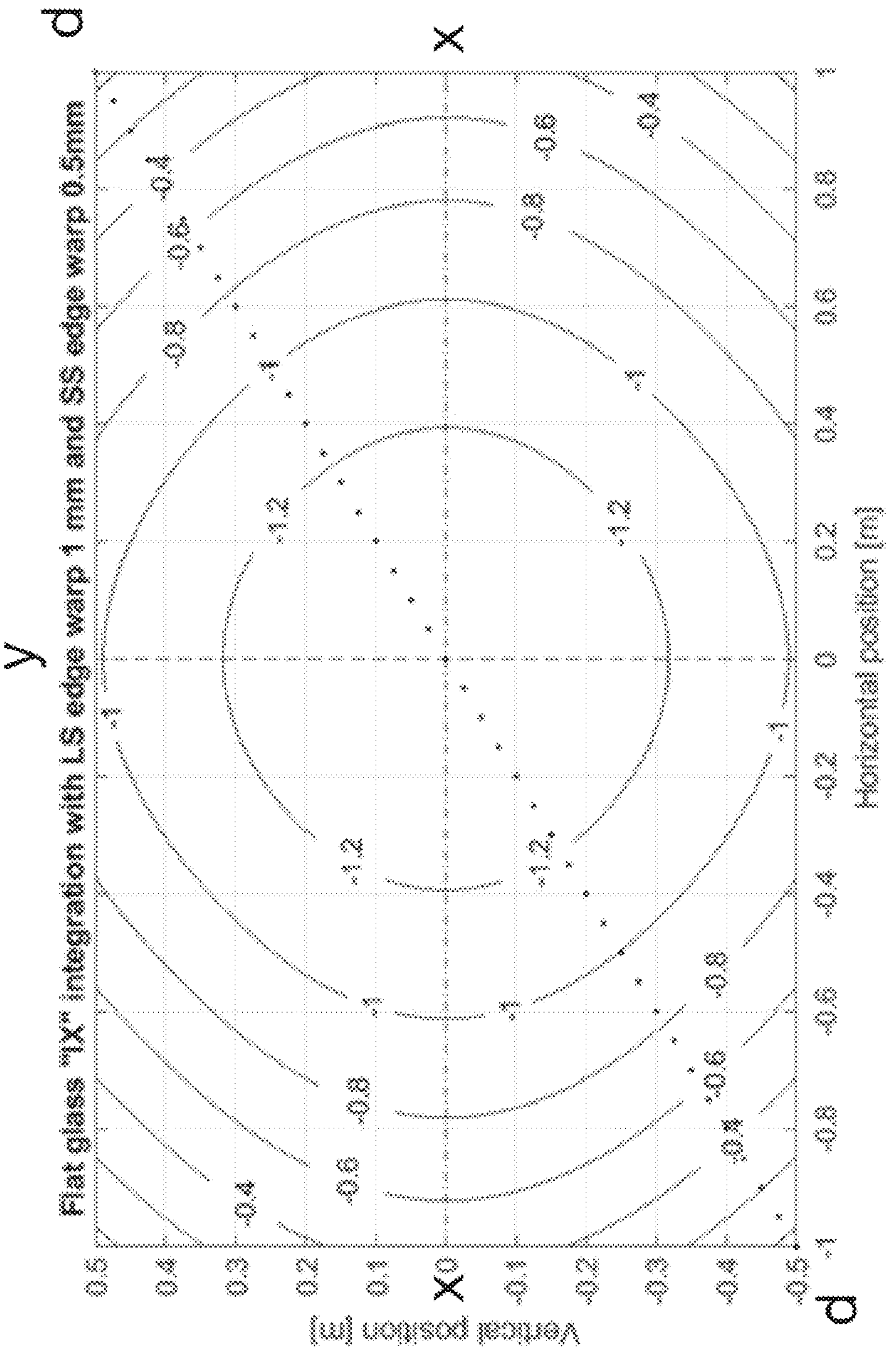
FIG. 20*a* shows top view of displacement contours for a touch surface according to an embodiment.
Figure 20B:
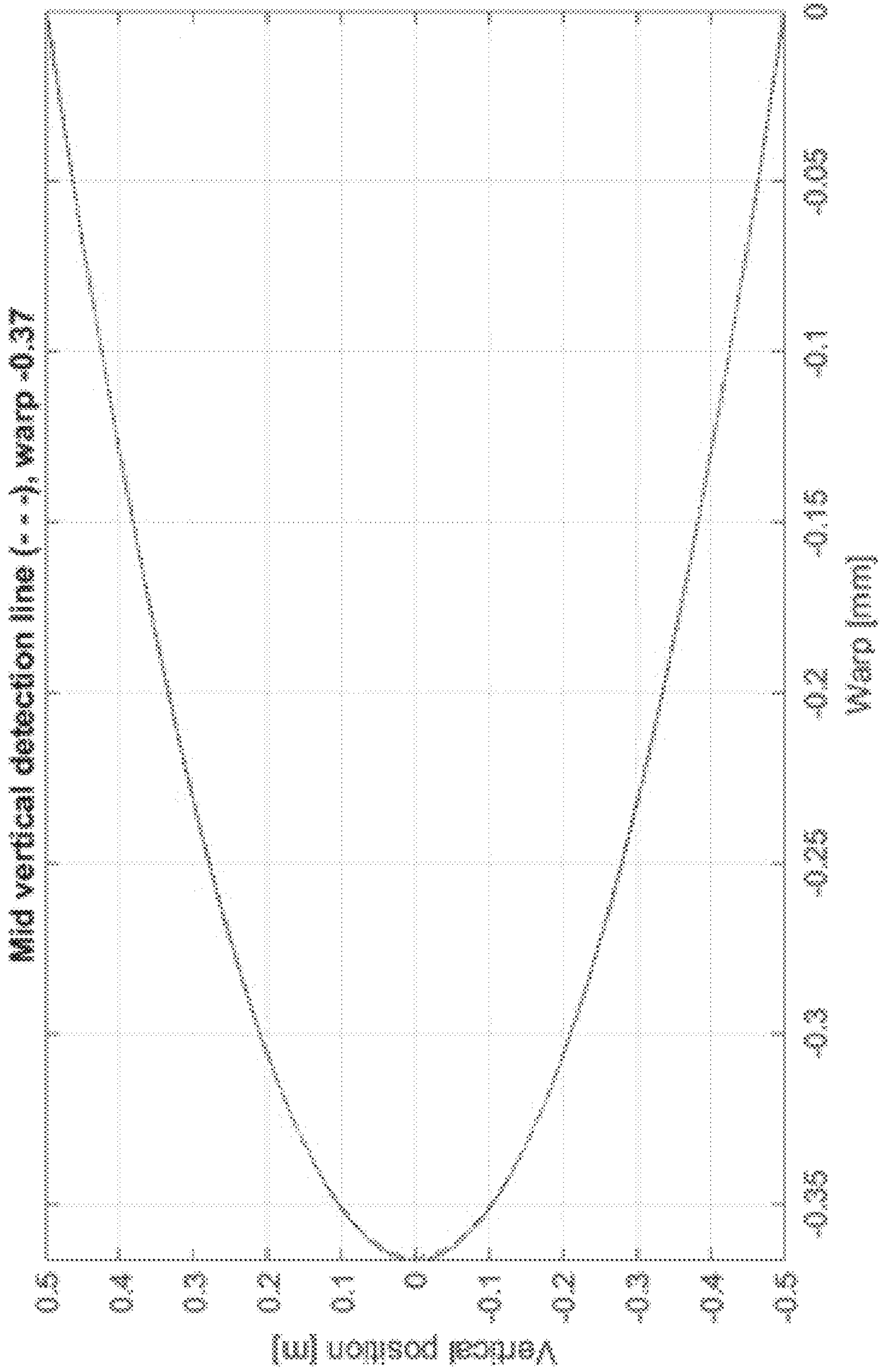
FIG. 20*b* shows curvature of a touch surface along an x-axis according to the embodiment of FIG. 20*a;*

FIG. 20*a* shows an embodiment in which the touch surface forms a paraboloid. In FIG. 20*a*, a top plan view of the touch surface is shown with contour lines showing the depth of the touch surface relative to a flat plane intersecting the four corners of the touch surface. The numbers shown on each contour represents the depth of the contour. The x-axis, y-axis, and diagonal-axis d are all shown. The x-axis is defined as an axis running parallel to and equidistant from the pair of long edges of the rectangle. The y-axis is defined as an axis running parallel to and equidistant from the pair of short edges of the rectangle. Diagonal-axis d is defined as an axis running diagonally from one corner to a diagonally opposite corner. In this embodiment, the x-axis, y-axis, and diagonal axis d of touch surface 10 each describe a parabola with respect to the depth of the touch surface. In FIG. 20*b*, diagonal-axis d is shown running from the bottom left corner to the top right corner. In the example embodiment of FIG. 20*a*, the curved touch plate 10 has a width of 1900 mm along the x-axis and a height of 1070 mm along the y-axis.

Figure 20C:
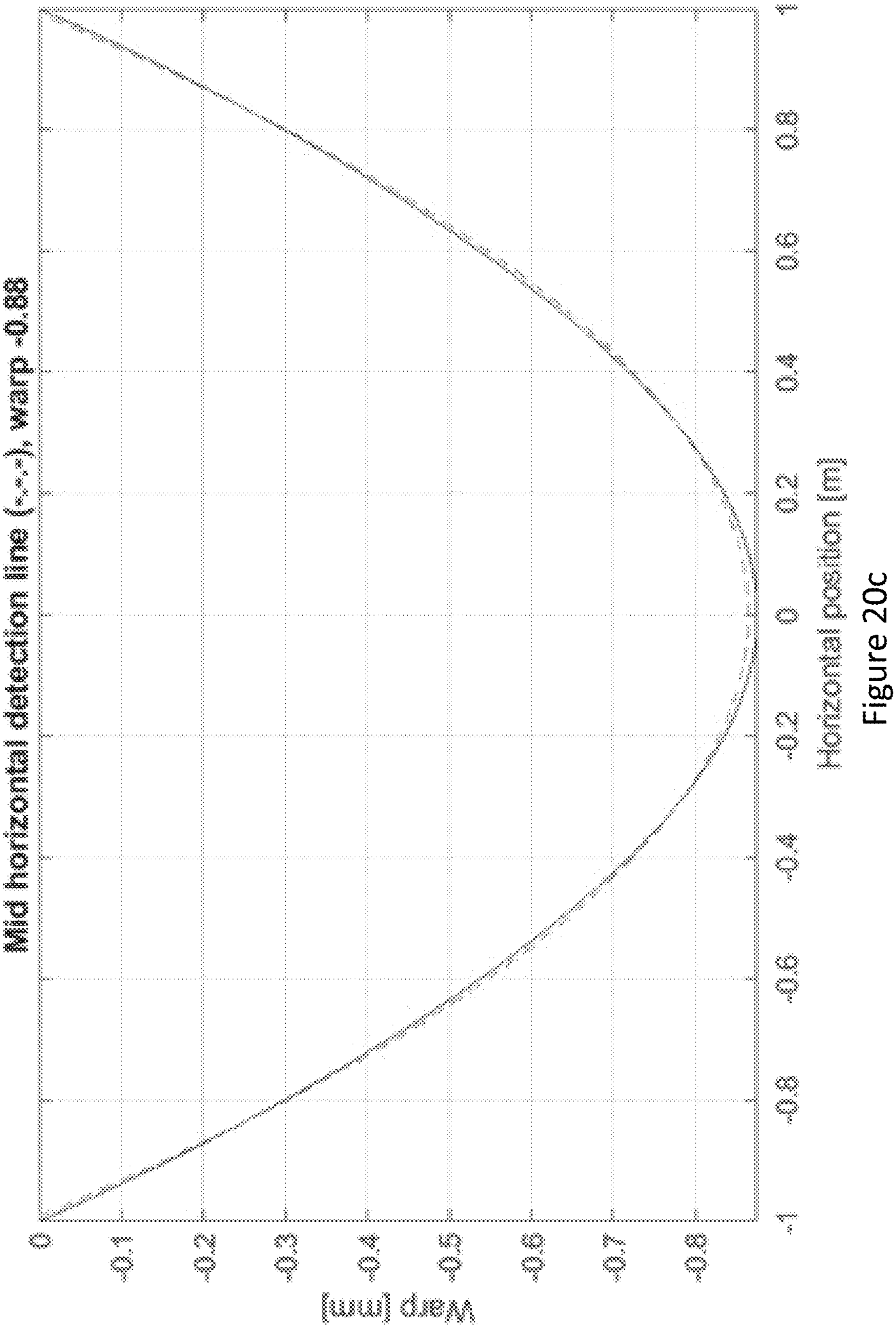
FIG. 20*c* shows curvature of a touch surface along a y-axis according to the embodiment of FIG. 20*a;*
Figure 20D:
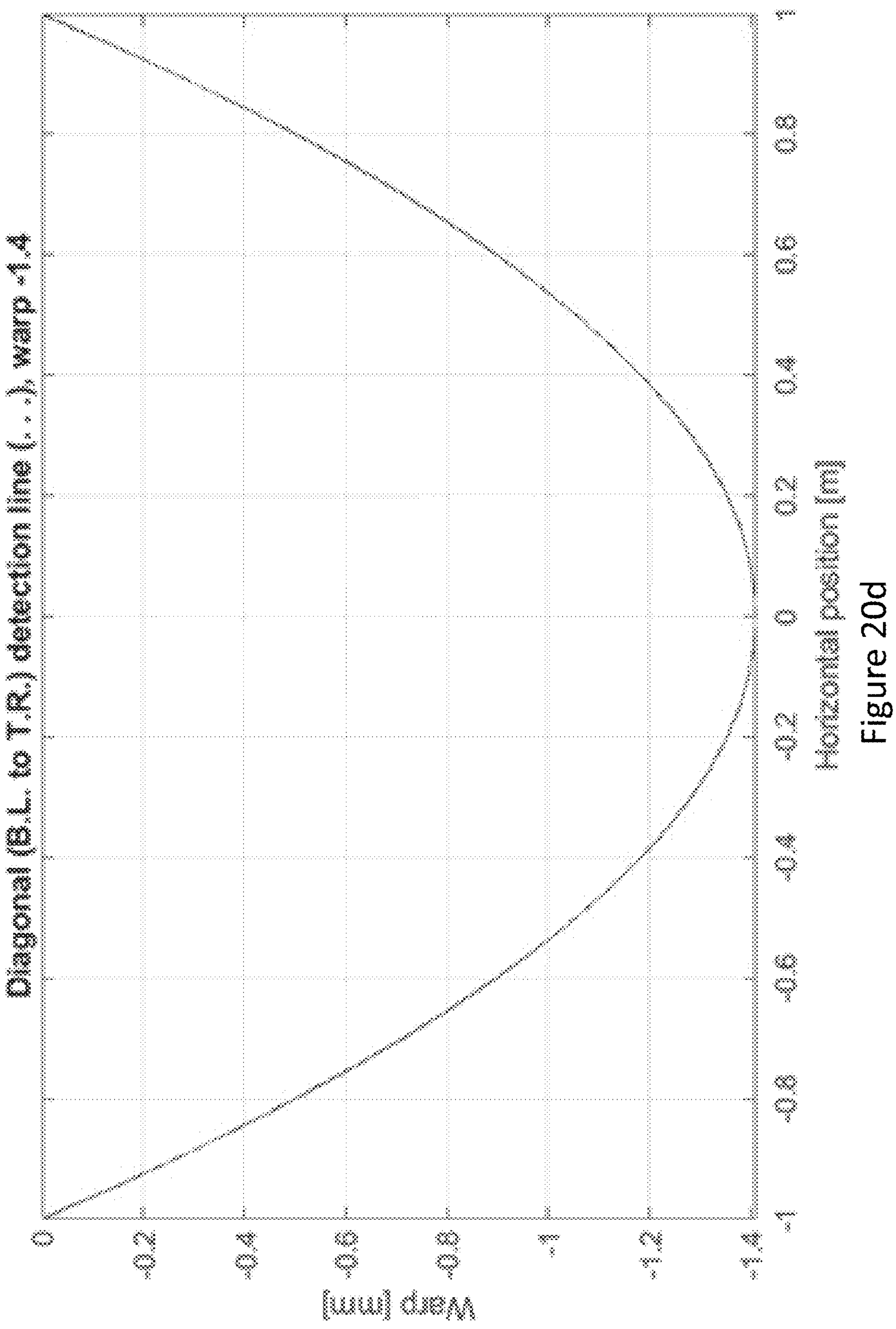
FIG. 20*d* shows curvature of a touch surface along a diagonal line according to the embodiment of FIG. 20*a;*

FIGS. 20*b*-20*d* show optional parabola configurations for the embodiment shown in FIG. 20*a*. FIG. 20*b* shows a graph of the desired parabola of the touch surface underneath the x-axis and relative to the x-axis. The deviation (bottom axis) from the x-axis is shown relative to the position (left axis) along the x-axis. FIG. 20*c* shows a graph of the desired parabola of the touch surface underneath the y-axis and relative to the y-axis. The deviation (bottom axis) from the x-axis is shown relative to the position (left axis) along the y-axis. FIG. 20*d* shows a graph of the desired parabola of the touch surface underneath the diagonal-axis and relative to the diagonal-axis. The deviation (bottom axis) from the x-axis is shown relative to the position (left axis) along the diagonal-axis.

The embodiments shown in FIG. 20*a*-20*d* describe a touch surface providing substantial signal boost for signals travelling between most emitters and detectors. However, the non-flat perimeter of the touch surface makes manufacture and assembly of such a system more complex.

Figure 21A:
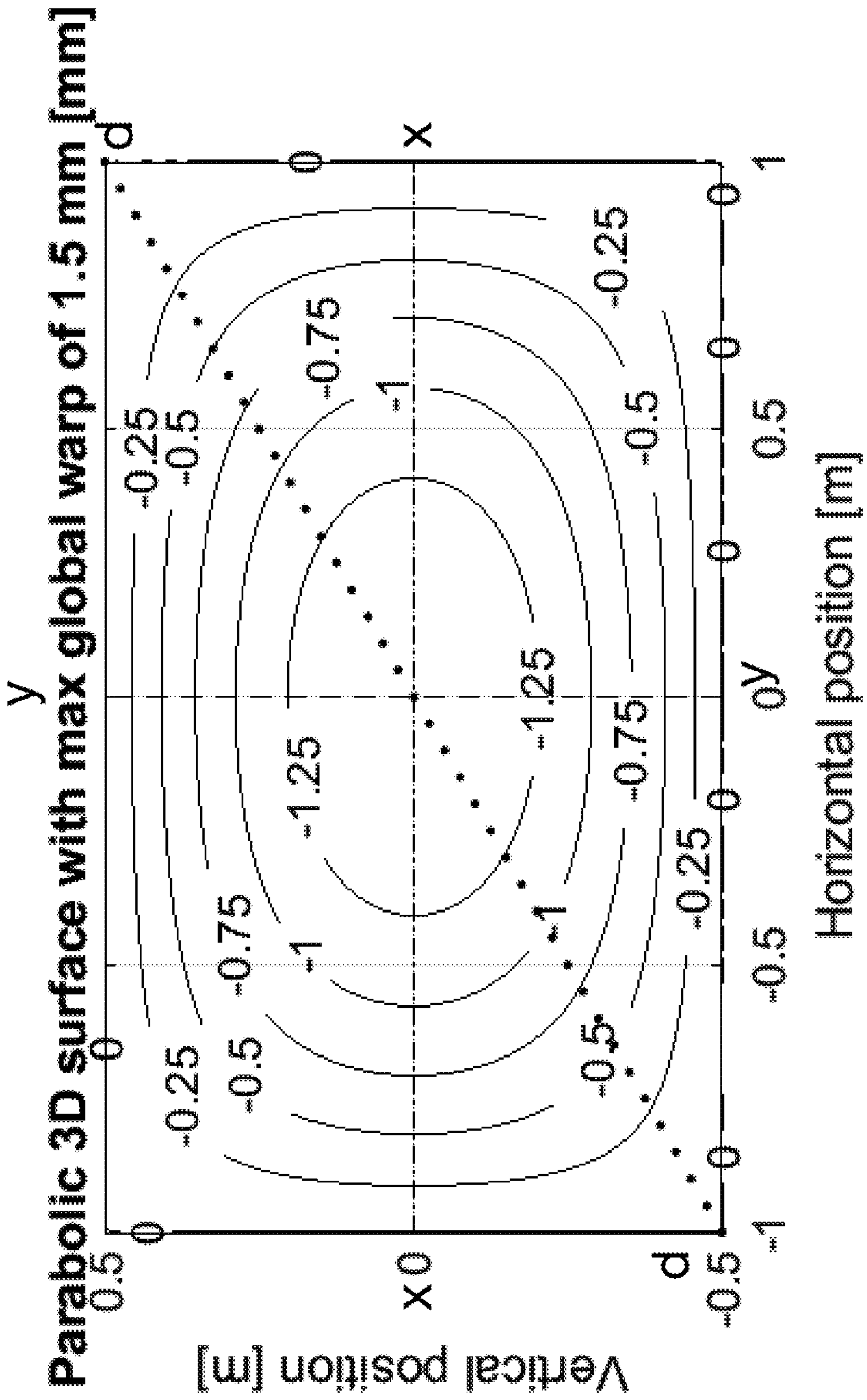
FIG. 21*a* shows top view of displacement contours for a touch surface according to another embodiment.
Figure 21B:
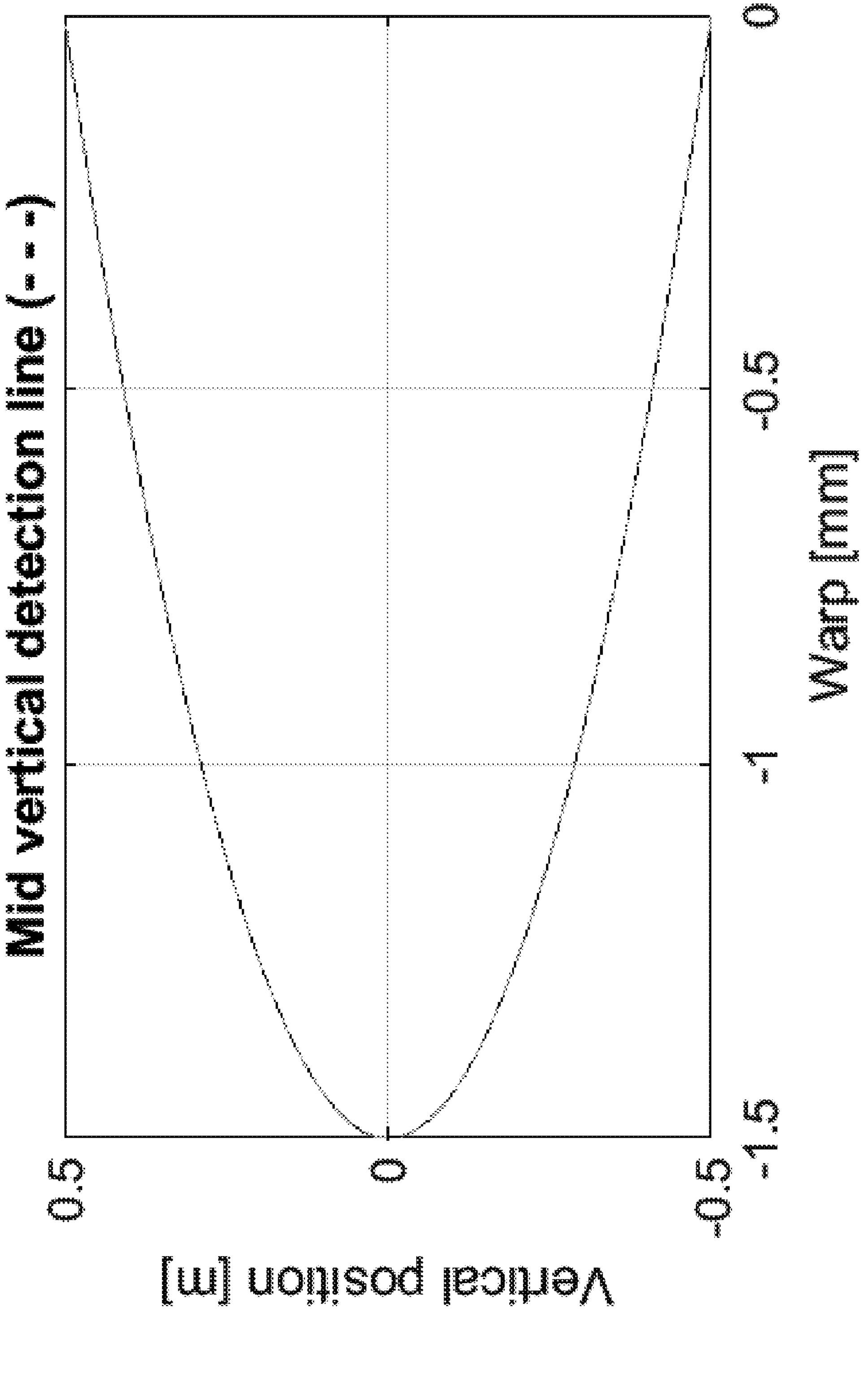
FIG. 21*b* shows curvature of a touch surface along an x-axis line according to the embodiment of FIG. 21*a;*

FIG. 21*a* shows an embodiment in which the touch surface forms an alternative paraboloid to that of the embodiment shown in FIG. 20*a*. As with FIG. 20*a*, FIG. 21*a* provides a top plan view of the touch surface is shown with contour lines showing the depth of the touch surface relative to a flat plane intersecting the four edges of the touch surface 10. The numbers shown on each contour represents the depth of the contour. X-axis, y-axis, and diagonal-axis d are all shown. The x-axis is defined as an axis running parallel to and equidistant from the pair of long edges of the rectangle. In this embodiment, the x-axis of touch surface 10 describes a parabola with respect to the depth of the touch surface. The y-axis is defined as an axis running parallel to and equidistant from the pair of short edges of the rectangle. In this embodiment, the y-axis of touch surface 10 also describes a parabola with respect to the depth of the touch surface. Diagonal-axis d is defined as an axis running diagonally from one corner to a diagonally opposite corner. In FIG. 21*b*, diagonal-axis d is shown running from the bottom left corner to the top right corner. In the example embodiment of FIG. 21*a*, the curved touch plate 10 has a width of 1900 mm along the x-axis and a height of 1070 mm along the y-axis. The perimeter of the touch surface of this embodiment is flat or close to flat. In embodiments where the perimeter of the touch surface is flat or close to flat, the surface beneath some detection lines will not be perfect parabolas. Even for an almost perfect integrated glass shape with a warp in the range of 1-2.5 mm some detection lines (a very small portion) will actually have less signal than for a flat glass. This small drawback is counter balanced by the significant overall signal improvements. Furthermore, touch systems where the perimeter of the touch surface is flat or close to flat can be easier to manufacture and assemble.

Figure 21C:
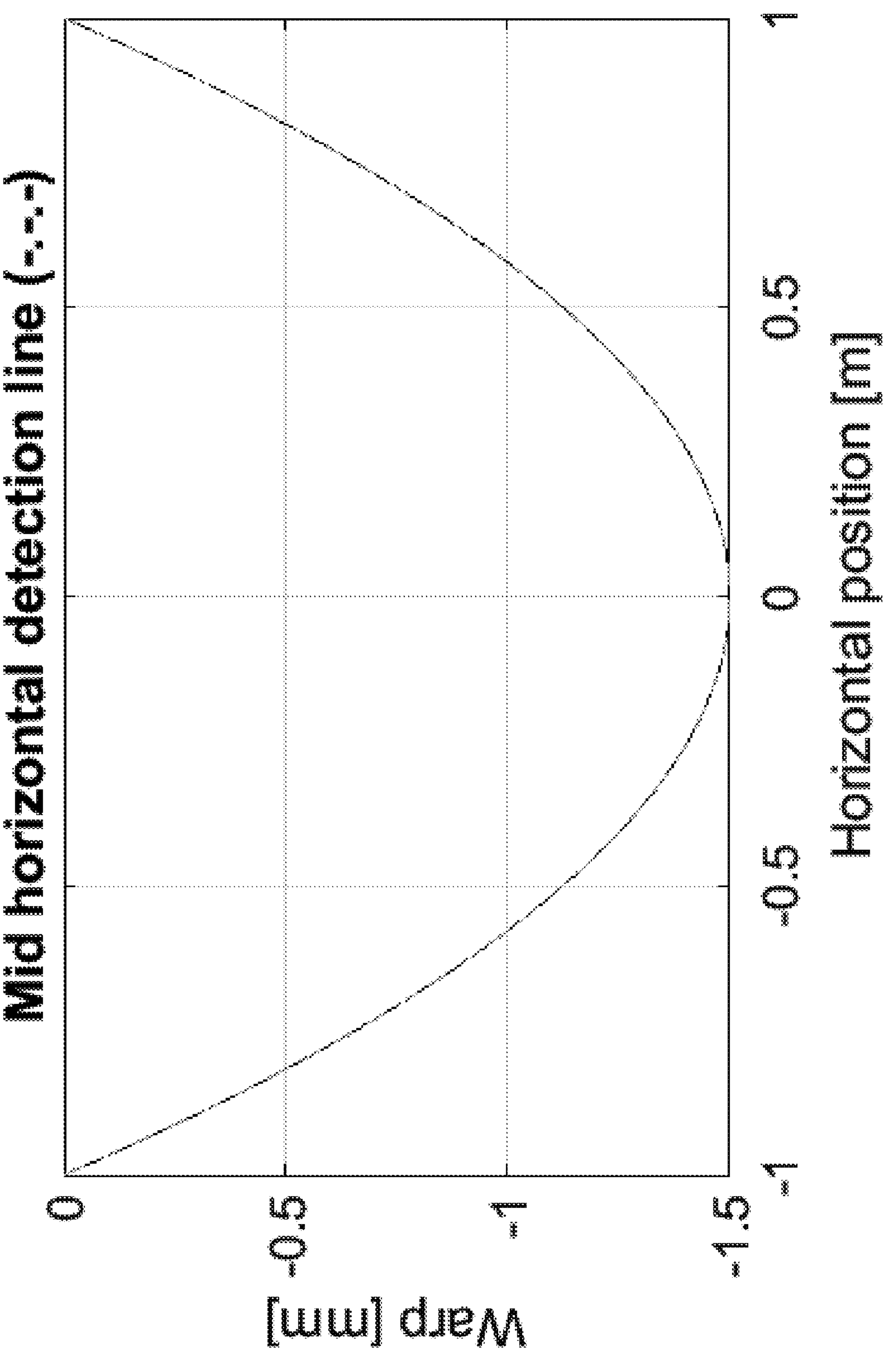
FIG. 21*c* shows curvature of a touch surface along a y-axis line according to the embodiment of FIG. 21*a;*
Figure 21D:
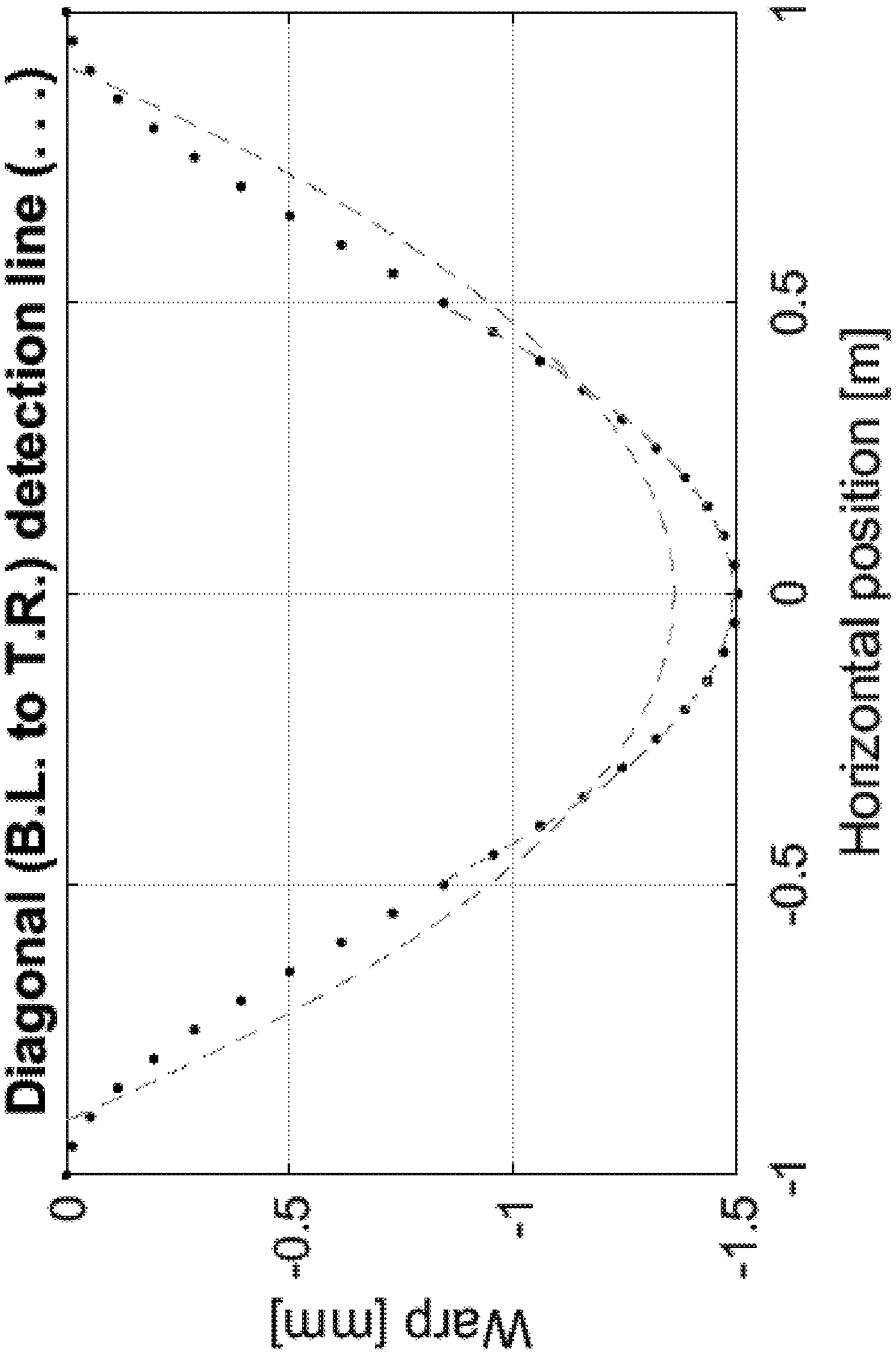
FIG. 21*d* shows curvature of a touch surface along a diagonal line according to the embodiment of FIG. 21*a*.

FIG. 21*b* shows a graph of the desired parabola of the touch surface underneath the x-axis and relative to the x-axis. The deviation (bottom axis) from the x-axis is shown relative to the position (left axis) along the x-axis. FIG. 21*c* shows a graph of the desired parabola of the touch surface underneath the y-axis and relative to the y-axis. The deviation (bottom axis) from the x-axis is shown relative to the position (left axis) along the y-axis. FIG. 21*d* shows a graph of the desired parabola of the touch surface underneath the diagonal-axis and relative to the diagonal-axis. The deviation (bottom axis) from the x-axis is shown relative to the position (left axis) along the diagonal-axis.

As will be apparent, the features and attributes of the specific embodiments disclosed above may be combined in different ways to form additional embodiments, all of which fall within the scope of the present disclosure.

Conditional language used herein, such as, among others, “can,” “could,” “might,” “may,” “e.g.,” and the like, unless specifically stated otherwise, or otherwise understood within the context as used, is generally intended to convey that certain embodiments include, while other embodiments do not include, certain features, elements and/or states. Thus, such conditional language is not generally intended to imply that features, elements and/or states are in any way required for one or more embodiments or that one or more embodiments necessarily include logic for deciding, with or without author input or prompting, whether these features, elements and/or states are included or are to be performed in any particular embodiment.

The present invention has been described above with reference to specific embodiments. However, other embodiments than the above described are equally possible within the scope of the invention. Different method steps than those described above may be provided within the scope of the invention. The different features and steps of the invention may be combined in other combinations than those described. The scope of the invention is only limited by the appended patent claims.

What is claimed is:

1. A touch sensing apparatus, comprising:
- a panel;
- a plate having a touch surface;
- a frame assembly configured to support the panel and the plate;
- a set of emitters arranged around the touch surface, the emitters being configured to emit light capable of propagating across the touch surface;
- a set of light detectors arranged around the touch surface, the light detectors being configured to receive light from the emitters, wherein each light detector is arranged to receive light from more than one light emitter, and light from each emitter propagates to a plurality of different light detectors on a plurality of light paths;
- the emitters and the light detectors collectively defining a grid of light paths on the touch surface;
- a processing element configured to determine, based on output signals of the set of light detectors, a position of an object on the touch surface, wherein the panel is an LCD panel, the plate is a glass plate, the glass plate is arranged opposite the LCD panel, and the touch surface is a surface of the glass plate on which light propagates;
- the touch surface is configured to enhance or amplify signals propagating between the emitters and the light detectors, wherein the glass plate is shaped such that the touch surface follows a parabolic curve into a concave shape relative to an x-axis,
- the touch surface having a maximum distance a from the x-axis, a maximum value of the maximum distance a being 2.5 mm, ensuring that the touch sensing apparatus maintains a low height of the light field;
- the glass plate is further shaped such that the touch surface follows a parabolic curve into a concave shape relative to a y-axis, the x-axis being perpendicular to the y-axis, the touch surface forming an inner concave surface, such that at least a portion of the touch surface of the touch sensing apparatus forms a reflector, different emitter positions utilizing different portions of the touch surface, the portion of the touch surface acting as a reflector depending on the actual shape of the glass plate and the position and size of the aperture surfaces of the emitters and the light detectors, to enhance detection signals of the light detectors.

2. The touch sensing apparatus according to claim 1, wherein the frame assembly comprises:
- a first frame element comprising a first portion and a second portion,
- a second frame element comprising a first portion and a second portion,
- wherein the second frame element is arranged on top of the first frame element, such that a periphery of the plate is arranged between the second portions of each of the first frame element and the second frame element.

3. The touch sensing apparatus according to claim 2, wherein the frame assembly further comprises:
- a sealing member arranged between the second portion of the second frame element and the plate.

4. The touch sensing apparatus according to claim 1, wherein the frame assembly is arranged to apply a controlled force along a periphery of the plate, such that a curvature of the plate is controlled.

5. The touch sensing apparatus according to claim 1, wherein a third axis extends along a diagonal of the touch surface, the diagonal extending from one corner of the touch surface to a diagonally opposite corner of the touch surface, wherein the x-axis, the y-axis, and the third axis each depict a parabola relative to a depth of the touch surface.

6. The touch sensing apparatus according to claim 1, wherein the touch surface forms a paraboloid, the paraboloid being an elliptic paraboloid.

7. The touch sensing apparatus according to claim 1, wherein each point of the x-axis of the touch surface is within 0.5 mm of a mathematical parabola.

8. The touch sensing apparatus according to claim 7, wherein the mathematical parabola is defined according to $z(x, y)=a+bx^2+cx^2y^2+dy^2$, where z is depth, and x and y are coordinates in the plane of the glass.

9. The touch sensing apparatus according to claim 1, further comprising a plurality of spacing elements, the spacing elements being arranged to apply a force to the frame assembly along a side of the frame assembly, such that the frame assembly follows a curved path.

* * * * *